US007870535B2

(12) United States Patent
Rippert, Jr. et al.

(10) Patent No.: US 7,870,535 B2
(45) Date of Patent: Jan. 11, 2011

(54) DISTRIBUTED DEVELOPMENT ENVIRONMENT FOR BUILDING INTERNET APPLICATIONS BY DEVELOPERS AT REMOTE LOCATIONS

(75) Inventors: Donald J. Rippert, Jr., Vienna, VA (US); James P. Porter, Arlington, VA (US); Michael G. Condon, Dunn Loring, VA (US)

(73) Assignee: Accenture Global Services GmbH, Schaffhausen (CH)

( * ) Notice: Subject to any disclaimer, the term of this patent is extended or adjusted under 35 U.S.C. 154(b) by 1291 days.

(21) Appl. No.: 10/468,785

(22) PCT Filed: Feb. 21, 2002

(86) PCT No.: PCT/US02/04964

§ 371 (c)(1),
(2), (4) Date: Feb. 4, 2004

(87) PCT Pub. No.: WO02/069086

PCT Pub. Date: Sep. 6, 2002

(65) Prior Publication Data

US 2004/0117759 A1    Jun. 17, 2004

Related U.S. Application Data

(60) Provisional application No. 60/270,163, filed on Feb. 22, 2001.

(51) Int. Cl.
*G06F 9/44* (2006.01)
(52) U.S. Cl. .................. 717/100; 717/103; 717/106; 717/109; 717/113; 717/124; 717/125
(58) Field of Classification Search .......... 717/100–109
See application file for complete search history.

(56) References Cited

U.S. PATENT DOCUMENTS 5,907,704 A    5/1999    Gudmundson et al.

(Continued)

OTHER PUBLICATIONS

The Object Oriented Systems Life Cycle by Brian Henderson-Sellers and Julian M. Edwards Communication of the ACM vol. 33, No. 9, Sep. 1990 pp. 142-159.*

(Continued)

*Primary Examiner*—Insun Kang

(57) ABSTRACT

A system and a method for developing Internet-hosted business applications composed of web services and software for use in such environments where applications and application components interoperate to perform requested business functions. The system and method of the present invention utilize a software development application services provider module (DASP), an Instantiatior module, a Builder module, an Applications Service Provider (ASP) Infrastructure Platform (AIP) module, and a hosted production environment module. The system and method of the present invention seeks to maximize the use of prior work to eliminate repetition and reduce development cost and development time. With each new project the library and experience increases. The system and method of the present invention can use developers and testers situated in diverse locations so that a larger pool of skilled people can be employed, the work can be done around the clock by using people all over the globe, and the costs can be reduced by directing work to people in countries with lower labor rates. The system and method of the present invention increases efficiencies and reduces costs to all parties by partnering the developers with third parties who are brought in at the beginning of development.

24 Claims, 44 Drawing Sheets

U.S. PATENT DOCUMENTS

| | | | |
|---|---|---|---|
| 5,911,075 A | 6/1999 | Glaser et al. | |
| 5,966,535 A | 10/1999 | Benedikt et al. | |
| 6,014,666 A * | 1/2000 | Helland et al. | 707/9 |
| 6,049,664 A | 4/2000 | Dale et al. | |
| 6,119,247 A | 9/2000 | House et al. | |
| 6,145,119 A * | 11/2000 | House et al. | 717/101 |
| 6,163,878 A * | 12/2000 | Kohl | 717/100 |
| 6,170,081 B1 * | 1/2001 | Fontana et al. | 717/104 |
| 6,256,773 B1 * | 7/2001 | Bowman-Amuah | 717/121 |
| 6,601,018 B1 * | 7/2003 | Logan | 702/186 |
| 6,615,166 B1 * | 9/2003 | Guheen et al. | 703/27 |
| 6,718,535 B1 * | 4/2004 | Underwood | 717/101 |
| 6,901,380 B1 * | 5/2005 | Bremers | 705/27 |
| 6,964,034 B1 * | 11/2005 | Snow | 717/121 |
| 7,127,705 B2 * | 10/2006 | Christfort et al. | 717/113 |
| 7,152,220 B2 * | 12/2006 | Rickards et al. | 717/101 |
| 7,613,599 B2 * | 11/2009 | Bade et al. | 703/14 |
| 2002/0087487 A1 * | 7/2002 | Hassinger | 705/400 |

OTHER PUBLICATIONS

Canadian Office Action dated Apr. 16, 2009, for Application No. 2,440,031, 3 pages.

* cited by examiner

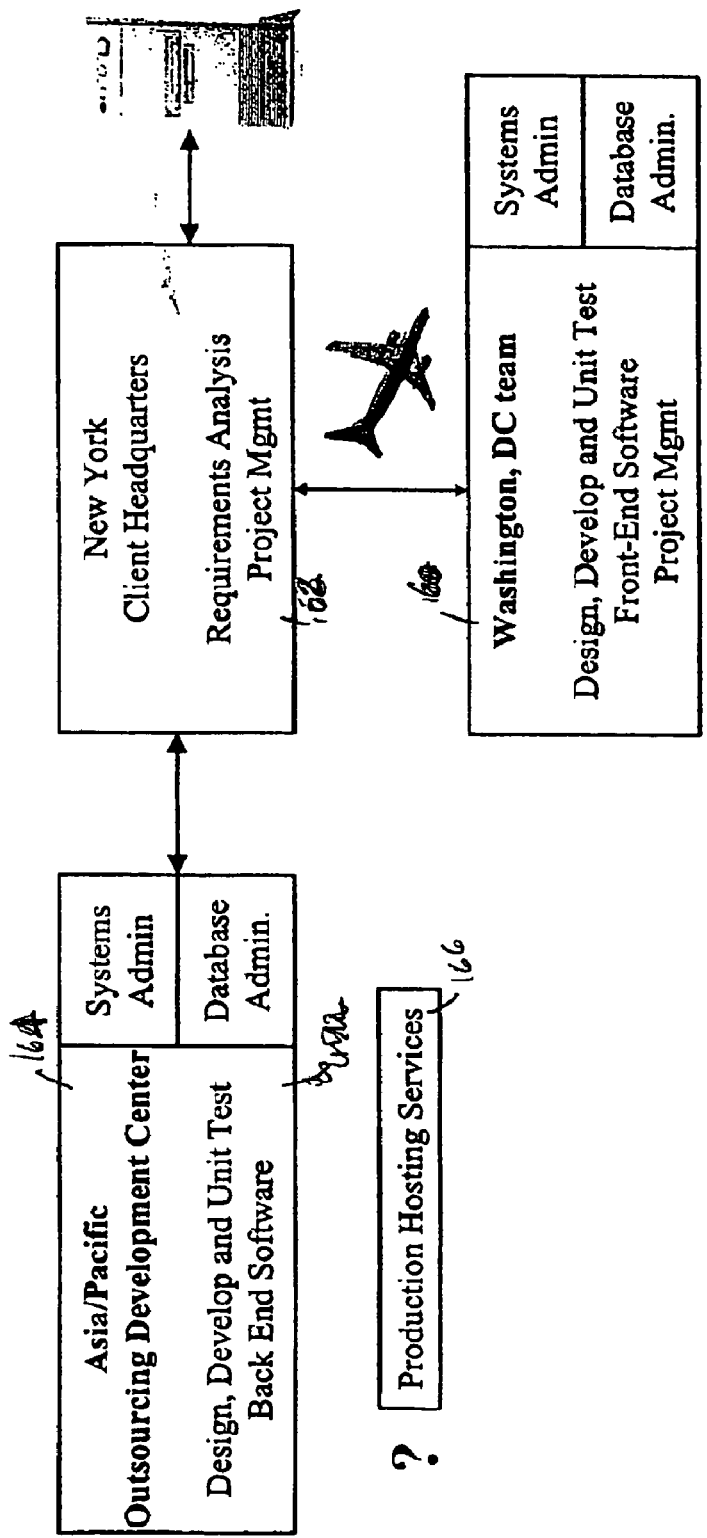

The client hires a systems integrator to build a client/server system. The systems integrator utilizes a development "solution center" in the pacific rim to keep costs low. The front-end is performed by a Washington, DC based team working at the client site in New York.

The client is responsible for buying development and testing hardware and software licenses.

The client must still select the production hosting provider.

Figure 3

The interface between the applications and the operating systems and databases is where the traditional delineation of responsibilities occurs between customer and the managed services provider.

It is critical to have well-written applications that are tightly integrated with the production monitoring systems and BSS/OSS of the application infrastructure provider to provide high levels of service (e.g. 100% availability).

The new development enivonment provides application developers standard APIs that plug and play into the applications infrastructure providers monitoring systems.

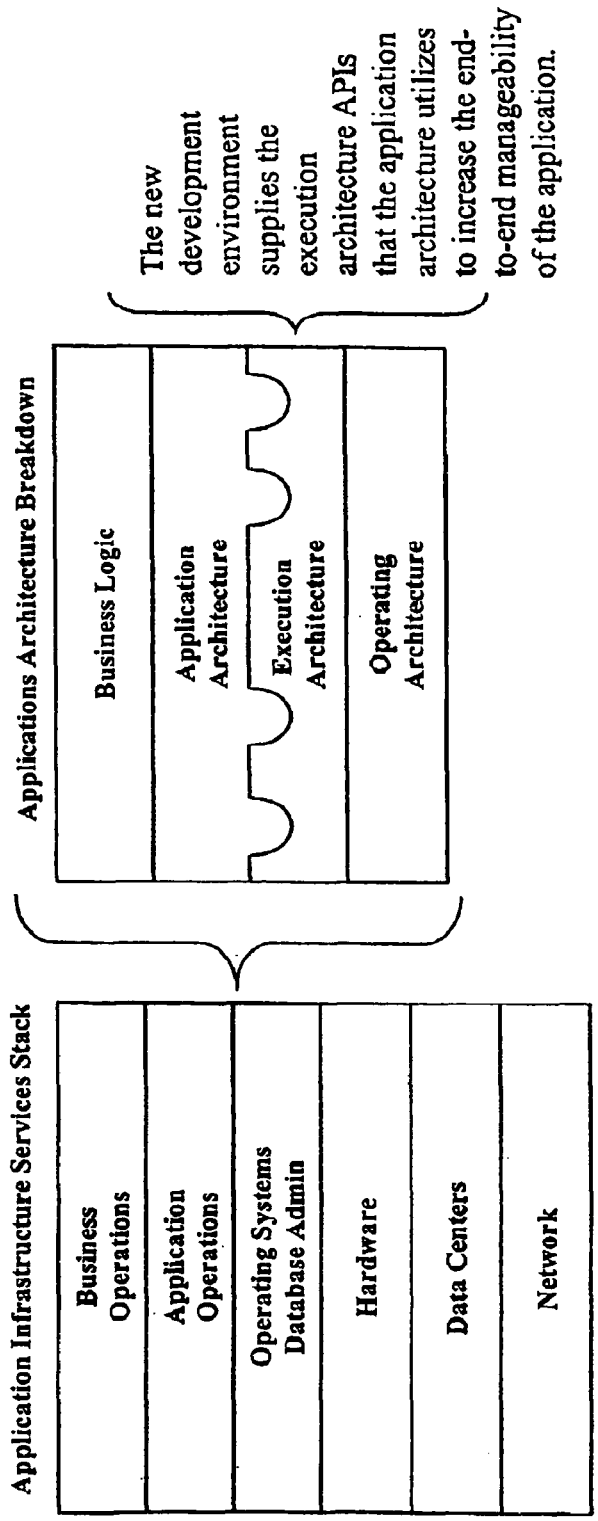

Figure 9

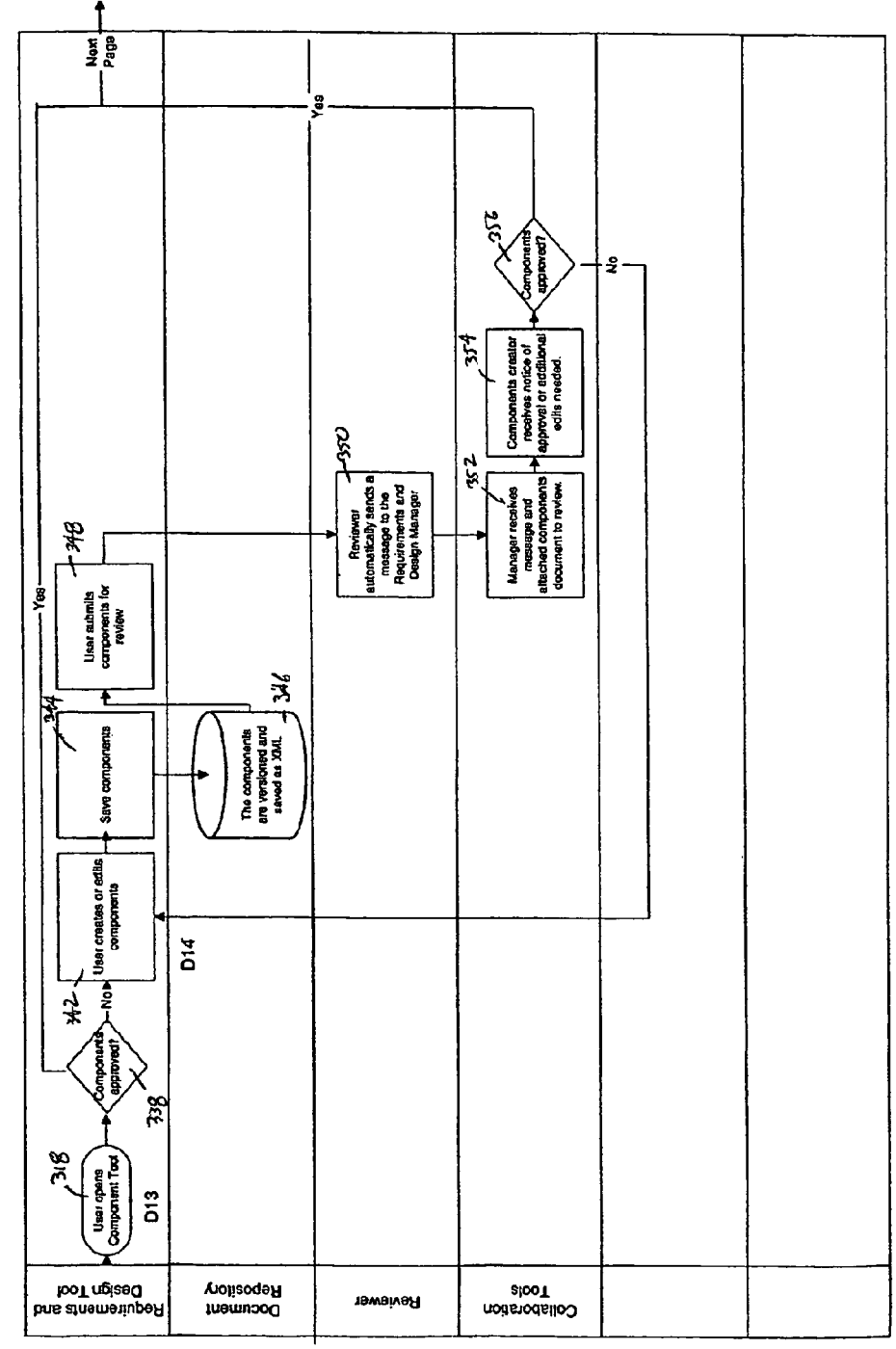

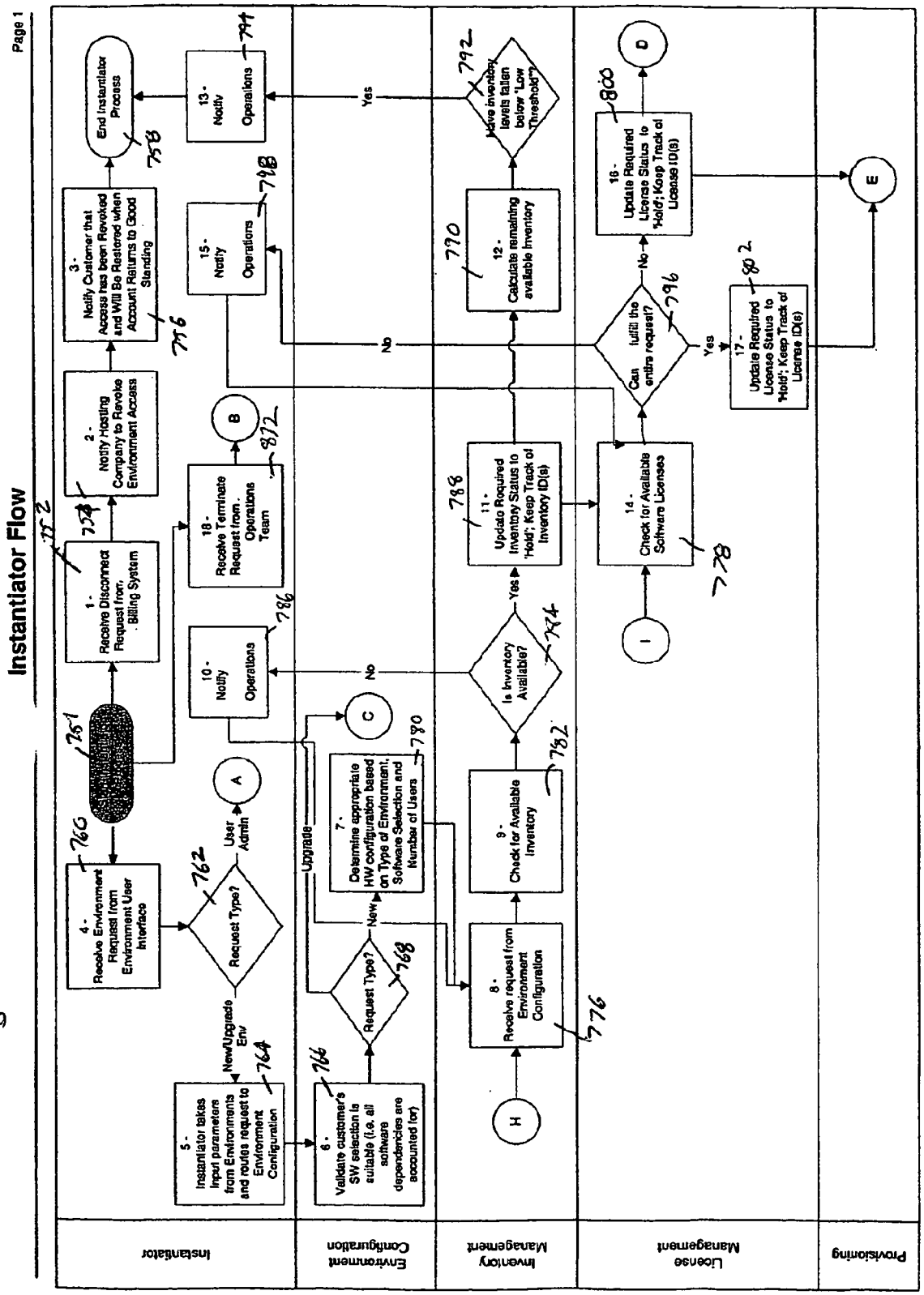

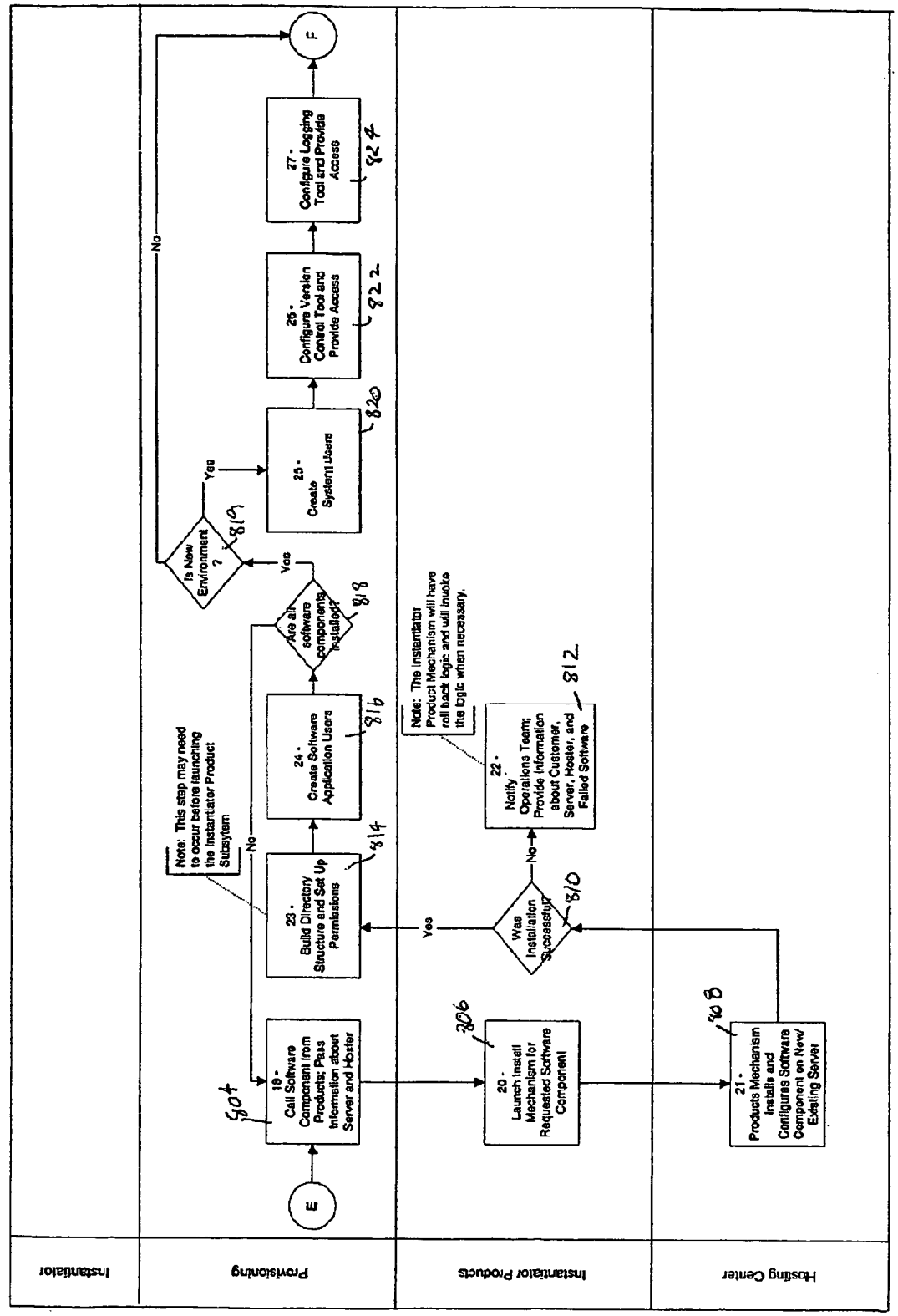

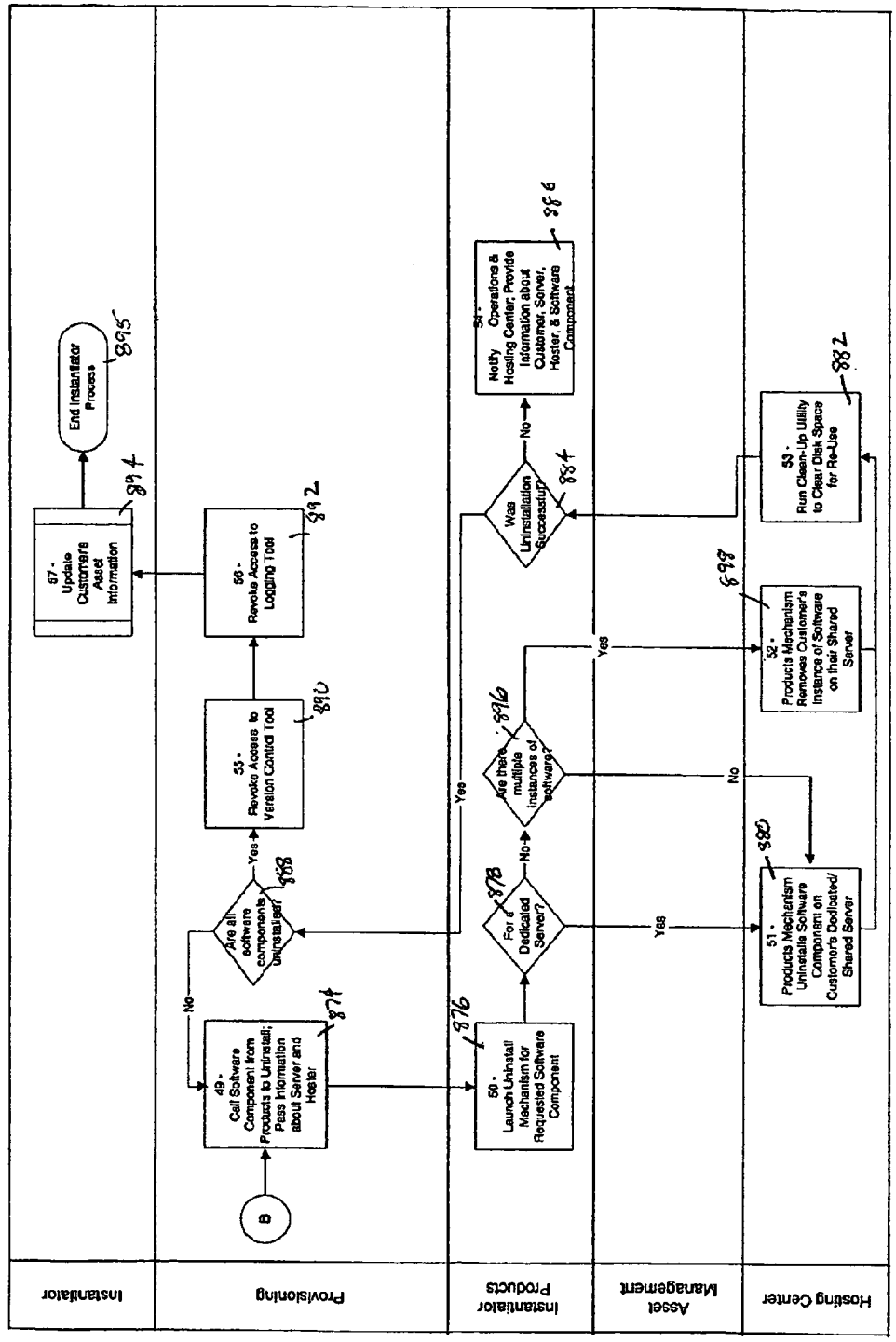

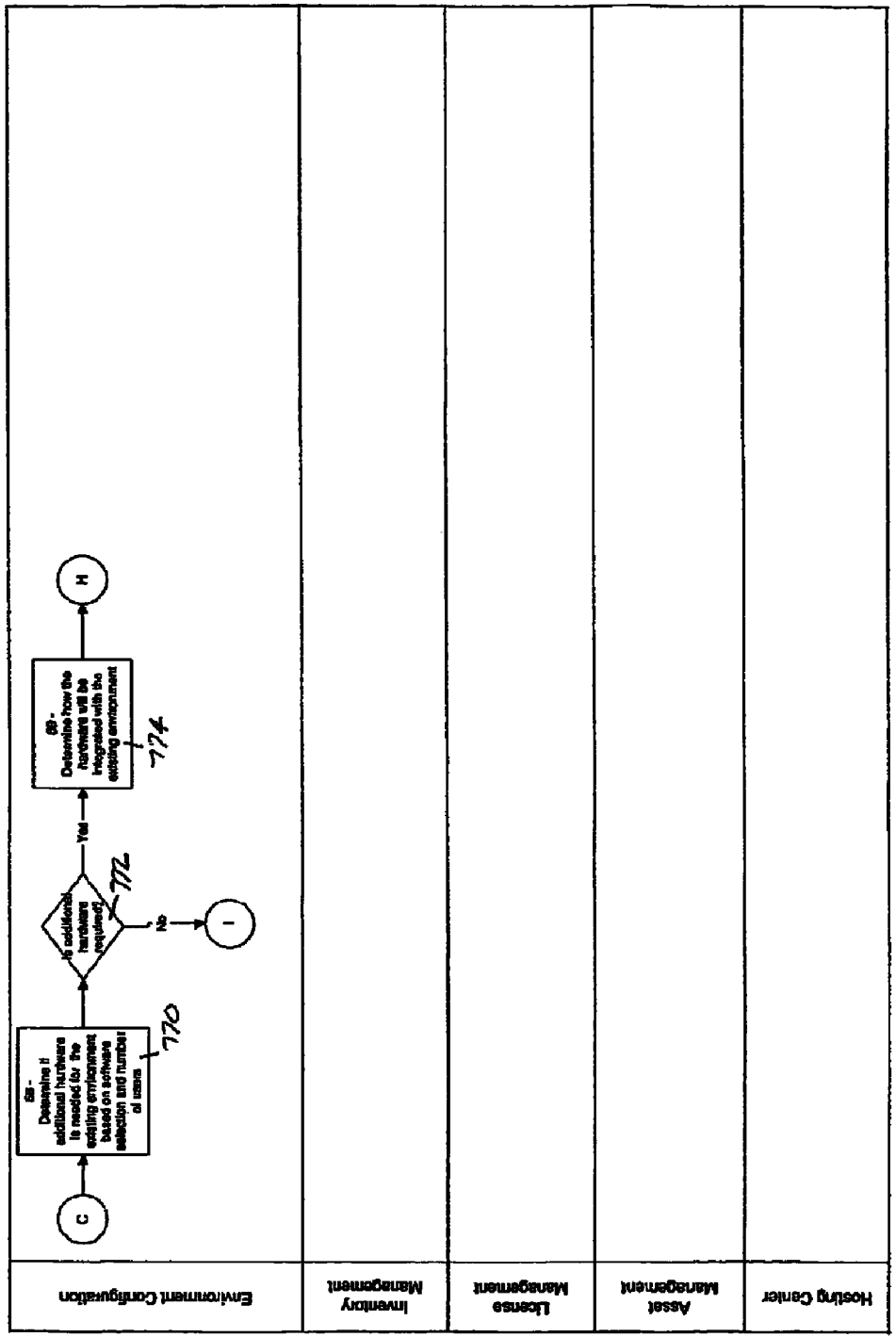
Fig. 21f Instantiator Process Flow

DISTRIBUTED DEVELOPMENT ENVIRONMENT FOR BUILDING INTERNET APPLICATIONS BY DEVELOPERS AT REMOTE LOCATIONS

The present application claims priority to provisional application Ser. No. 60/270,163, filed Feb. 22, 2001, entitled SYSTEM AND METHOD FOR DEVELOPING INTERNET-HOSTED ENVIRNOMENTS AND SOFTWARE FOR USE IN SUCH ENVIRONMENTS, incorporated herein by reference.

This application is a National Stage application of co-pending PCT application PCT/US02/04964 filed Feb. 21, 2002, which was published in English under PCT Article 21(2) on Sep. 6, 2002. This application is incorporated herein by reference in its entirety.

FIELD OF THE INVENTION

The present invention relates to Internet-hosted business applications composed of web services and software for use in such environments. More particularly, the present invention is directed to a system and method for developing Internet-based ASP development environments and software for use in such environments, and for facilitating the creation of an Internet-accessible, hosted business applications where applications and application components interoperate to perform requested business functions.

BACKGROUND OF THE INVENTION

The development of hosted business applications composed of web services can be expensive and time consuming. An Internet-hosted business application refers to an Internet accessible application (via the World Wide Web) for performing business functions. The business application can be "assembled" using web services, which are software components that are accessible over the Internet using XML standards. Examples of hosted business applications composed of web services that perform business functions and are accessible by the public include tracking services provided by express couriers, airline websites through which flight information and reservation services are available, and utilities such as Babelfish by AltaVista for performing language translation services. These examples are all publicly available. However, enterprise solutions for corporate intranets are much more complex and difficult to develop.

Factors that contribute to the expense and development difficulty include: the level of experience of the developers; repetition of similar or related work performed on previous projects; access to or development of unique applications created to help different third-party applications work together; and whether there is access to a library of resources for creating such environments.

Conventionally, hosted business applications composed of web services are created at a central location where many if not all of the application developers and testers work. If this development center is located in a region where such developers and software designers are in high demand or such services are provided at premium costs, then the cost to produce such an environment may be considerable. In addition, even if such a development team worked diligently, there is likely to be times when little or no development or testing is being completed, e.g., 12 AM to 6 AM.

Testing a hosted web services-based business application before its launch comprises a substantial portion of the development costs. One known solution for reducing testing costs is to perform the testing portion of the development in a geographic region or foreign country where labor costs for testers is not as expensive as in the country in which the primary development occurs. However, this requires that developers from the country in which development occurs travel to the country in which testing will occur, and setup and configure the appropriate hosted web services testing environment on computers at the testing location. At a minimum, the actual computers on which the system is being developed are shipped to the testing location, which still incurs shipping and setup costs.

Furthermore, additional expenses may be incurred in the conventional environment development described above due to the fact that the environments are created in isolation, and because other potential long-term partners are not brought into the project until near the end of development or until after development is completed. If an Internet Hosting service provider (HSP) is not brought into the project until the application development project nears completion, then the application may not have been optimized for or to take advantage of unique network characteristics and services of the selected HSP, and the HSP generally would not have as deep an understanding of the environment as if it had been involved with the development process from the beginning.

There presently is no system through which geographically distributed developers can create hosted business applications composed of web services, nor is there a system through which development can occur in one location, and testing can occur in a second location without incurring shipping costs or performing extensive software setup and installation at the second location. Thus, it would be an advancement in the art to provide an Internet-accessible application development environment through which developers and testers from various locations can perform hosted business application system development and testing without being required to travel to a specific development location.

SUMMARY OF THE INVENTION

The present invention overcomes the problems and limitations of the prior art by providing a software system and a method for developing hosted business applications composed of web services. In particular, the present invention facilitates the creation of hosted business applications where Internet-accessible web services can seamlessly interoperate to perform requested business functions.

The present invention makes the development of business applications and web services using hosted Internet development environments more efficient by minimizing the repetition of similar work performed during previous development cycles. Each environment can be created with a variety of third-party products and services. These environments require the development and testing of unique applications to ensure that the third-party products work together to produce the intended results. Furthermore, the system facilitates the development of unique application as requested by each client, depending upon the ultimate use of the environment by that client.

The system of the present invention facilitates the development of such environments by creating a dynamic library of resources for creating these environments that can be used each time a new environment is being developed. The resource library may include platforms, middleware products, applications, and databases. The platforms and middleware products may be third-party products, such as NetCool, Microsoft products, Solaris, etc. The applications can be either third-party products or specialized applications developed in house by the developer. New third party applications used or developed in house during a software development project may be added to the resource library. Thus, with each new development project the skill of the development group, the library of previously used products, and the library of unique applications increase.

The number of potential products that can be employed to build the software development environment is considerable. The number of ways these products can be integrated is even more numerous. The system and method of the present invention seeks to maximize the use of prior work to eliminate repetition and thereby reduce development cost time Another aspect of the system and method of the present invention is the ability to utilize developers and testers situated in diverse locations as opposed to a central location. As a result, a larger pool of skilled people can be employed, the work can be done around the clock by using people all over the globe, and the costs, including testing costs, can be reduced by directing work to people in countries with lower labor rates for the work being performed.

Finally the system and method present invention increases efficiencies and reduces costs by partnering developers with third parties, such as HSPs, who are brought in at the beginning of development cycle, so that the client and the third party may both realize cost savings and advantages by having the third party host the business application throughout the development and testing phases as well as the eventual production implementation.

In order to facilitate the development of Internet-based business applications, where applications and web services can seamlessly interoperate to perform business functions, the inventive system includes a software development application services provider (DASP) module, an Instantiator module, a Builder module, an Applications Service Provider (ASP) Infrastructure Platform (AIP) module, and a hosted production environment module. The DASP module provides the software infrastructure, development environments and methodologies that enable remote software development and testing, and allows collaborative software development and testing to be performed using only a web browser on the user desktop.

The Instantiator module customizes the DASP environment to generate application services tailored for a specific target hosting environment chosen by the client for whom the hosted and web services-based business application is being developed. In response to a request for a specific hosting environment, relevant application services from the target hosting environment are provided.

The Builder module comprises an index that allows the client to discover and utilize the application services that exist on the AIP module. The Builder module operates in conjunction with the DASP, Instantiator, and AIP modules to allow developers to invoke existing services or integrate pre-built web services into the application by selecting from the index.

The Hosted Production Environment (HPE) module comprises the infrastructure on which the Internet-based development occurs, such as the HSPs web server and associated operations support applications. The HPE module may be tailored for the technologies on which the business application has been developed. The AIP module provides application discovery and delivery, user authentication, ubiquitous access, and usage-based subscriber billing services.

BRIEF DESCRIPTION OF THE DRAWINGS

These and other attributes of the present invention will be described with respect to the following drawings in which:

FIG. 3 is a diagram illustrating a conventional system integration arrangement;

FIG. 9 illustrates how application developers standard APIs that plug and play into the applications infrastructure providers monitoring systems are provided in the system and method according to the present invention;

FIGS. 14a-14l are flow charts illustrating the design process and development of the environmental requirements, according to the system and method for developing Internet-hosted business applications composed of web services of the present invention;

FIGS. 21a-21f are flow charts illustrating an Instantiator process according to the present invention.

DETAILED DESCRIPTION OF THE INVENTION

The system and method of the present invention is designed to facilitate the construction of new hosted business applications composed of web services and software development tools that enable customers to lower their software development costs by providing a virtual software development environment. The present invention achieves numerous advantages by utilizing existing technologies. In particular, the system and method of the present invention encapsulates programming infrastructure tools (e.g. fourth generation languages, or 4GLs), code generators, version control, testing tools, etc. into a single integrated development environment. There is a shortage of Information Systems human resources and the significant difference among countries for software development labor costs. Using the present invention customers can move project work to where there is an economical labor force without incurring addition shipping, travel, or setup costs.

Figure 1:
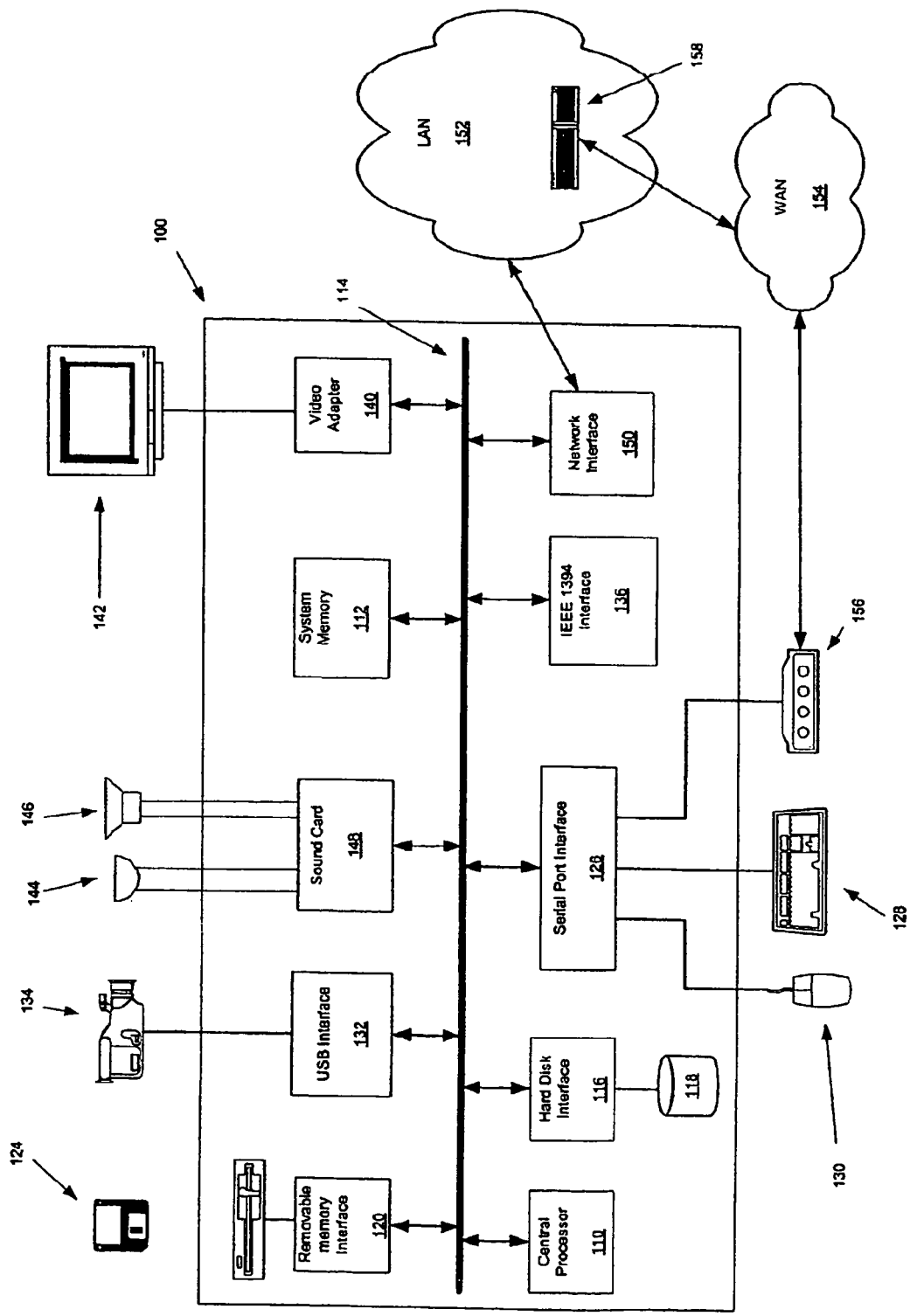
FIG. 1 is a block diagram illustrating a computer system on which the system and method of present invention may be practiced.

In order to provide solutions that enable entities to discover, extend, validate and efficiently establish new business systems over a network, the present invention is preferably implemented in conjunction with one or more computers and one or more networks. An exemplary operating environment for such a computer is illustrated in FIG. 1, in which a computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer readable medium 124 and magnetic pulses to bits when reading data from the computer readable medium 124. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hardwired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium. For example, computer 100 may include computer-executable instructions for transmitting information to server 160, receiving information from server 160 and displaying the received information on display device 142. Furthermore, server 160 may include computer-executable instructions for transmitting hypertext markup language (HTML) or extensible markup language (XML) computer code to computer 100.

By virtue of using the system of the present invention, customers may experience a reduction in their overall development costs by eliminating development hardware and system administration for redundant machines. Customers may also have access to previously proven methodologies (from previous development cycles), and to incremental administration services (e.g. OS, database administration, etc.). A comparison of a conventional development model and a model of the system and method of the present invention is shown in FIG. 2.

Figure 2:
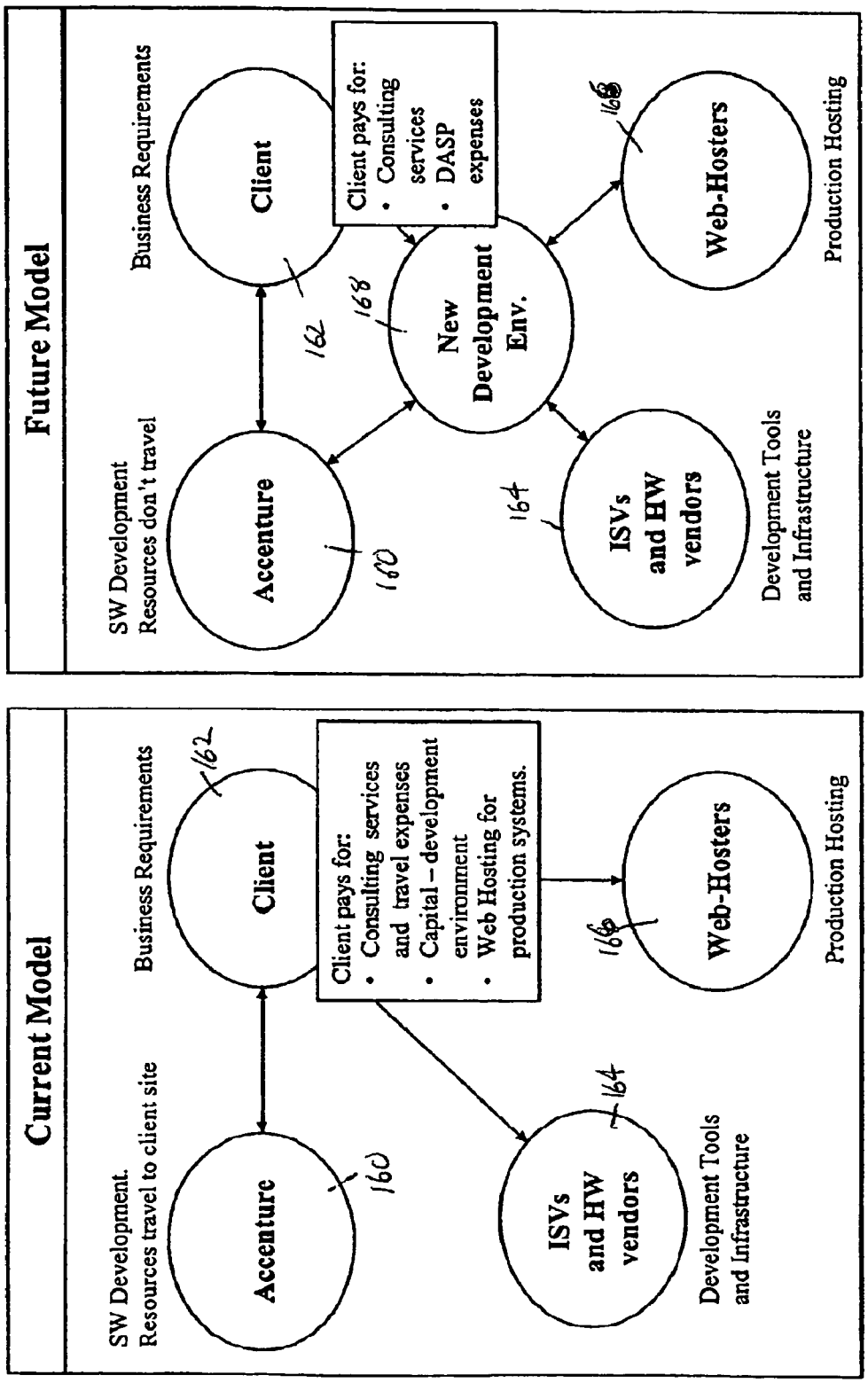
FIG. 2 is a comparison of a conventional development model and a model of the system and method of the present invention.

In the current model software development resources, such as personnel, hardware, and software, are physically brought from a software developer site 160, Accenture in FIG. 2, to the client site 162. Independent software vendors (ISVs) and hardware vendors 164 also must travel to and from the client site 162. Production hosting, i.e., providing web servers for use during the development cycle, is done by independent web-hosters 166. In the current model, coordination of all activities must be performed at the client site 162, and the client pays for consulting services and travel expenses, capital for the development environment, and web-hosting for the production systems.

According to the future inventive model of FIG. 2, the present invention includes a new development environment 168 that is not located at the client's 162 site. The software developer 160 can work directly with the client 162 and the new development environment 168. The ISVs and hardware vendors 164 and web-hosters 166 interact through the new development environment 168 instead of at the client 162. The development resources do not have to be physically brought to the client 162 because they are available via a conventional web browser, and the client 162 only pays for the consulting services and the DASP expenses.

Referring to FIG. 3, a conventional system integration arrangement is illustrated. Here, the client 162 hires a systems integrator to build a client/server system. The systems integrator 164 utilizes a development "solution center" in the Pacific Rim to keep costs low. The front-end is created by a Washington, D.C. based team 160 working at the client site in New York. The client is responsible for buying development and testing hardware and software licenses. The client may still select the production-hosting provider 166.

Figure 4:
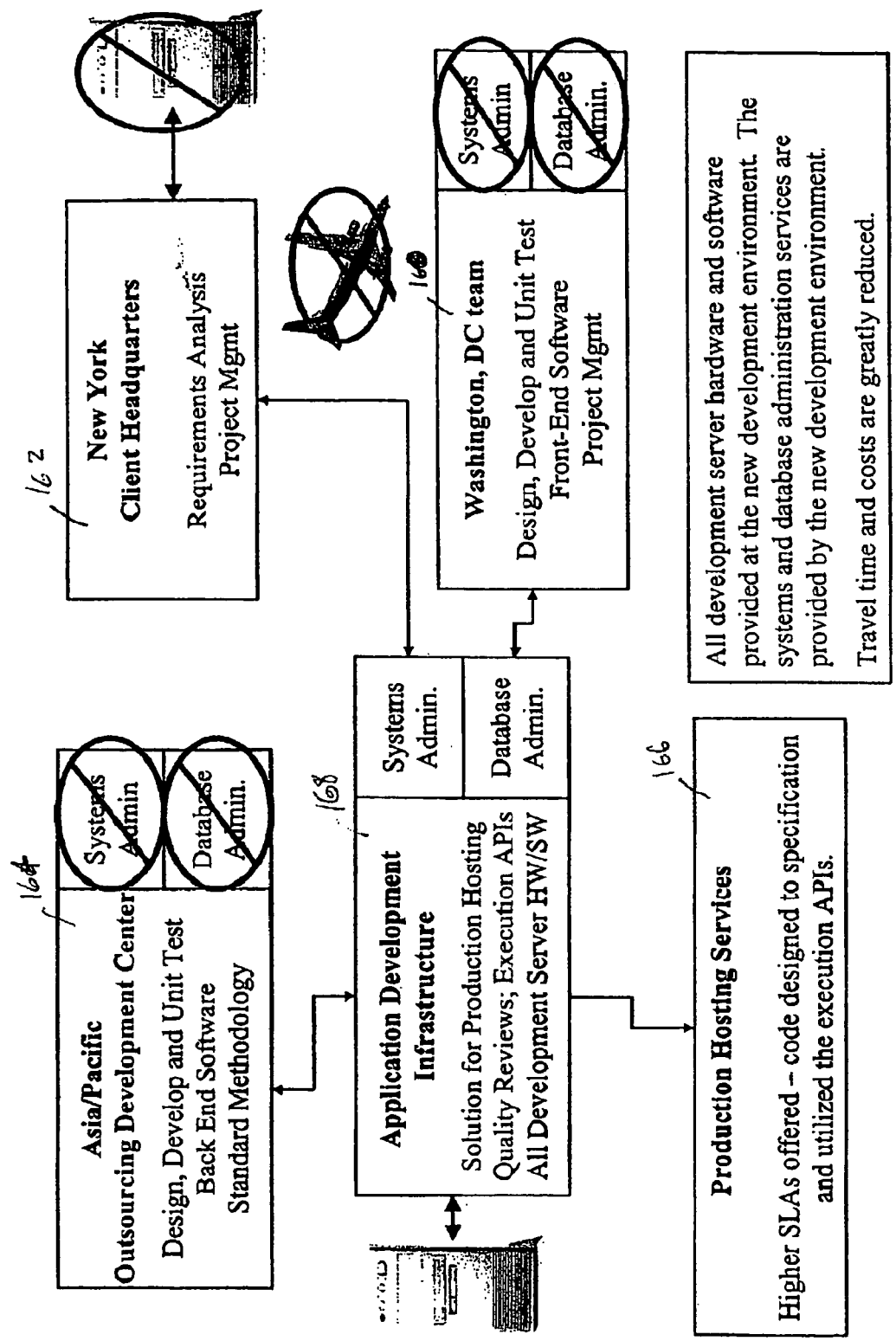
FIG. 4 is a diagram illustrating system integration utilizing the system and method of the present invention.

FIG. 4 illustrates system integration utilizing the system and method of the present invention. In this instance, all development server hardware and software are provided at one location 168, as are the systems and database administration services. Testers and developers at other locations can access the development systems via a conventional web browser over the Internet.

As an example, suppose a Regional Bell Operating Company (RBOC) Information Services department is a customer of Accenture, the systems Integrator. An ISP, an Internet operations outsourcing company, and a Hosting Service Provider may provide the infrastructure resources for Internet connections, website maintenance, and website hosting, respectively. There may be one or more independent software vendors. By using the system and method of the present invention, the customer can realize reduced software development cost, eliminate the need to invest capital into technology resources, e.g. buying development hardware/software, and has the capability of easily working with multiple systems integrators, as described below.

The system Integrators may realize benefits as well, namely lower travel costs and therefore lower costs to pass on to the end-client, reduced delivery risk, tighter integration, e.g. reduced time to market, more satisfied employees due to flexibility in work schedules and locations, and the ability to focus on core competency of designing, developing and testing systems, as opposed to systems administration. Furthermore, the system integrator will be able to more efficiently utilize resources, e.g. across geographical locations, and will be able to better leverage the most cost-effective resource (global economic factors). Additional benefits to the system integrator are better integration with third party partners and specialists, and a reusable code repository.

The infrastructure providers in the system and method of the present invention will also realize benefits. In particular, the infrastructure providers will develop new customers (those performing software development), and develop an additional sales channel, i.e., customers that outsource development environments will need to outsource production environments. Furthermore, the infrastructure providers will be able to build customer relationships earlier than traditional web-hosting firms, and be able to offer more advanced application management systems.

As a result of utilizing the system and method of the present invention, the ISVs/Software development tool vendor will be able to broaden its customer base, develop an easier method for customers to use its products, and integrate with other utilities for an end-to-end environment. As another adding benefit, travel time and costs are greatly reduced.

Figure 5:
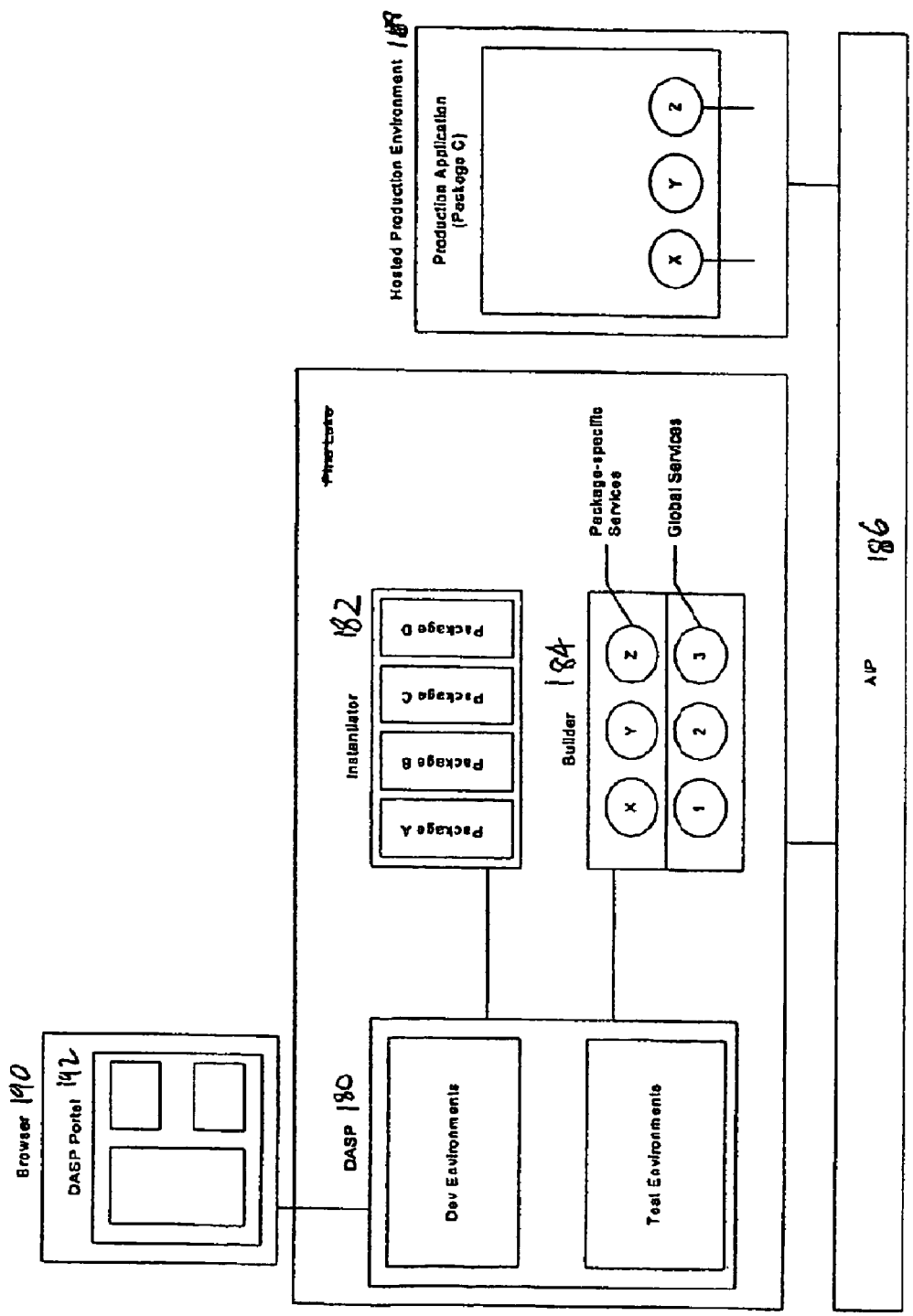
FIGS. 5 and 6 are diagrams illustrating the basic components of the system and method of the present invention.
Figure 6:
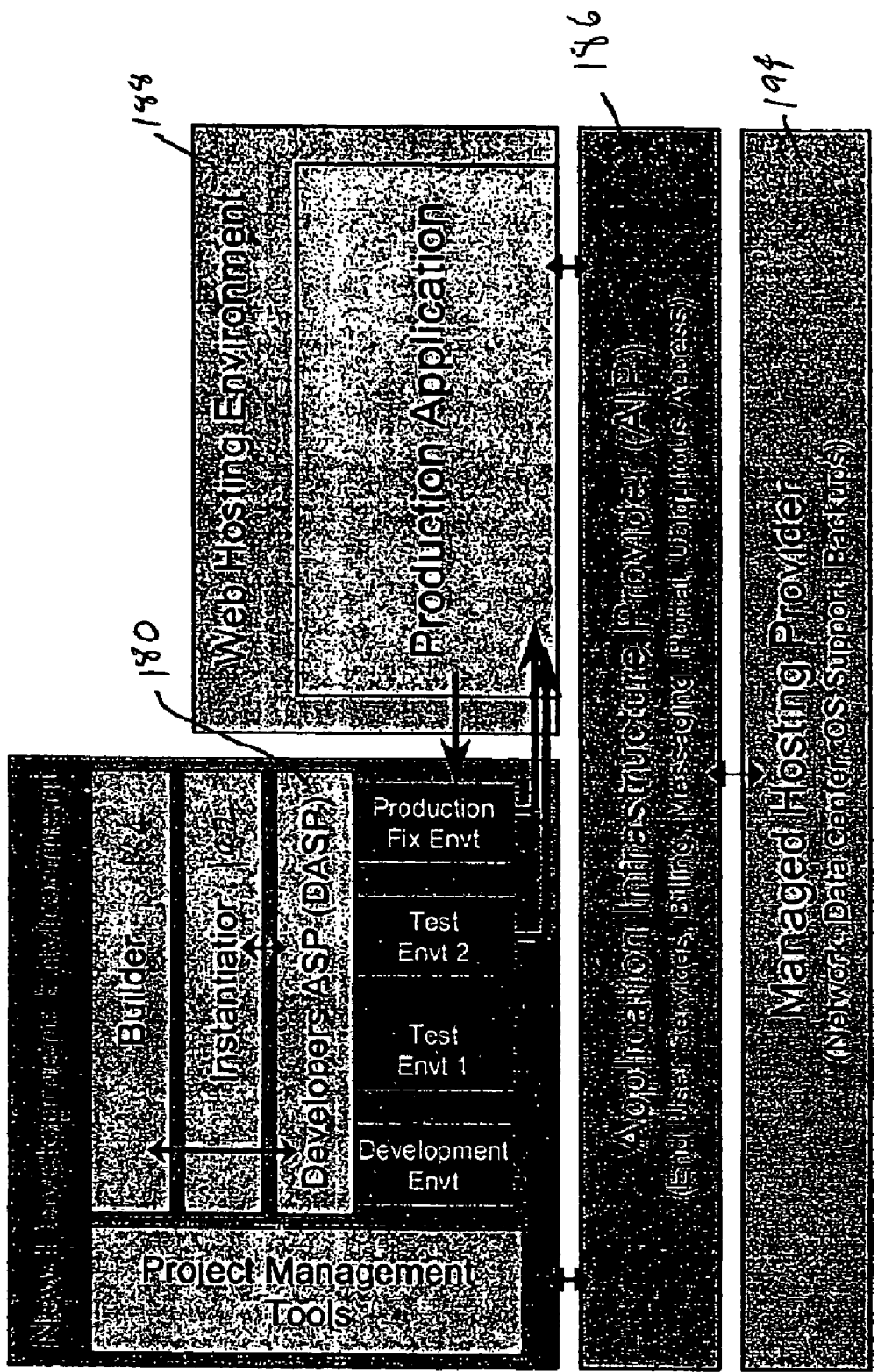

With reference to FIG. 5 and FIG. 6, the basic components of the inventive system of the present invention are a software development application services provider (DASP) module 180, an Instantiator module 182, a Builder module 184, an Applications Service Provider (ASP) Infrastructure Platform (AIP) module 186, and a Hosted Production Environment (HPE) module 188.

The DASP 180 provides the software infrastructure, environments and methodologies that enable remote software development and testing—and allows collaborative software development using only a web browser 190. The DASP 180 provides various tools required for the software development processes (estimating tools, data modeling utilities, software development tools, testing environment support, and documented methodologies), which may be integrated into and interacted with through a web browser 190. Therefore, the development, testing, and management teams can collaborate on a large project regardless of their physical location, enabling global teamwork to efficiently develop and test software projects.

The DASP 180 may also provide a set of hosted environments and services with pre-configured tools and components, intended to reduce project start-up costs, eliminate project environment setup, and simplify the development lifecycle. These services are presented to DASP 180 users in a customized portal 192 accessible from any web browser, thus allowing project teams to coordinate, develop, and test remotely from any location. The integrated suite of tools facilitates automated environment creation, standardized development practices, increased component reuse, configuration management and environment migration, and production maintenance.

The DASP portal 192 delivers tools and services to users customized by each user's role in the project. For example, a project manager may be provided with project planning tools, resource management tools, release management tools, status reporting capabilities, and DASP 180 environment management. A developer, on the other hand, may be provided with a terminal to the development environment, a source code editor, a debugger, a Structured Query Language (SQL) database service, a version control service, and a defect tracking service.

The services offered by the present invention eliminate the need for project teams (comprised of programmers, testers, and servers) to be located at the same physical location to perform the software development tasks (software design, programming, debugging, testing and project management).

DASP 180 includes a portal 192 having a variety of developmental tools. Pre-built and pre-configured environments, which include unique applications that have previously been developed to create these environments, are available through the DASP 180. The DASP 180 is maintained on a central system that can be accessed by PC's with a browser 190, thus eliminating the purchase and maintenance of redundant hardware.

The Instantiator module 182 customizes the DASP 180 environment by providing application services tailored for a specific target hosting environment chosen by the client (e.g., PeopleSoft ERP, Siebel SFA, BEA WebLogic, etc.). In response to a request for a particular target hosting environment, relevant application services that meet the requirements of the target hosting environment profile and the desired environment are provided. These include tailored methodologies, pre-populated testing databases, testing environments, and relevant internal and external content (e.g., Forrester Industry trends). The Instantiator module 182 facilitates product construction, versioning, and deployment of the application service into a production environment.

The Instantiator module 182 is a hosted application that facilitates the application services development lifecycle. A user working on a project first requests a development, testing or production environment be instantiated for a specific target hosting environment. The Instantiator module 182 responds to the request by generating and automatically configuring the requested environment (e.g. development, testing, or production), migrating the application code and data, and making available to the user all the relevant application services that fit the target hosting environment profile and the desired environment, thus facilitating a smooth migration between the development, building, testing and release phases of the application services development lifecycle. It also interfaces with the AIP 186 to bill the customer for the provisioning of the generated environment.

The Instantiator module 182 also provides personalized content for development and testing teams to enable them to build new applications leveraging past best practices (for example, Siebel design documentation will be supplied via the Siebel Instantiator), and also facilitates the generation of development, testing, and production environments, and pre-populates many of the package specific databases and tables.

The builder module 184 comprises an index that allows the client to discover and utilize the application services that exist in the AIP module 186. The builder module 184 is integrated with the DASP module 180, the Instantiator module 182, and the AIP module 186 to allow developers to easily invoke existing services or integrate pre-built components into their application, by selecting from the index.

The builder module 184 may be a hosted application that enables the discovery and invocation of technology package specific application services and the relevant generic application services that exist on the AIP 186 for utilization by a user. When a development, testing or production environment is being instantiated, the builder module 184 determines the relevant application services that exist in the AIP module 186 that are available for use.

As developers are creating an application, builder module 184 provides a list of available components via the DASP portal 192. Based upon application requirements and design, developers can choose from this set of reusable components, and integrate them into the application as necessary. A large number of the components are execution architecture services that hook directly into the HPE module 188, such as logging and alarming services for the application operation center (AOC), business operation center (BOC), and network operation center (NOC). These components provide integration with the reporting, monitoring and management facilities of the inventive production environment. To reduce the development cycle, common application and business logic services that are frequently re-created for each project will be able to be shared (following review and approval) across project teams via the builder module 184. Additionally, third-party web services can be developed and sold via the builder module 184, with usage generating a bill through the integrations with the AIP 186.

The hosted production environment (HPE) 188 can be tailored for the instance of the target hosting environment that the application service has been built upon. One advantage is that since third parties are brought in to the development cycle at an earlier stage, these third parties are involved in the development process from the beginning, and thus are able to provide higher service levels.

The HPE module 188 may comprise a Remote Run-Time environment that is targeted for the instance of the technology that the application service is built upon, and which is tightly integrated with the production monitoring systems and business system support (BSS)/operation system support (OSS) of the application infrastructure provider to provide high levels of service (e.g. 100% availability, development/testing simulation).

Through a hosting nm-time data center, the HPE module 188 supplies the execution architecture APIs that the application architecture utilizes to increase the end-to-end manageability of the application (e.g. NetCool). All the application servers and software/hardware are integrated within the HPE module 188 and are monitored at the Network Operations Center (NOC). The Application Operations Center (AOC) along with the Business Operations Center (BOC) provide robust application stability and performance monitoring, and business usage and trend analysis utilities with the HPE module 188.

The HPE module 188 also provides customers with centralized/automated environment management and code migration capabilities, enabling remote teams or remote team members to be more productive. The HPE module 188, along with the integrated development/testing environment, allows both developers and production administrators to collaborate their simulation closely and seamlessly. Furthermore, customers realize a reduction in investment capital for software/hardware configurations.

The Application Service Infrastructure Platform (AIP) module 186 of the present invention provides the mechanism for application delivery, discovery, user authentication, ubiquitous access, and user/subscriber based billing services. The AIP module 186 offers communication access to a lightweight directory assistance protocol (LDAP)-based service directory server through open eXtensible Markup Language (XML) protocol.

End-users (such as developers) are provided with access to the web application services through a portal 192 along with other application services via an open XML interface protocol. As a result of this open architecture, services are independent of operating system, programming language, or object model on both the server side and the client side. Thus, applications written in any language, using any component model, and running on any operating system can be delivered as Web services through the AIP module. The integrated AIP BSS/OSS systems provide the capability to bill for the use of these services in a per-usage or single-charge manner.

The AIP module 186 provides customers access to the e-services through a library of applications and application components that reside in the HPE module 188. Performance, availability, and integrity of the application services can be monitored and scale appropriately through the NOC, AOC, and BOC. Through the AIP module 186, an extensive and scalable LDAP database can be employed to control access to Internet services. The AIP module 186 reduces the time to market, and the development costs through reuse of previously developed software and components.

The system and method of the present invention require both data center facilities and operations services (application infrastructure providers) and integration with software development platforms/tools (Internet service vendors, hardware firms) to build, operate and scale the virtual software development environments.

The system and method of the present invention, along with the various components, will now be described with regard to a specific example. First, a project manager contacts a person working in sales for the present system, and signs a contract or uses online payment to use the DASP 180 for a specific technology, such as Siebel, implementation for Project XYZ. The operations team reviews and approves the request, triggering the Instantiator module 182 to create an instance of a Siebel DASP environment for the XYZ Project. The Instantiator 182 generates environment, tools, documentation, security framework, and interfaces with the AIP module 186 to bill for environment creation.

The operations team creates a new 'Project Manager' user for XYZ Project via the DASP portal 192. The DASP module 180 interfaces with the AIP module 186 to bill for user creation. Next, the Project manager logs in to the DASP module 180, the portal 192 displays 'Project Manager' specific services such as project planning, estimating, release management tools, ability to create new team members, and generates new environments. The DASP portal 192 displays content based on the user's role (in this case 'Project Manager').

The Project Manager uses a team member creation service to grant DASP module 180 access to team leads, developers, etc. The users are created via the DASP portal 192, and the DASP module 180 interfaces with the AIP module 186 to bill for user creation.

Next, developers log in to the DASP module 180, and the portal displays 'Developer' specific services such as a developer environment terminal, a version control tool, a defect tracking tool, object and data modeling tools, and builder module 184 services. The DASP portal 192 displays content based on the user's role (in this case 'Developer'). The builder module 184 displays services that can be integrated into the application. These services can include services designed specifically for the target environment (Siebel) as well as generic global services.

Developers then build applications, integrating (for example) three builder module 184 services; one performs logging, a second performs alarming to the Host's monitoring console, and the third is a third-party component for credit card validation. The developer uses the DASP-supplied development environment, version control, defect tracking, design tools, etc. The builder module 184 lists and integrates pre-built components, and communicates to the AIP module 186 for a one-time charge for architectural services, ongoing payment to third-party provider of credit card service. As development is near completion, the Project Manager uses the DASP portal 192 to purchase and create a testing environment. The Project Manager uses the DASP portal 192 to initiate the purchase, and the Instantiator module 182 creates a production-like Siebel testing environment that includes all services that will exist in production. The Instantiator module 182 then interfaces with the AIP module 186 to bill for the creation of the environment.

The release manager initiates migration to the test environment with the DASP-supplied configuration management services. The integrated configuration management services perform a full compilation, and migrates the necessary code, data, etc. into the testing environment.

Next, testing team members perform functional and performance testing, utilizing the DASP-provided automated testing tools, load testing tools, and defect tracking services. The use of load testing tools generates a bill via the AIP module 186 based on the duration of use of the load testing servers. The builder module-supplied logging and alarming components that have interfaces into the production management facilities are then tested to ensure proper interaction with the hosted production environment 188.

Iterative development continues with multiple software builds that migrate the application from the development environment into the test environment. The release management tool facilitates defect resolution, and patch migration.

When testing is near completion, the Project Manager uses the DASP portal 192 to purchase and create a production environment using the DASP portal 192. The Instantiator module 182 then creates the production Siebel environment, and interfaces with the AIP module 186 to bill for environment creation.

Next the HPE module 188 is created, and the tested, functional product can be migrated to the HPE module 188. Integrated release management tools perform the migration and initialization of a production application. The application runs in the HPE module 188. The builder-provided services integrate with production application. Architectural services integrate with hosting environment to log and alarm to the host's monitoring facilities. The AOC, BOC, and NOC provide ongoing monitoring and reporting of application, business, and network status, statistics, and stability. Reporting, logging, and alarming facilities built into the application that hook into the host may provide real-time trend analysis, performance and stability monitoring, and advanced debugging capabilities.

Figure 7:
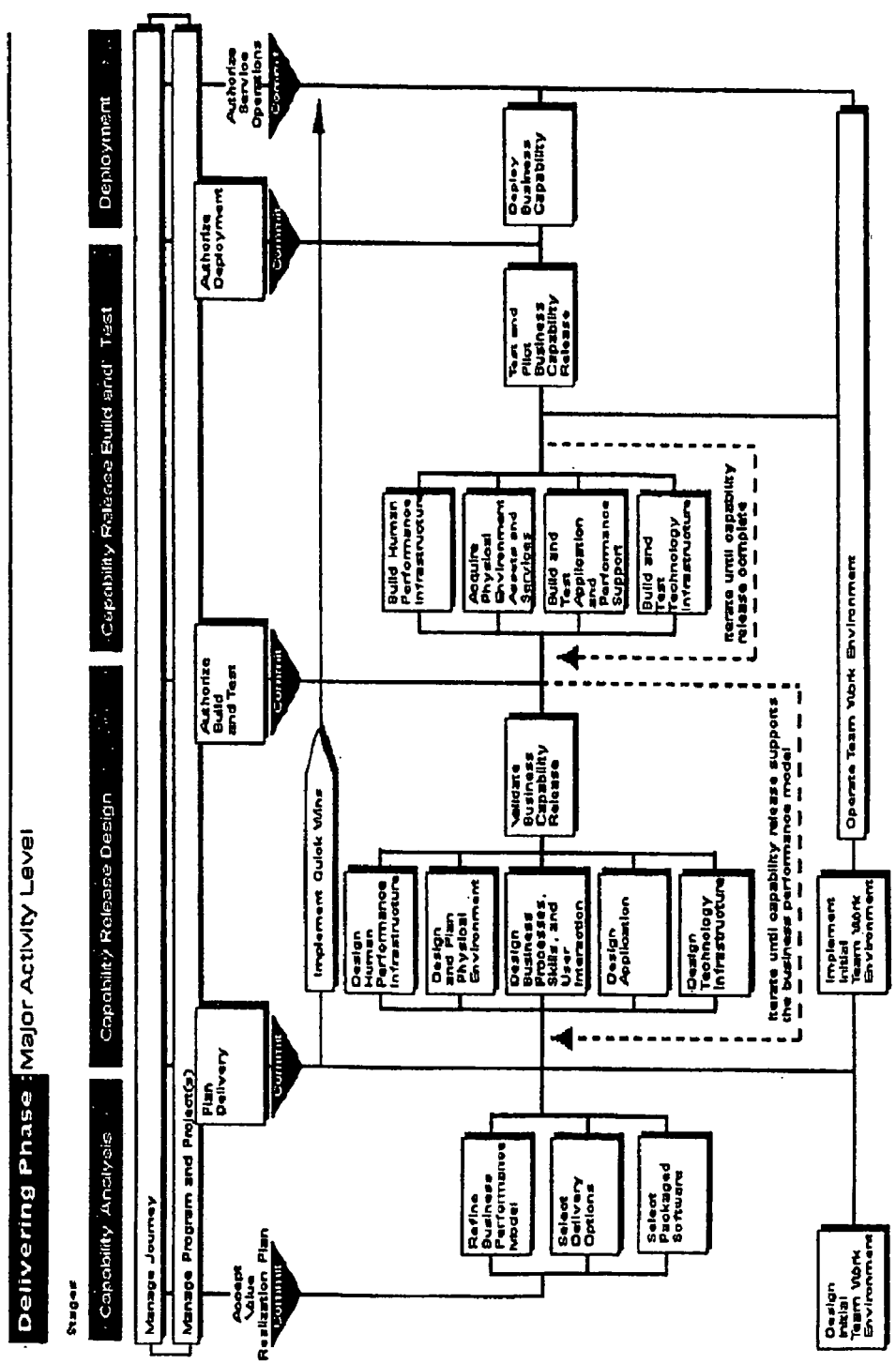
FIG. 7 is diagram illustrating a conventional manner of developing hosted Internet environments.
Figure 8:
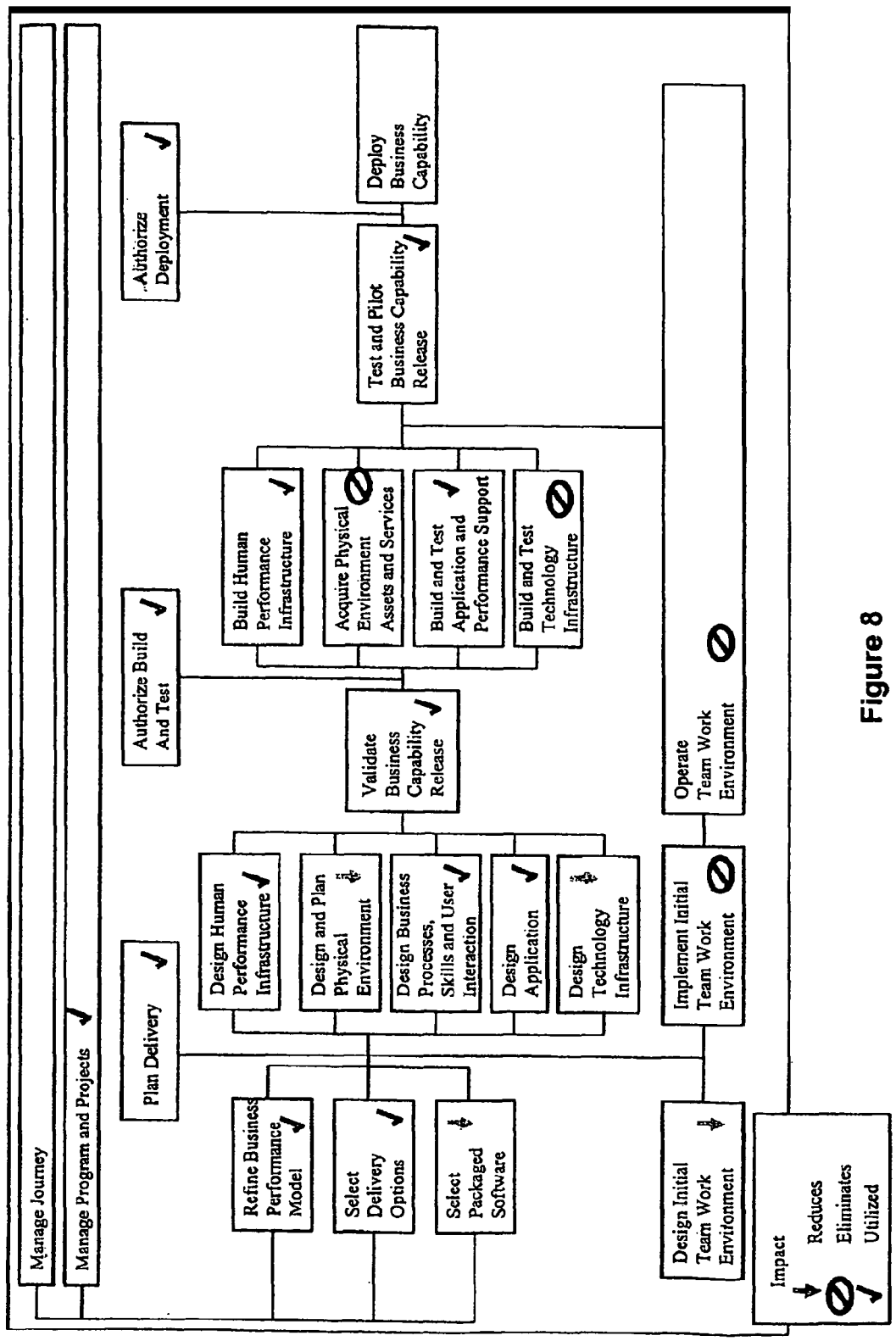
FIG. 8 is a diagram illustrating the system and method of developing Internet-hosted business applications composed of web services and software for use in such environments according to the present invention.

Compared with the conventional manner of developing hosted Internet environments, as illustrated in FIG. 7, the system and method of developing hosted business applications composed of web services according to the present invention reduces or eliminates numerous expenses and procedures, as illustrated in FIG. 8. In particular, the present system facilitates the selection of packaged software, the design and plan of a physical environment, the design of a technology infrastructure, and the design of an initial teamwork environment.

The system and method of developing hosted business applications composed of web services and software for use in such environments according to the present invention eliminates the steps of acquiring physical environment assets and services, the building and testing of the technology infrastructure, the implementation of the initial teamwork environment, and the operation of that teamwork environment.

The teamwork environment typically consists of the initial development environment, option engineering lab, initial networking infrastructure, initial communications environment, PC-based tools, design repository, knowledge management function, program management software, and/or model office.

Implementation of the initial teamwork environment conventionally consists of completing the implementation of the initial teamwork environment deliverable. This includes building or installing the initial teamwork environment components, conducting the appropriate test and verification steps, and deploying the teamwork environment to the projects to be supported. The system and method of developing hosted business applications composed of web services according to the present invention provides these services. The project team needs to only have PCs and access to the Internet.

The next step in conventional development is the operation of the initial teamwork environment. Ongoing maintenance and support for the teamwork environment is provided so that enhancements, identified and requested by the supported projects, are provided as appropriate. The teamwork environment is periodically updated with the latest versions of the technology infrastructure (i.e. hardware) to ensure that the supported projects are working in an environment that most effectively enables their efforts. The system and method of developing hosted business applications composed of web services according to the present invention provides these services.

Conventional development requires the management of the program and projects. Program management focuses on the continuous guidance needed to support the delivery of a business capability through multiple projects and releases.

Appropriate disciplines, techniques, and tools are used to plan and organize the work and to manage the incremental delivery of the new business capability. Project management focuses on providing specific deliverables, for example, process flows, job designs, business applications, and reward systems, through the balanced management of scope, quality, effort, risk, and schedule. Project management applies to the efforts coordinated by the programs, and also to stand-alone projects, which may be performed before the necessary program infrastructures have been established. The system and method of developing hosted business applications composed of web services according to the present invention provides the means for the project management to plan the delivery of the application, e.g., scheduling tests, code reviews, assigning tickets to developers, etc. The system and method of developing hosted business applications composed of web services according to the present invention provides a graphical representation of the business integration methodology to the project teams to help reduce the delivery risk.

Conventional plan delivery involves tailoring the delivery approaches for a specific release of the business capability, based on the capability delivery approach and information gathered in the capability analysis stage. In the capability release design stage plans and estimates are finalized. Estimates for work in the later stages of the delivery phase are refined, as well as for subsequent releases of the business capability. Commitment from the sponsoring organization to proceed with the capability release design stage is obtained. This task package is performed once for each business capability release, prior to initiating work in the capability release design stage. The system and method of developing hosted business applications composed of web services according to the present invention provides the means for the project management to plan the delivery of the application, e.g., schedule tests, code reviews, assign tickets to developers, etc.

Conventional development includes authorizing the build and test. This involves refining the capability release delivery approach, based on detailed information gathered in the capability release design stage, and finalization and commitment to the capability release build and test stage plans and estimates. These become the baselines against which the stage is managed. Estimates for work in the deployment stage, as well as for subsequent releases of the business capability should be refined. Commitment from the sponsoring organization to proceed with the capability release build and test stage of work should be obtained. The system and method of developing hosted business applications composed of web services according to the present invention provides the means for the project management to automatically authorize releases of the applications to different stages of the testing lifecycle.

Next the deployment should be authorized. This involves refining the remaining aspects of the capability release delivery approach, based on detailed information gathered in the capability release build and test stage, and finalization and commitment to the deployment stage plans and estimates. These will become the baselines against which the stage will be managed. Estimates for work in subsequent releases of the business capability should be refined. Commitment from the sponsoring organization to proceed with the deployment of the business capability release should be obtained. The system and method of developing hosted business applications composed of web services according to the present invention provides the means for the project management to automatically authorize releases of the applications to production.

The business performance model is refined by collecting the business capability requirements, defining the details of the business performance model, and establishing the deployment requirements. These requirements form the basis for assessing the implementation, operational, and other constraints in order to produce a detailed scope definition for the business capability and its releases. The system and method of developing hosted business applications composed of web services according to the present invention provides the front-end, storage and version control for the business requirements.

The next step is to select delivery options. This involves investigating a variety of delivery options for the business capability, and producing design and implementation recommendations for each set of options. Each of the recommended options should describe how the human performance, business process, application, and technology infrastructure elements will interact with each other to meet the required level of performance, clearly state the performance requirements for each set of options, and directly relate them to the business case. The system and method of developing hosted business applications composed of web services according to the present invention partners with the customer to ensure that the hosting solution is correct for the application-deployment requirements.

According to conventional development, the next step is the selection of packaged software. This involves evaluating and selecting third-party packaged software. The activities, outlined in this document, support selection as either part of a business architecture, business capability, or individual capability release. Within the methodology, selection of packaged software is supported at three points: the business architecture stage, the capability analysis stage, and the capability release design stage. Packaged software selected during the business architecture stage is viewed as essential as it defines the business architecture. This type of selection would be done when the selected packaged software is needed to define the business architecture. However, the need for packaged software can be identified during the planning phase without selecting the particular package. In this case, the business architecture identifies the structure and high-level functionality that is needed and then, during the capability analysis stage, the packaged software is selected as part of the business capability to fit within the constraints of the business architecture blueprint. Packaged software selected during the capability release design stage is selected to fill a gap in functionality identified while analyzing the application requirements specification deliverable.

The system and method of developing Internet-hosted business applications composed of web services according to the present invention provides many different software tools in-scope in the development environment. The project team determines if the technology requirements for the project are met by system, and if so, then the system provides access to these applications, e.g., the development environment, testing environment, production support, to the project team. If new capabilities are required, the system can work with the project team to support these capabilities.

The design of the human performance infrastructure is the next step in conventional development. This involves designing the organization, performance management, and performance enhancement infrastructures. These designs include definitions of new competencies, roles, jobs, and teams within a sponsoring organization. The human performance infrastructure establishes the basis for managing and sustaining improvements in work force proficiency and skills, and for aligning responsibilities with the business processes and outcomes. The system and method of developing Internet-hosted business applications composed of web services according to the present invention provides the front-end, servers, editors, methodology, storage, relevant content and version control for the human performance designs.

Conventional development entails the design and planning of a physical environment. Such designing and planning involves identifying and resolving the overall design and planning issues related to the physical environment, including the facilities, layout, and equipment. The detailed designs and requirements for the physical environment should be established. The design of the environment is facilitated by the materials/assets provided by the system and method of developing Internet-hosted business applications composed of web services according to the present invention. The project team interacts with the system to specify requirements.

Design of the business processes, skills and user Interaction is the next step in conventional development. This entails creation of the new business processes and definition of their interactions with the workforce (Skills), applications (Application Interaction), and Physical Environment. This work produces the capability interaction model, which forms the basis for the detailed capability requirements and demonstrates the detailed interactions between human performance, business process, and technology. For packaged software solutions, instead of defining new business processes, the predefined business processes that support the packaged software are used as a starting point to ensure full utilization of the selected packaged software. The system and method of developing Internet-hosted business applications composed of web services according to the present invention provides the front-end, servers, editors, methodology, storage, relevant content and version control for the business processes designs.

Conventional application design includes the analysis and design of custom applications as well as the installation and configuration of packaged software. This involves the creation of key design deliverables, plus the identification of inventories and estimating factors that drive the estimate of the application detailed design and build and test effort. The system and method of developing Internet-hosted business applications composed of web services according to the present invention provides the front-end, servers, editors, methodology, storage, relevant content and version control for the application designs.

The technology infrastructure is designed next in conventional development. This involves the design of the components of the technology infrastructure, including the execution, development, and operations architectures, and the design of the network, communication, and computing platforms. The work may be coordinated with the development of the information technology (IT) processes and organizational changes required to support the new infrastructure. The system and method of developing Internet-hosted business applications composed of web services according to the present invention provides APIs to interact with the hosting run-time environment—and provides access to the operations engineers to help perform these tasks—ensuring the application is designed appropriately.

Next, conventional development validates the business capability release. The performance characteristics of the business capability may be validated against the business performance model deliverable. This validation includes evaluating the integration or "fit" across the capability's elements. These tests are executed in the capability release build and test stage. The system and method of developing Internet-hosted business applications composed of web services according to the present invention provides the front-end, testing servers, editors, methodology, storage, relevant content, and version control for the testing materials (test cases, test scripts, and test data).

A human performance infrastructure may be built. To do this the basic foundations of a human performance infrastructure may be created by developing the programs needed to evaluate, compensate, develop, and recruit personnel for the capability. Policies and procedures for these major aspects of human performance may be developed. Changes to the human performance infrastructure can include changes to the human resources operations, tools, and organization. The system and method of developing Internet-hosted business applications composed of web services according to the present invention provides the front-end, servers, editors, methodology, storage relevant content, and version control for these materials.

Next, the physical environment assets and services may be acquired. This is done to determine which new facilities, equipment, and services may be acquired in order to operate the business capability. A procurement strategy for selecting and appointing vendors may be developed, the acquisition plan may be mobilized, and the expected costs and results of each vendor appointment may be evaluated. This supports managing the specification and acquisition process, while the actual processes of building new facilities and installing new equipment is handled through specialists. The system and method of developing Internet-hosted business applications composed of web services according to the present invention provides the physical assets. The project team works with the present system to determine the appropriate requirements of these assets.

Application and performance support may be built and tested. To build and test the application, training materials, media content, and other forms of performance support required by the business capability may be developed. The detailed design, component testing, and assembly testing of the application may be developed. Further, the learning materials following the instructor-led, goal-based scenario, or computer-based learning approaches may be produced. Business policies and procedures along with their related performance support mechanisms, likewise, may be created. The system and method of developing Internet-hosted business applications composed of web services according to the present invention provides the front-end and storage solutions to develop these materials/applications. Appropriate reviews can also be facilitated using present system. All versions of code and test scripts/data are stored in present system. AU builds/compiles are performed by the present system.

Conventional development requires the building and testing of the technology infrastructure. The task packages required here implement the additions and extensions to the execution, development, and operations architectures. The physical network and computing resources may be developed and tested as a unified product prior to the application product test. These tests should include changes to information technology (IT) processes and organization to ensure improvements to the organization's technology capability. The system and method of developing Internet-hosted business applications composed of web services according to the present invention provides the technology infrastructure— the project teams need to build their applications to the present system specification (using the appropriate reviews/ quality assurances and APIs) and then conduct the appropriate tests.

Next, the business capability release may be tested and piloted. The product level and overall capability are tested to evaluate the integration and operation of the business capability release. These tests start with a controlled test of the application and its interaction with the technology infrastructure. These tests progress to a pilot of the business capability that evaluates the capability in the operational environment.

The system and method of developing Internet-hosted business applications composed of web services according to the present invention is utilized to test the functionality of the system. The hosting partner may provide the technology infrastructure (e.g. staging environment).

Finally, the business capability is deployed. This establishes the new business capability and transitions the workforce, policies, and management procedures required to sustain the new performance levels. This major activity is repeated for each deployment unit within the organization that will receive the new capability.

Continual efficiencies can be expected in the areas where the inventive system is utilized due to: centralized code reviews and quality assurance, automatic business integration methodology workflow to help reduce delivery risk, increased productivity of remote teams/team members, maintenance of a central repository for all design documentation, the coordination of project metrics, and the centralization/automation of the environment management and code migration.

With regard to the execution architecture of the system and method of the present invention, the interface between the applications and the operating systems and databases is where the traditional delineation of responsibilities occurs between customer and the managed services provider. It is important to have well-written applications that are tightly integrated with the production monitoring systems and BSS/OSS of the application infrastructure provider to provide high levels of service (e.g. 100% availability). As illustrated in FIG. 9, the system and method according to the present invention provides application developers standard APIs that plug and play into the applications infrastructure providers monitoring systems. The new development environment supplies the execution architecture APIs that the application architecture utilizes to increase the end-to-end manageability of the application.

Figure 10:
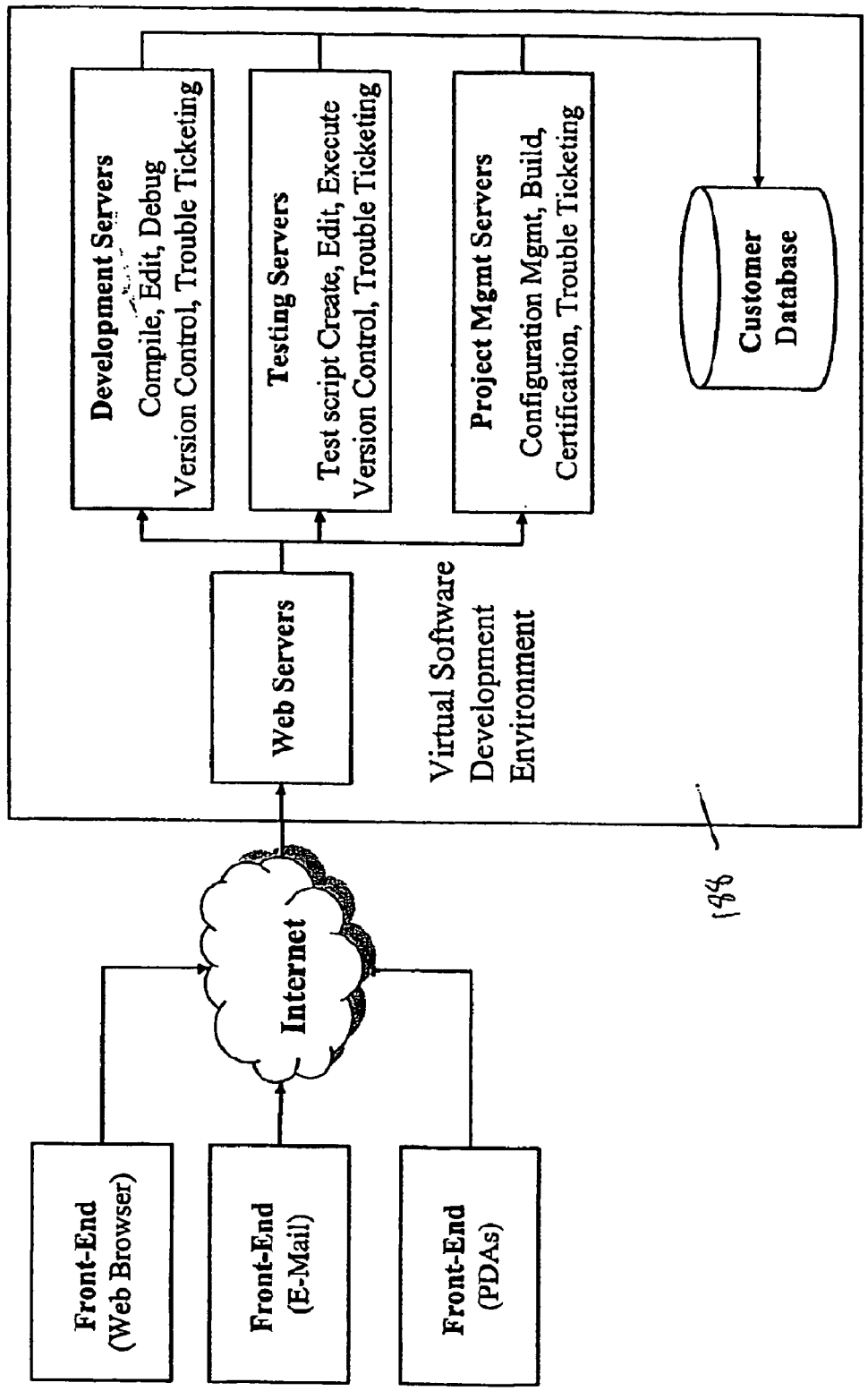
FIG. 10 is a block diagram illustrating the virtual software development environment according to the present invention.

FIG. 10 is a block diagram illustrating the virtual software development environment according to the present invention. Here front-end elements, a web browser, e-mail, and PDAs all connect to web servers via the Internet. The web servers are connected to the Development, Testing and Project Management Servers, which in turn are connected to the Customer database. The virtual software development environment, which is the hosted development environment 188, includes all of the foregoing servers as well as the customer database.

Figure 11:
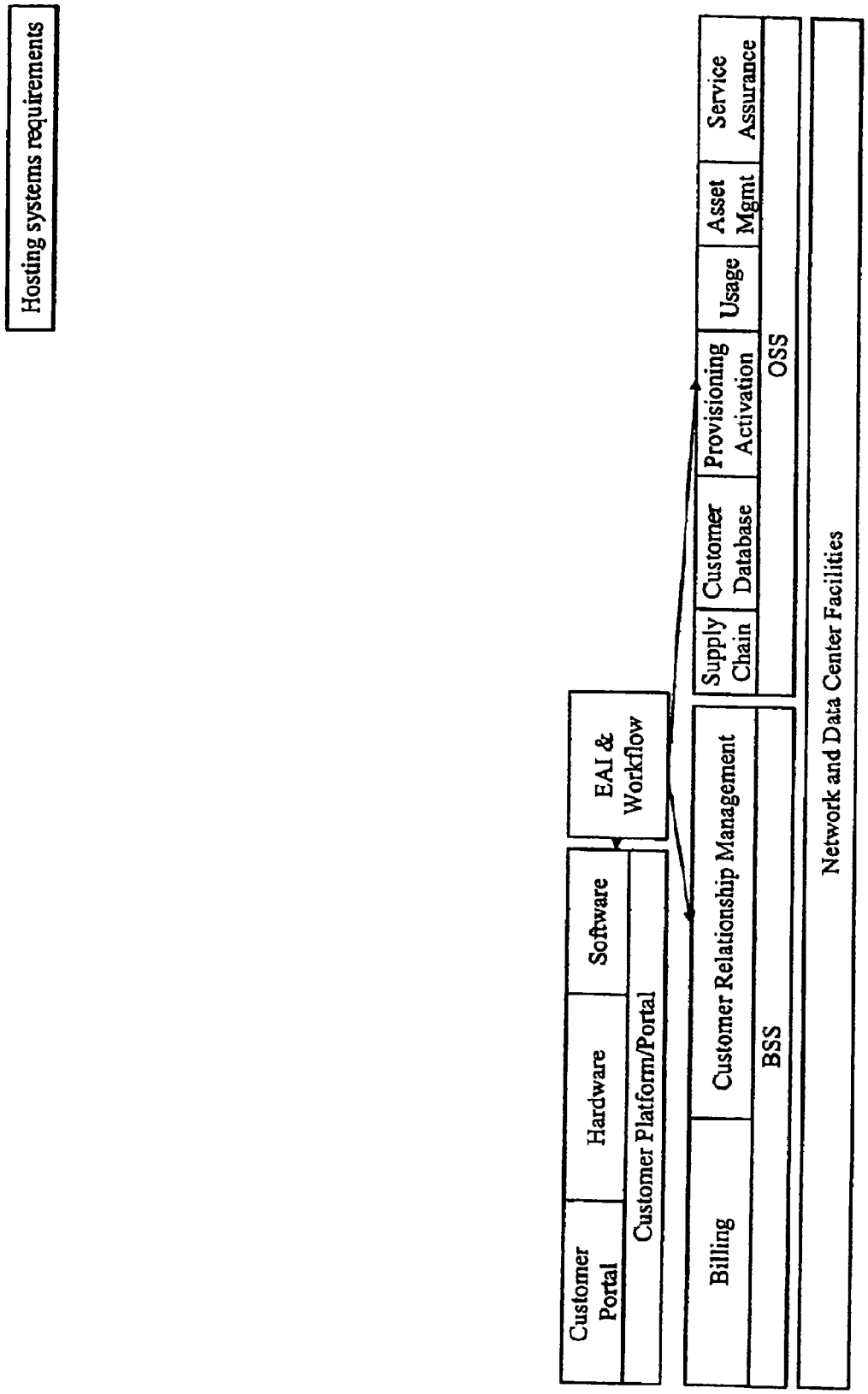
FIGS. 11 and 12 are block diagrams illustrating the hosting system components and the ASP system components, respectively.
Figure 12:
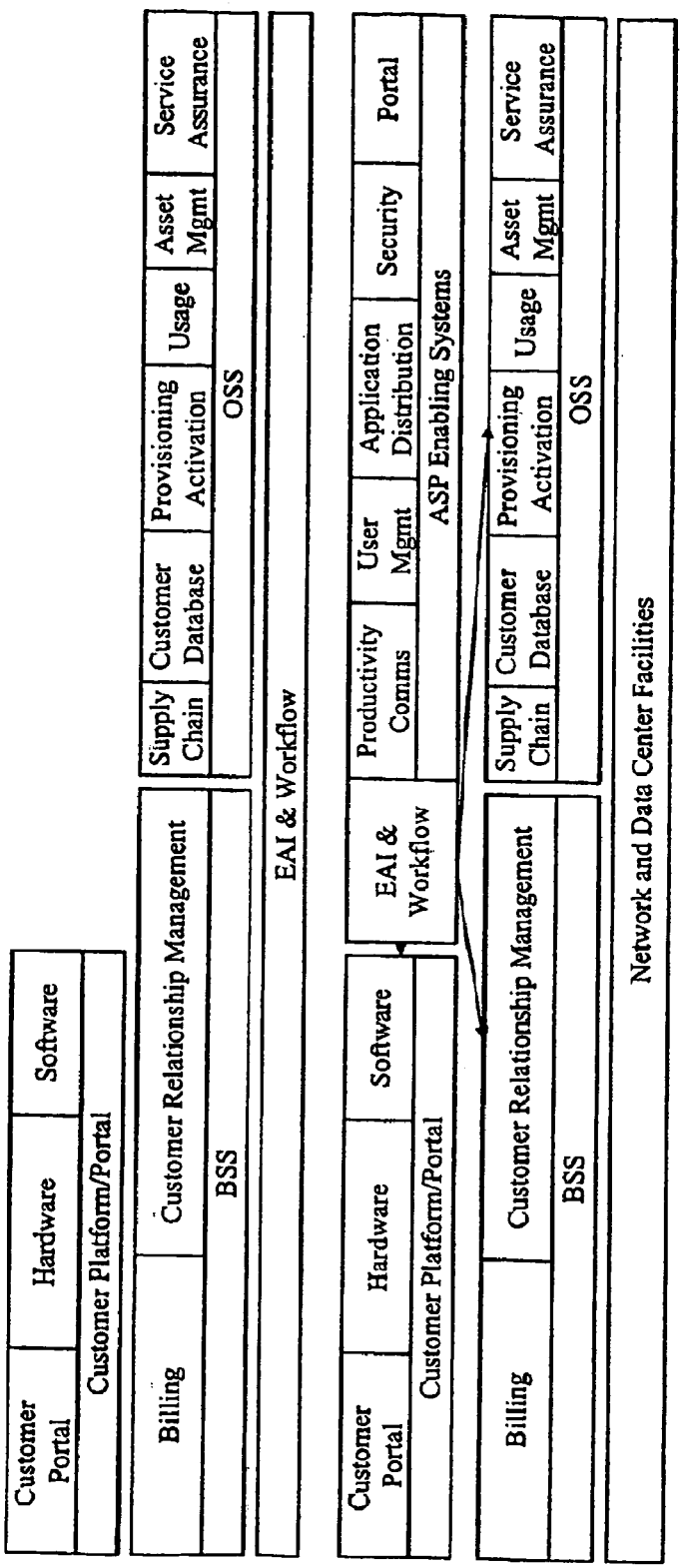
Figure 13:
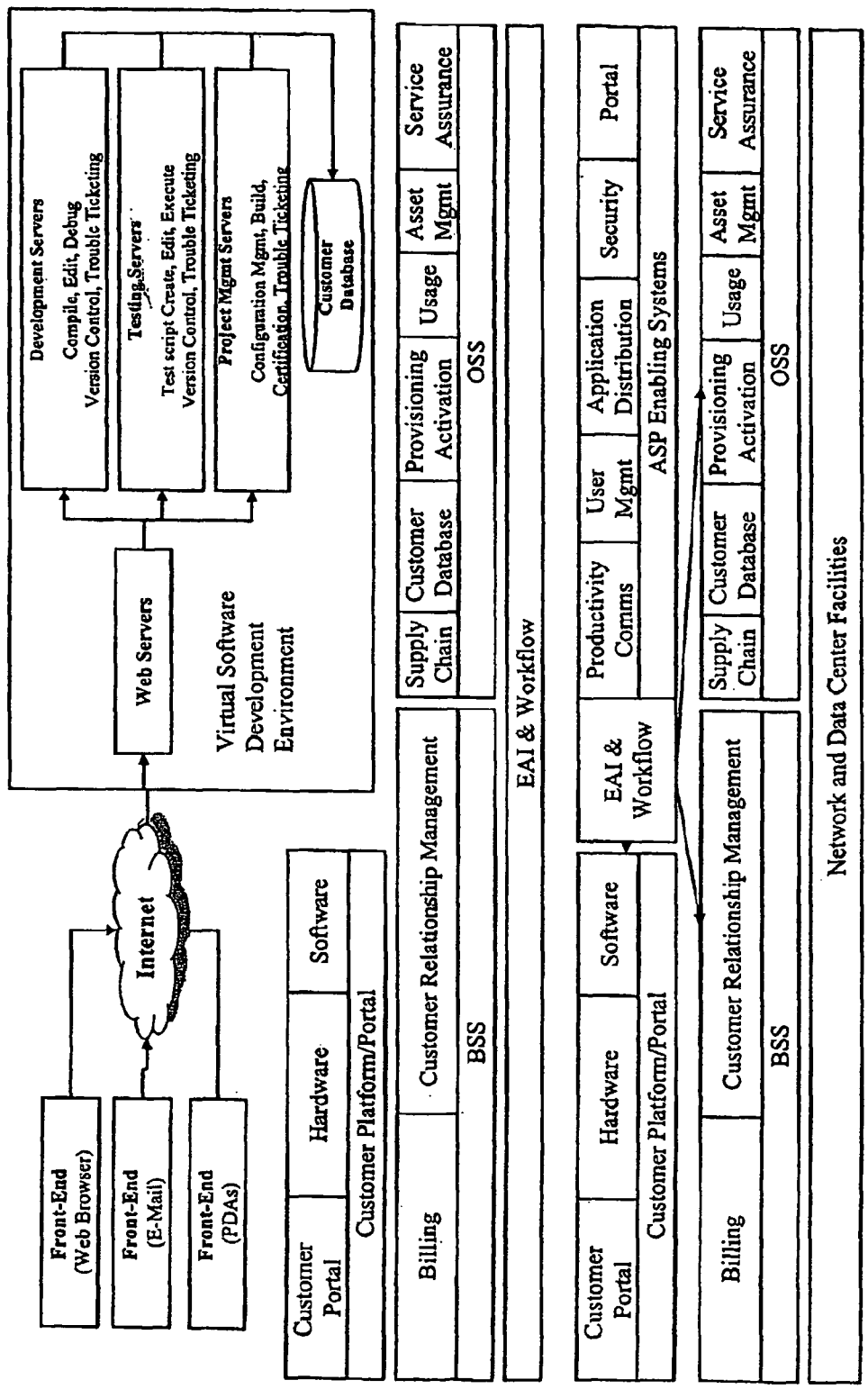
FIG. 13 is a block diagram showing how responsibility for the components is shared throughout the environment development.

FIGS. 11 and 12 illustrate the hosting system components and the ASP 186 system components, respectively. FIG. 13 is a block diagram showing how responsibility for the components is shared throughout the environment development. The system integrator and the hosting provider 194 share service level responsibilities during design, development, testing, and staging phases. The hosting provider assumes full responsibility at the production phase. During the development stage, responsibility for the applications, APIs, and hosting runtime are shared by both the hosting provider and the systems integrator. During testing, responsibility for the applications, APIs, event simulators and end user testing are shared by the hosting provider and the systems integrator. Similarly, the hosting provider and the systems integrator share responsibility for the applications, APIs, runtime environment and end user testing during staging. The Applications, runtime APIs, hosting environment and actual users are the sole responsibility of the hosting provider during production.

In general, the system and method of the present invention operate so that after a client expresses a desire for an Internet-hosted and web services-based business application, the client is interviewed to create a record of the features and functionality required. Next the business case or model that the environment is based on, a system definition, user requirements, functional requirements, technical requirements, a use case, various components, a user interface, an operational sequence, classifications, and data design models are determined to develop recommendations for the environment. These recommendations include proposed applications for use in the environment. In the event that applications have to be developed from the ground up, such applications are stored in a data library so that they can be used again for development of a future environment, thereby potentially reducing the amount of work required to develop subsequent environments.

The operation of the system and method for developing Internet-hosted business applications composed of web services and software for use in such environments according to the present invention will now be described with reference to the flow charts shown in FIGS. 14-21.

FIGS. 14a-14l are flow charts illustrating the design process and development of environmental requirements, according to the system and method for developing Internet-hosted business applications composed of web services of the present invention. In step 200, shown in FIG. 14a, a user starts a requirements and design tool. The user then opens a business case tool in step 202. A decision is made in step 204 whether the business case is complete. If the business case is complete, the user opens a system definition tool in step 206, show in FIG. 14b.

If the answer to step 204 is NO then the user creates or edits the business case in step 208, and saves the business case in step 210. In step 212 the business case is versioned and saved as XML. Next the user submits the business case for review in step 214. A reviewer automatically sends a message to the requirements and design manager in step 216, which the Manager receives in step 218. The business case creator then receives notice of approval or additional edits needed in step 220. In step 222 a decision is made whether the business case is approved. If YES then the user opens a system definition tool in step 206, show in FIG. 14b. If NO then the system returns to step 208.

After step 206, a decision is made whether the system definition is complete and approved in step 224. If YES then the user opens the requirements tool in step 226 shown in FIG. 14c. If NO then the user creates and edits the system definition in step 228, and the definition is saved in step 230, and the system definition is versioned and saved as XML in the data repository in step 232. The user then submits the system definition for review in step 234. The reviewer automatically sends a message to the Requirements and Design Manager in step 236, which the Manager receives in step 238. The System Definition creator then receives notice of approval or additional edits needed in step 240. In step 242 a decision is made whether the System Definition is approved. If YES then the user opens a system definition tool in step 226, show in FIG. 14c. If NO then the system returns to step 228.

Once the user has opened the User Requirement tool in step 226, a decision is made whether the User Requirements are complete in step 244. If YES, then the User opens a Functional Requirements Tool in step 246, shown in FIG. 14d. If the User Requirements are not complete then a decision is made whether the client interview notes are available in step 248. If the client interview notes are available then the user opens and references them in step 250. The user can then create or edit the user requirements in step 252. If the client interview notes are not available in step 248, then step 252 is followed, skipping step 250. Next the user saves the requirements in step 254, and the user requirements are versioned and saved in XML in the document repository in step 256. The user then submits the user requirements for review in step 258. The reviewer automatically sends a message to the Requirements and Design Manager in step 260, which the Manager receives in step 262. The user requirements creator then receives notice of approval or additional edits needed in step 264. In step 266 a decision is made whether to approve the user requirements. If YES then the user opens a Functional Requirements Tool in step 246, show in FIG. 14d. If NO then the system returns to step 248.

After step 246, a decision is made whether the functional requirements are complete and approved in step 267. If yes then the user opens the Technical Requirements tool in step 268, shown in FIG. 14e. If the functional requirements are not complete and approved, then a decision whether the user requirements are available is made in step 270. If the user requirements are available then the user opens and references them in step 272. The user can then create or edit the functional requirements in step 274. If the user requirements notes are not available in step 270, then step 274 is followed, skipping step 272. Next the user saves the functional requirements in step 276, and the functional requirements are versioned and saved in XML in the document repository in step 278. The user then submits the user requirements for review in step 280. The reviewer automatically sends a message to the Requirements and Design Manager in step 282, which the Manager receives in step 284. The functional requirements creator then receives notice of approval or additional edits needed in step 286. In step 288 a decision is made whether to approve the functional requirements. If YES then the user opens the Technical Requirements Tool in step 268, show in FIG. 14e. If NO then the system returns to step 270.

Figure 14A:
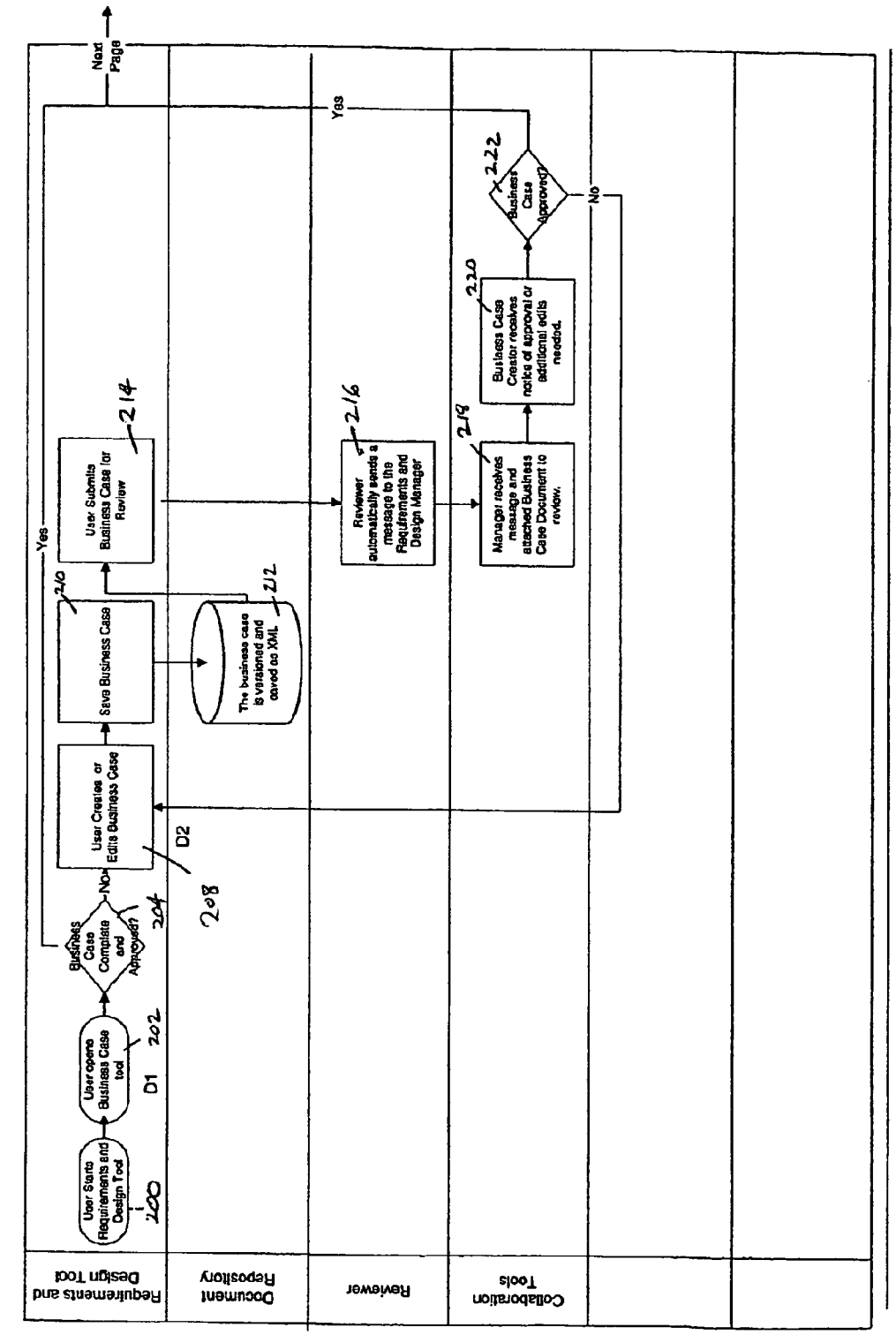
Figure 14B:
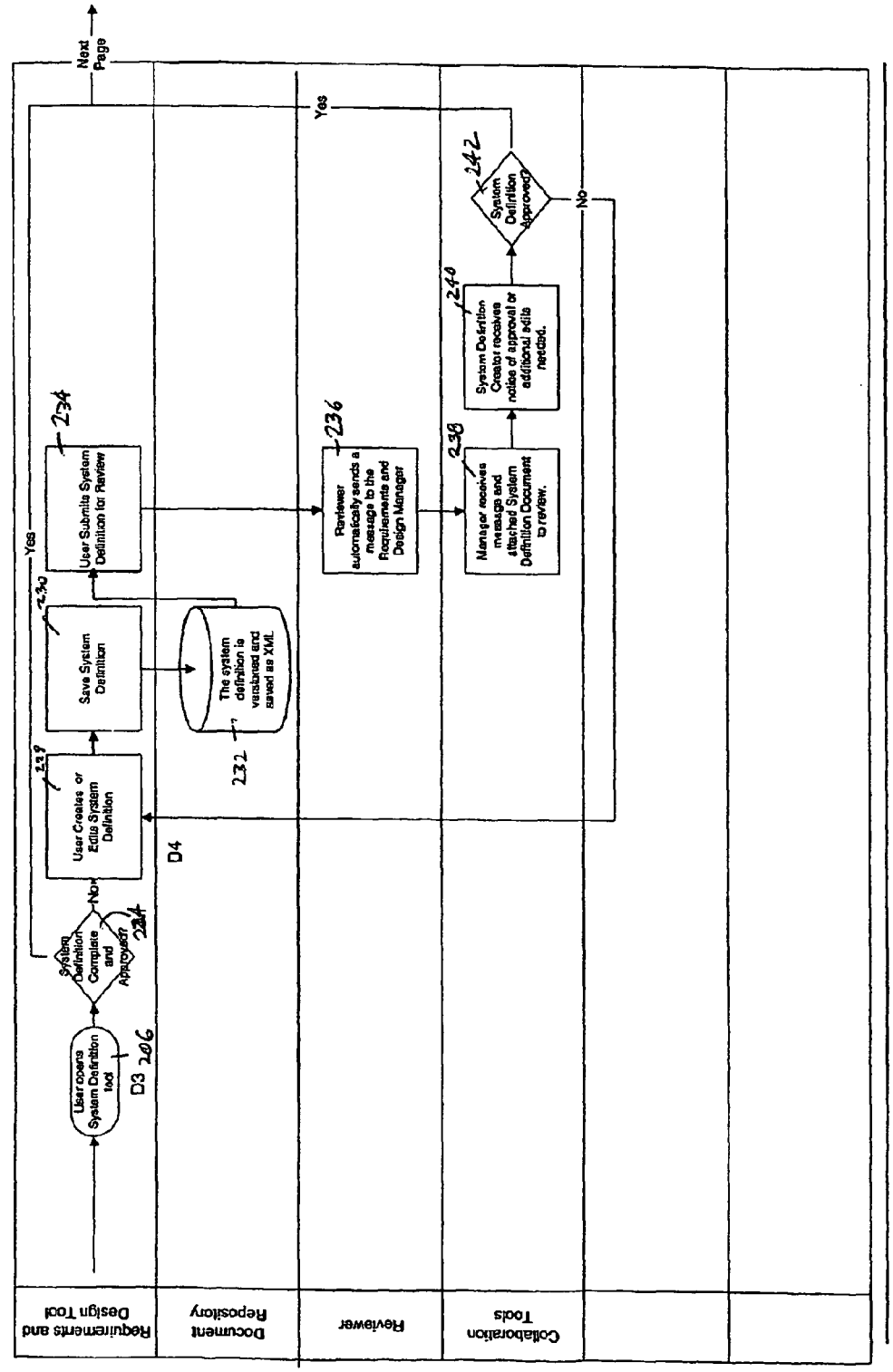
Figure 14C:
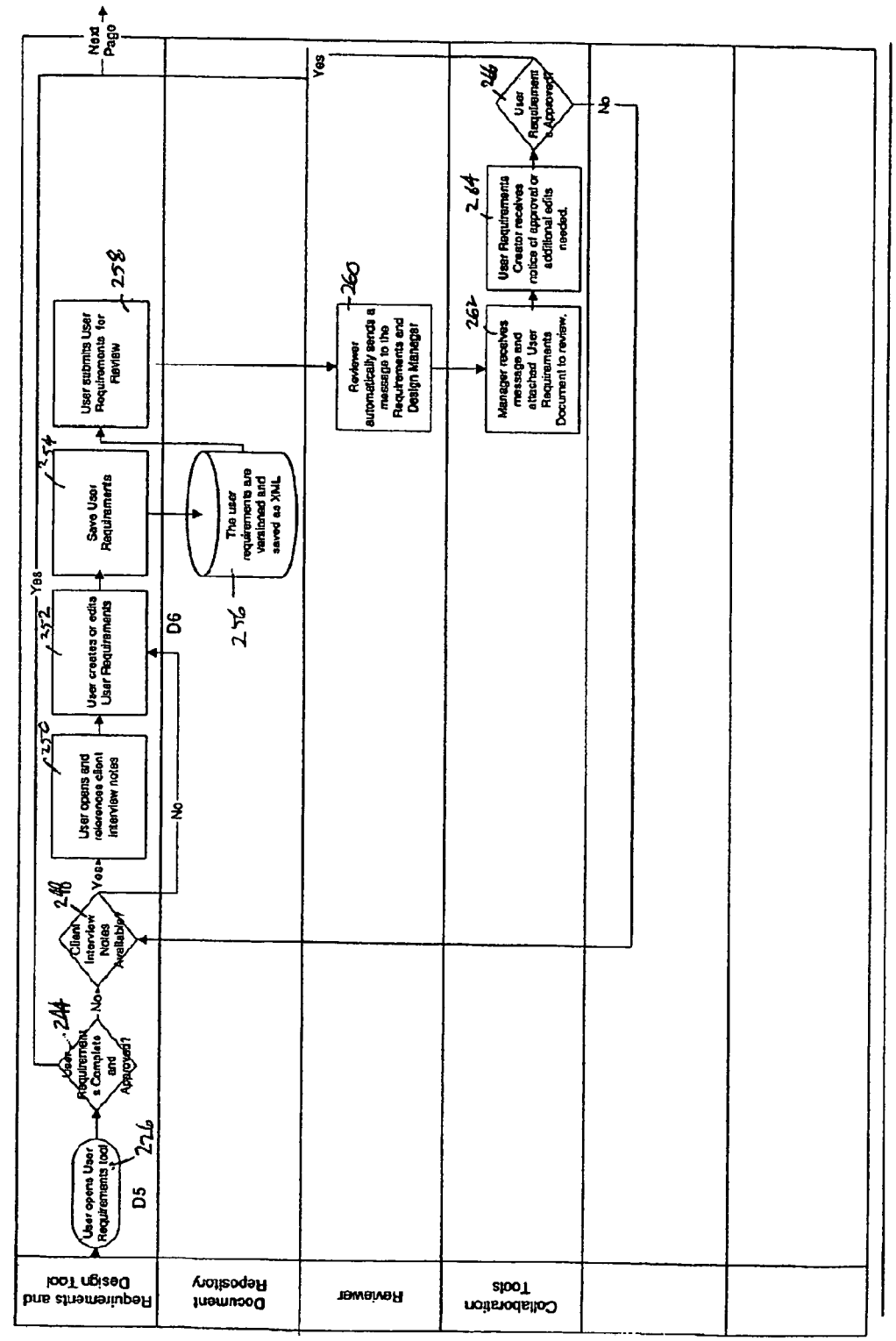
Figure 14D:
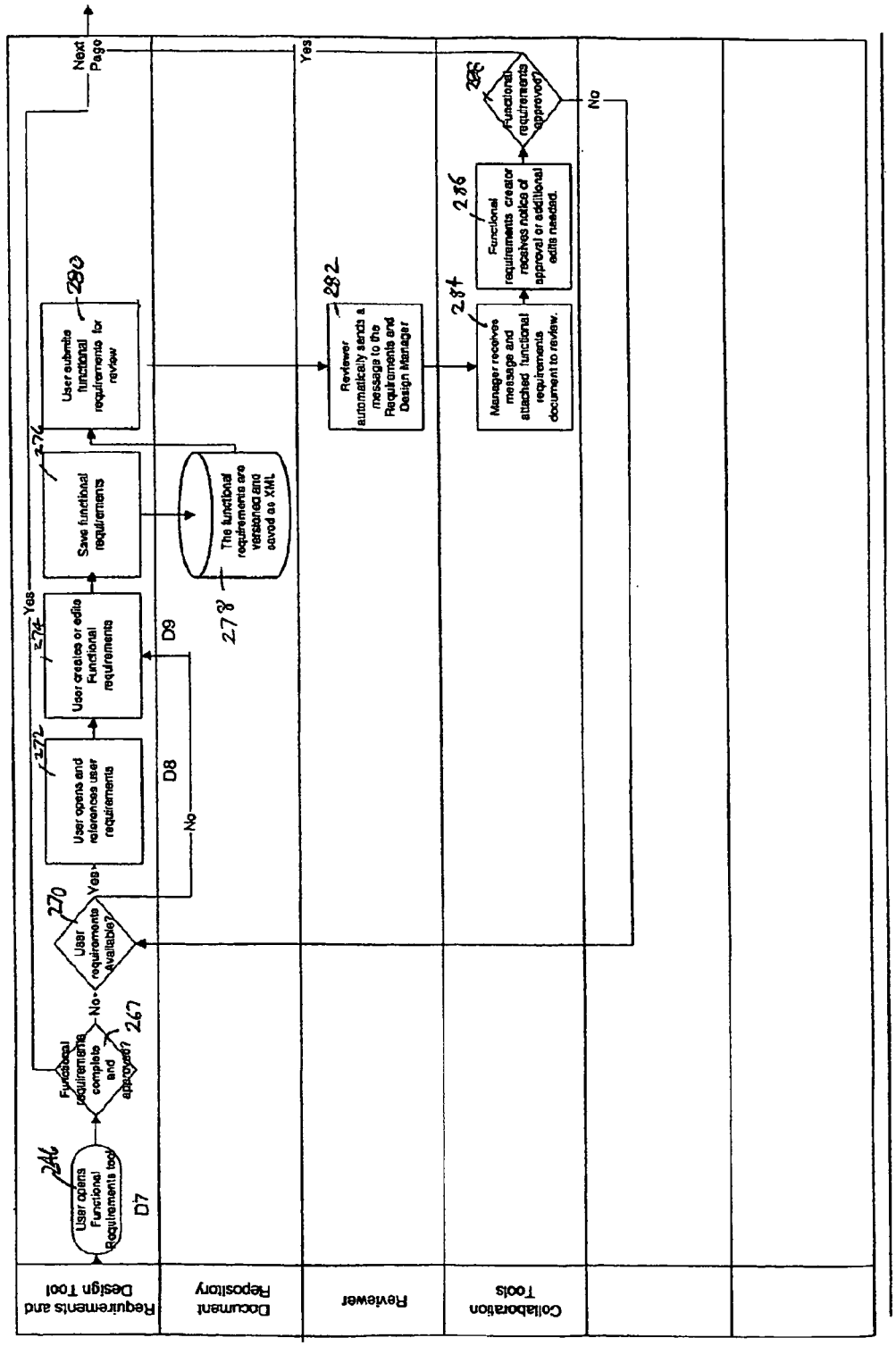
Figure 14E:
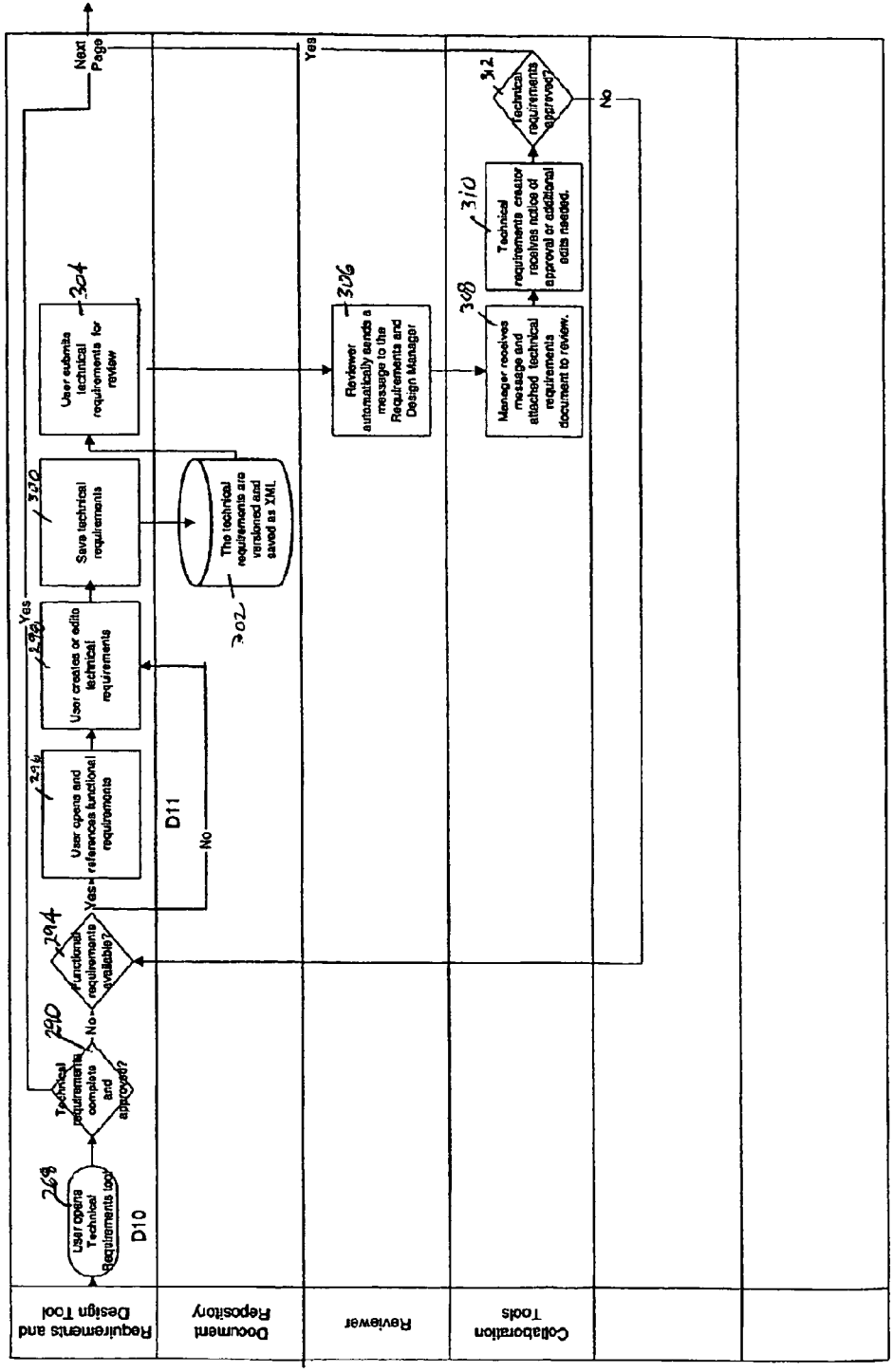

In FIG. 14e, after step 268, a decision is made whether the technical requirements are complete and approved in step 290. If yes then the user opens the Use Case Tool in step 292, shown in FIG. 14f. If the functional requirements are not complete and approved, then a decision whether the functional requirements are available is made in step 294. If the functional requirements are available then the user opens and references them in step 296. The user can then create or edit the technical requirements in step 298. If the functional requirements are not available in step 294, then step 298 is followed, skipping step 296. Next the user saves the technical requirements in the document repository in step 300, and the technical requirements are versioned and saved in XML in step 302. The user then submits the user requirements for review in step 304. The reviewer automatically sends a message to the Requirements and Design Manager in step 306, which the Manager receives in step 308. The technical requirements creator then receives notice of approval or additional edits needed in step 310. In step 312 a decision is made whether to approve the technical requirements. If YES then the user opens the Use Case Tool in step 292, show in FIG. 14f. If NO then the system returns to step 294.

Figure 14F:
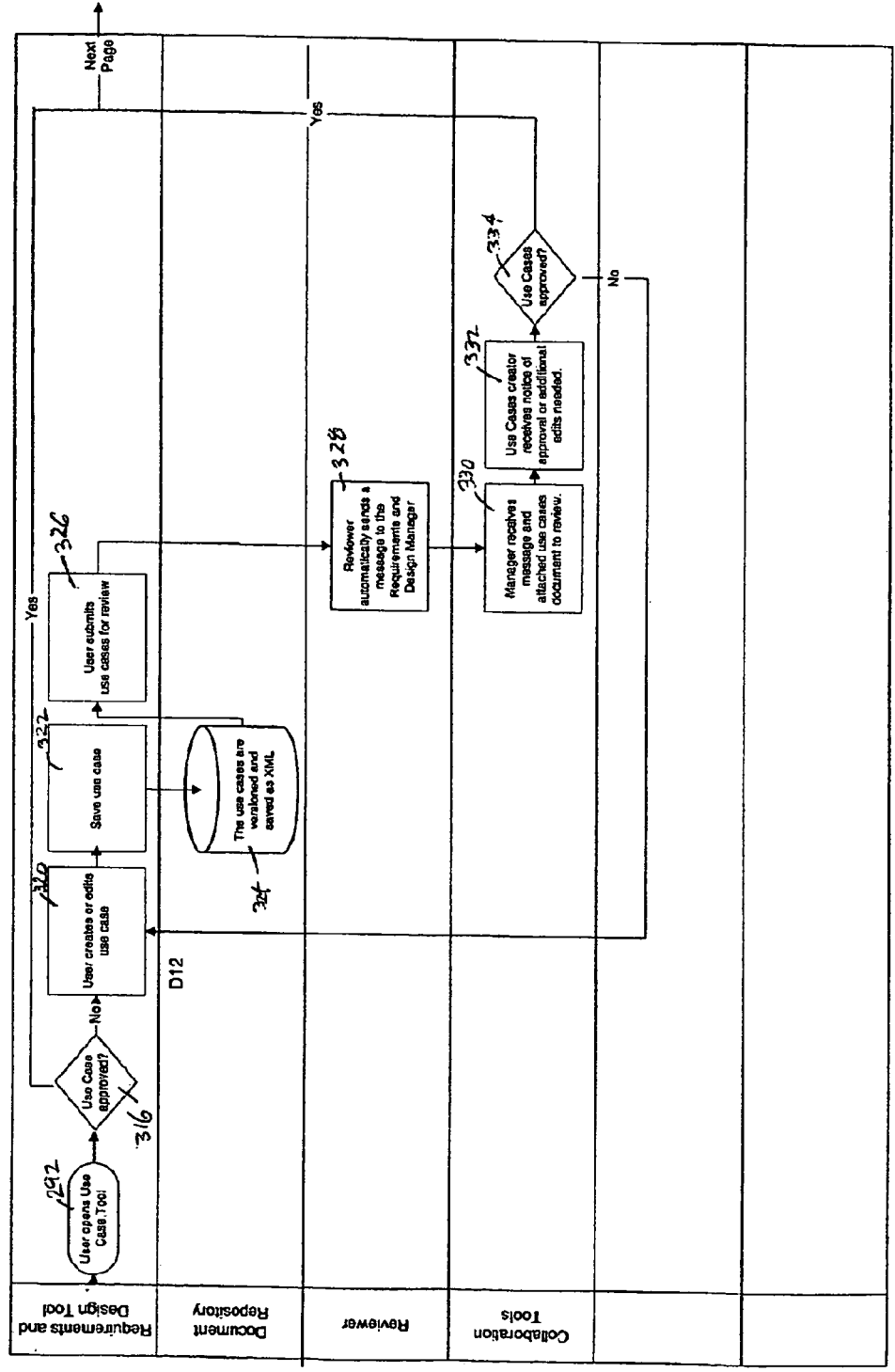

After the user has opened the Use Case Tool in step 292, shown in FIG. 14f, a decision is made whether the Use Case is approved in step 316. If the use case is approved, the user opens a component tool in step 310.8, shown in FIG. 14g. If the use case is not approved in step 316 then the user creates or edits the use case in step 320, and saves the use cases in step 322. In step 324 the use cases are versioned and saved as XML in the document repository. Next the user submits the use cases for review in step 326. A reviewer automatically sends a message to the requirements and design manager in step 328, which the Manager receives in step 330. The use case creator then receives notice of approval or additional edits needed in step 332. In step 334 a decision is made whether the use case is approved. If YES then the user opens the component tool in step 318, show in FIG. 14g. If NO then the system returns to step 320.

Upon opening the component tool in step 320, shown in FIG. 14g, a decision is made whether the components are approved in step 338. If the components are approved, the user opens a user interface tool in step 340, shown in FIG. 14h. If the components are not approved in step 338 then the user creates or edits the components in step 342, and saves the components in step 344. In step 346 the components are versioned and saved as XML in the document repository. Next the user submits the components for review in step 348. A reviewer automatically sends a message to the requirements and design manager in step 350, which the Manager receives in step 352. The component creator then receives notice of approval or additional edits needed in step 354. In step 356 a decision is made whether the components are approved. If YES then the user opens the user interface tool in step 360, show in FIG. 14h. If NO then the system returns to step 342.

Figure 14H:
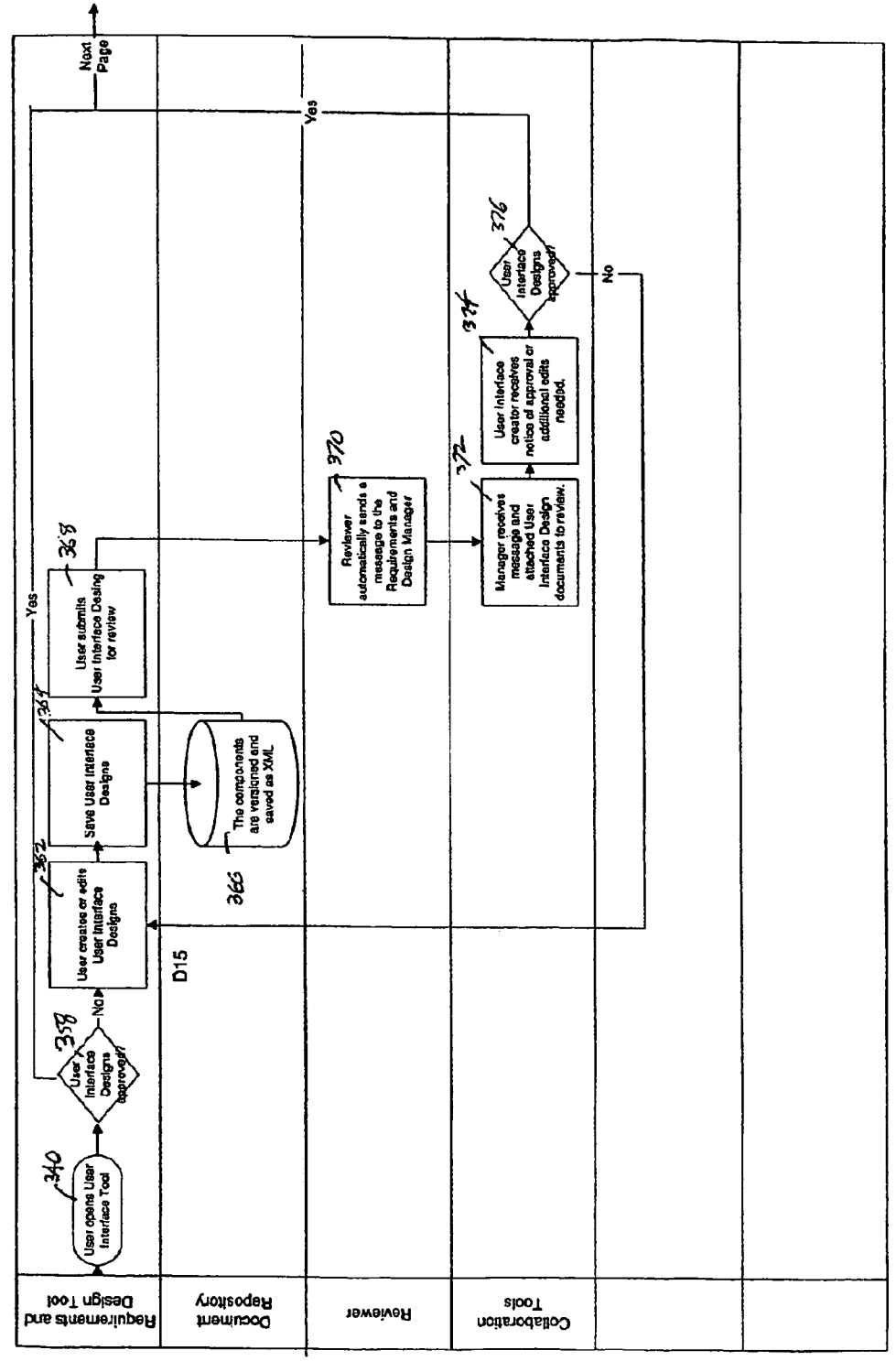

Next, as shown in FIG. 14h, after the user opens the user interface tool in step 340, a decision is made whether the user interface designs are approved in step 358. If the user interface designs are approved, the user opens a sequence diagrams tool in step 360, shown in FIG. 14i. If the user interface designs are not approved in step 358 then the user creates or edits the user interface designs in step 362, and saves the user interface designs in step 364. In step 366 the user interface designs are versioned and saved as XML in the document repository. Next the user submits the user interface designs for review in step 368. A reviewer automatically sends a message to the requirements and design manager in step 370, which the Manager receives in step 372. The user interface creator then receives notice of approval or additional edits needed in step 374. In step 376 a decision is made whether the user interface designs are approved. If YES then the user opens the sequence diagrams tool in step 360, show in FIG. 14i. If NO then the system returns to step 362.

Figure 14I:
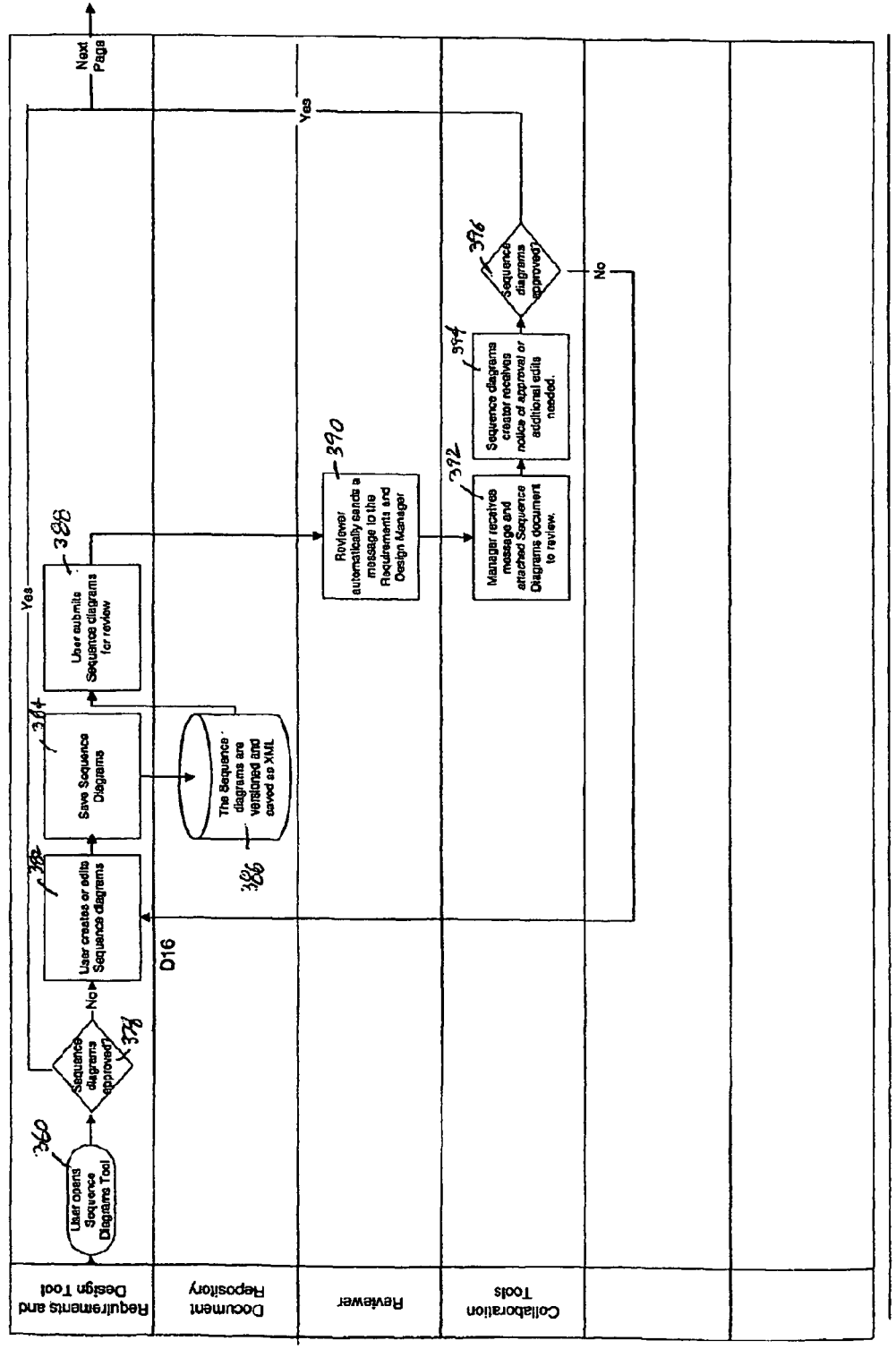
Figure 14J:
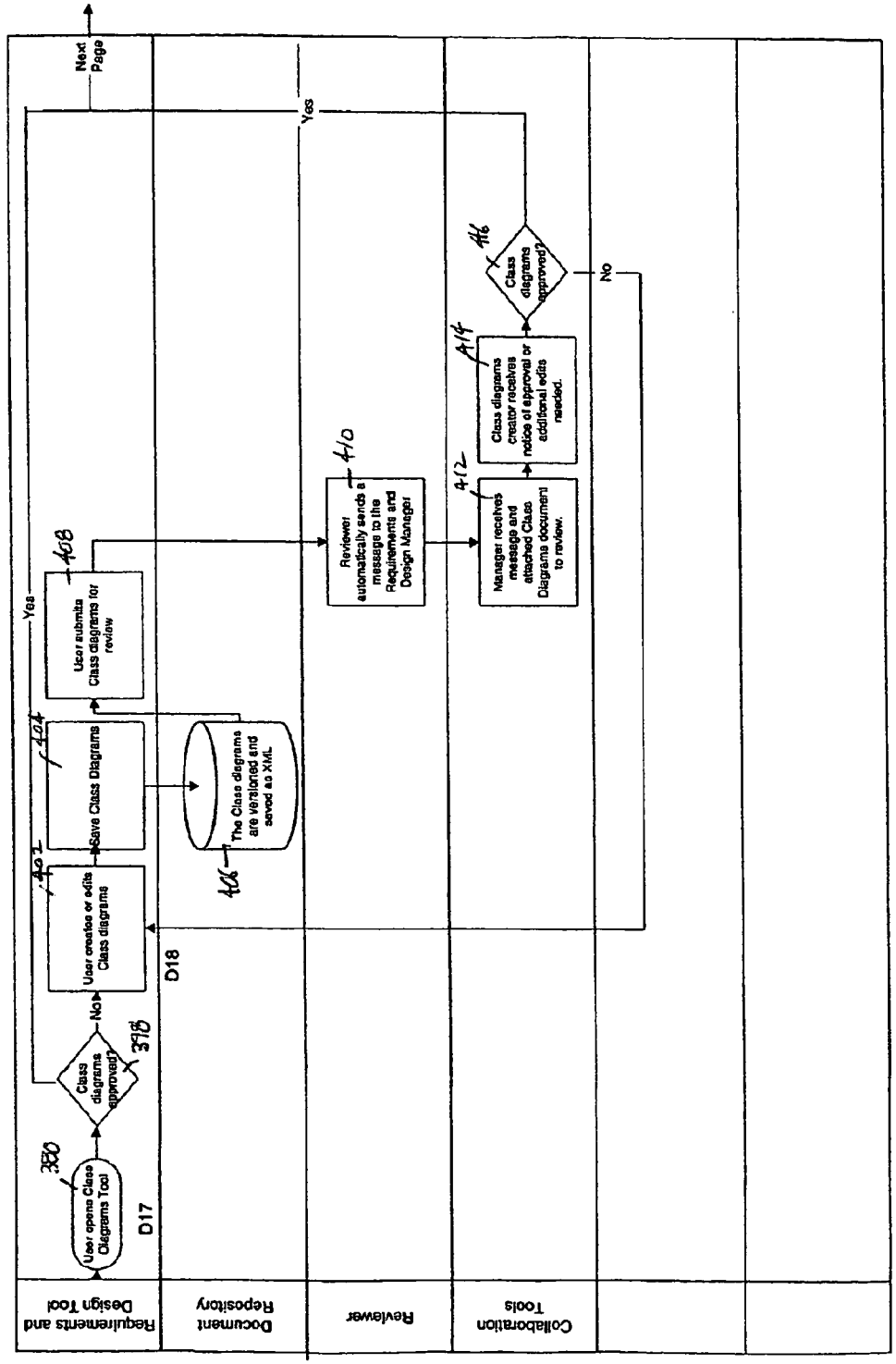

Referring to FIG. 14i, after the user opens the sequence diagrams tool in step 364, a decision is made whether the sequence diagrams are approved in step 378. If the sequence diagrams are approved, the user opens a class diagrams tool in step 380, shown in FIG. 14j. If the sequence diagrams are not approved in step 378 then the user creates or edits the sequence diagrams in step 382, and saves the sequence diagrams in step 384. In step 386 the sequence diagrams are versioned and saved as XML in the document repository. Next the user submits the sequence diagrams for review in step 388. A reviewer automatically sends a message to the requirements and design manager in step 390, which the Manager receives in step 392. The sequence diagrams creator then receives notice of approval or additional edits needed in step 394. In step 396 a decision is made whether the sequence diagrams are approved. If YES then the user opens the class diagrams tool in step 380, show in FIG. 14j. If NO then the system returns to step 382.

Once the user has opened the class diagrams tool in step 380, a decision is made whether the class diagrams are approved in step 398. If the class diagrams are approved, the user opens a data design model tool in step 400, shown in FIG.

14*k*. If the class diagrams are not approved in step 398 then the user creates or edits the class diagrams in step 402, and saves the class diagrams in step 404. In step 406 the class diagrams are versioned and saved as XML in the document repository. Next the user submits the class diagrams for review in step 408. A reviewer automatically sends a message to the requirements and design manager instep 410, which the Manager receives in step 412. The class diagrams creator then receives notice of approval or additional edits needed in step 414. In step 416 a decision is made whether the class diagrams are approved. If YES then the user opens the data design model tool in step 400, show in FIG. 14*k*. If NO then the system returns to step 402.

Figure 14K:
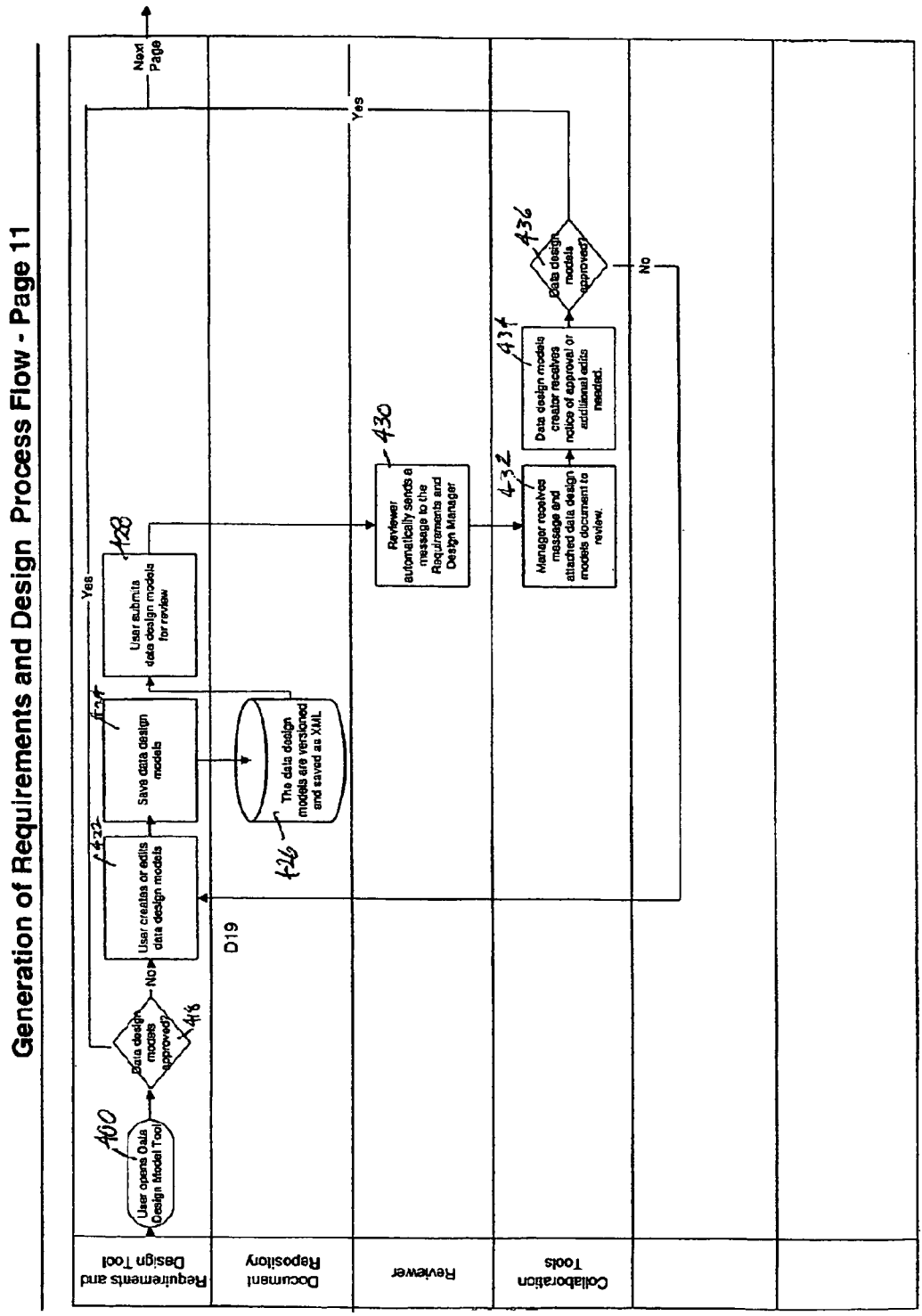
Figure 41:
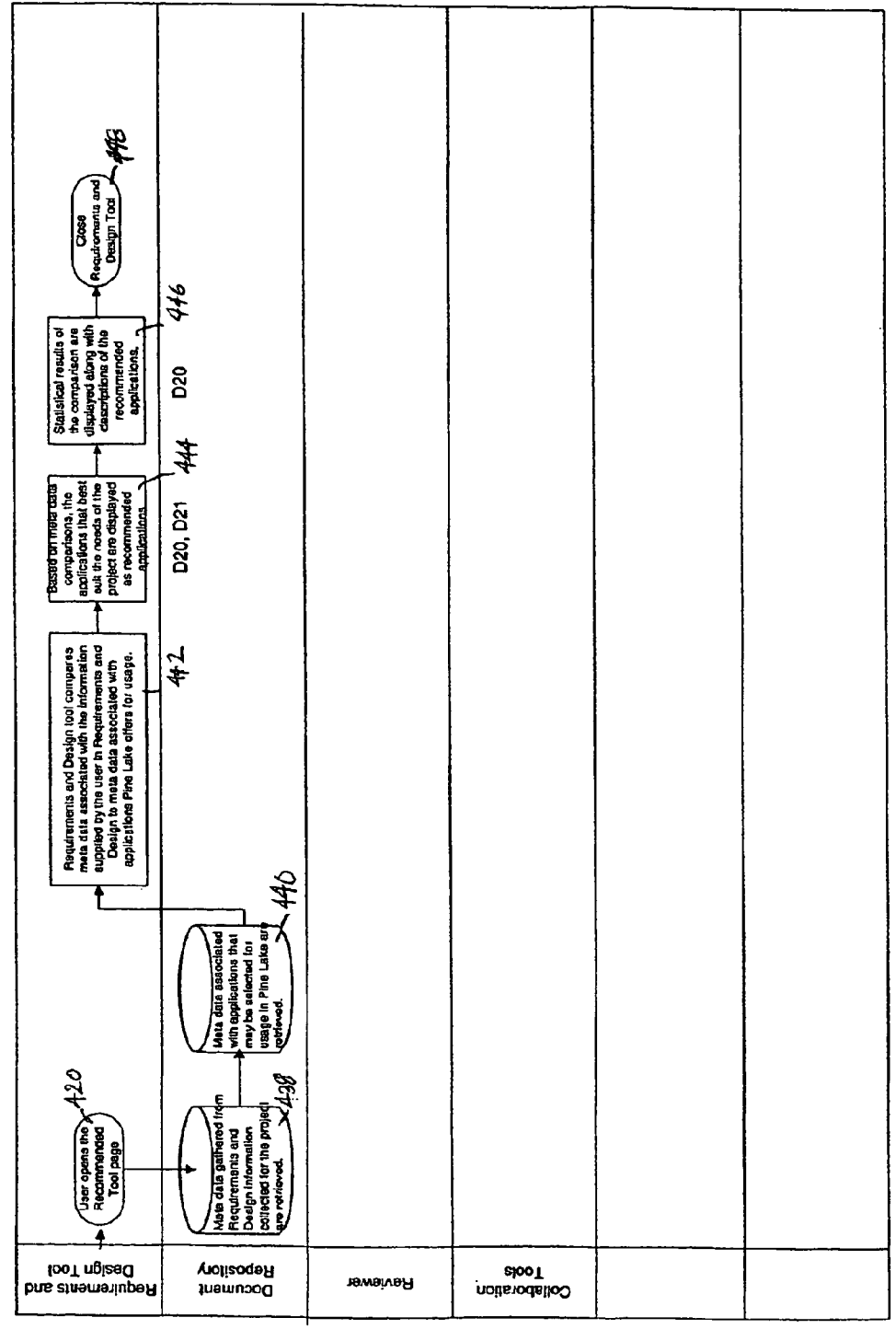

Next, as shown in FIG. 14*k*, after the user has opened the data design model tool instep 400, a determination is made whether the design models are approved in step 418. If the class diagrams are approved, the user opens a recommended tool page in step 420, shown in FIG. 14*l*. If the design models are not approved in step 418 then the user creates or edits the design models in step 422, and saves the design models in step 424. In step 426 the design models are versioned and saved as XML in the document repository. Next the user submits the data design models for review in step 428. A reviewer automatically sends a message to the requirements and design manager in step 430, which the Manager receives in step 432. The data design models creator then receives notice of approval or additional edits needed in step 434. In step 436 a decision is made whether the data design models are approved. If YES then the user opens the recommended tool page in step 420, show in FIG. 14*l*. If NO then the system returns to step 422.

Once the recommended tool page is opened in step 420, meta-data, gathered from the requirements and design information collected for the project, are received in step 438. The meta-data associated with applications that may be selected for usage are retrieved in step 440. In step 442 the requirements and design tool compares meta-data associated with the information supplied by the user in requirements and design meta-data applications offered for usage. Based on the meta-data comparisons the applications that best suit the needs of the project are displayed as recommended applications in step 444. Statistical results of the comparison re displayed along with the descriptions of the recommended applications in step 446, and then the requirements and design tool is closed in step 448.

In FIGS. 14*a*-14*l*, the users, the managers, the reviewers, and the creators can be widely spread out, with all communications occurring over the Internet. Some or all of the foregoing individuals can communicate and interact through a central Internet site.

Figure 15A:
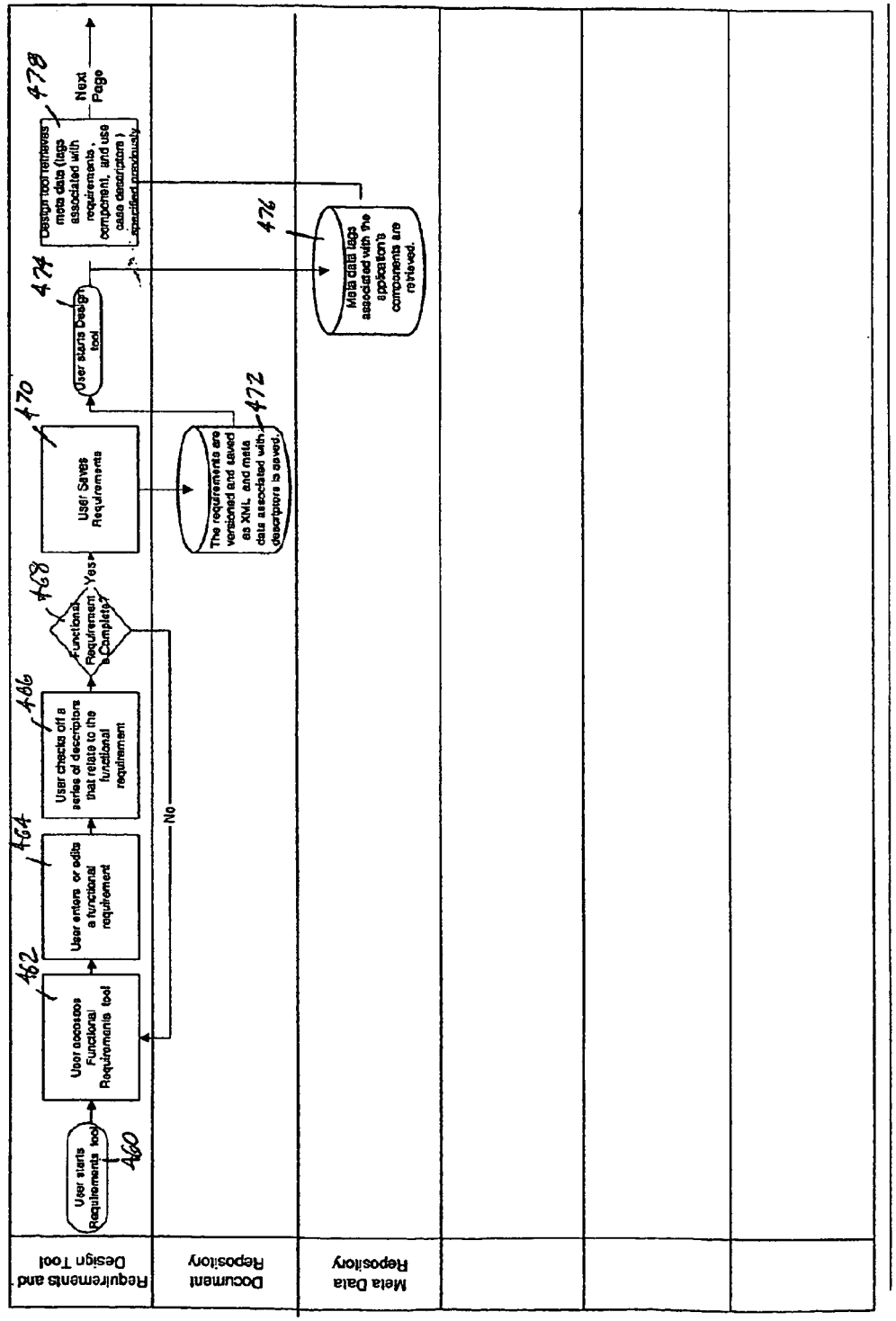
FIGS. 15a-15c are flow charts illustrating a process of building an application out of web services according to the present invention.
Figure 15B:
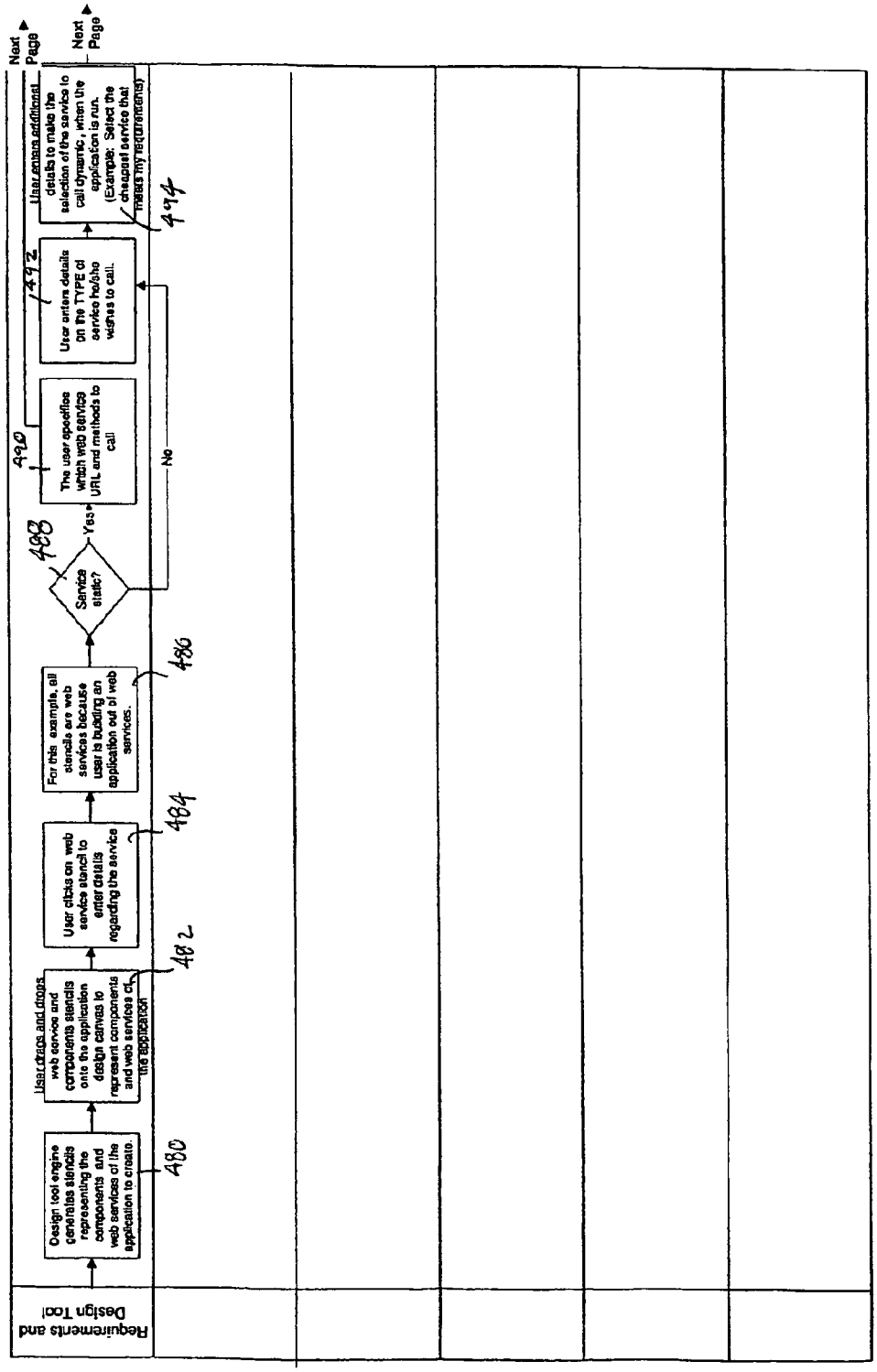
Figure 15C:
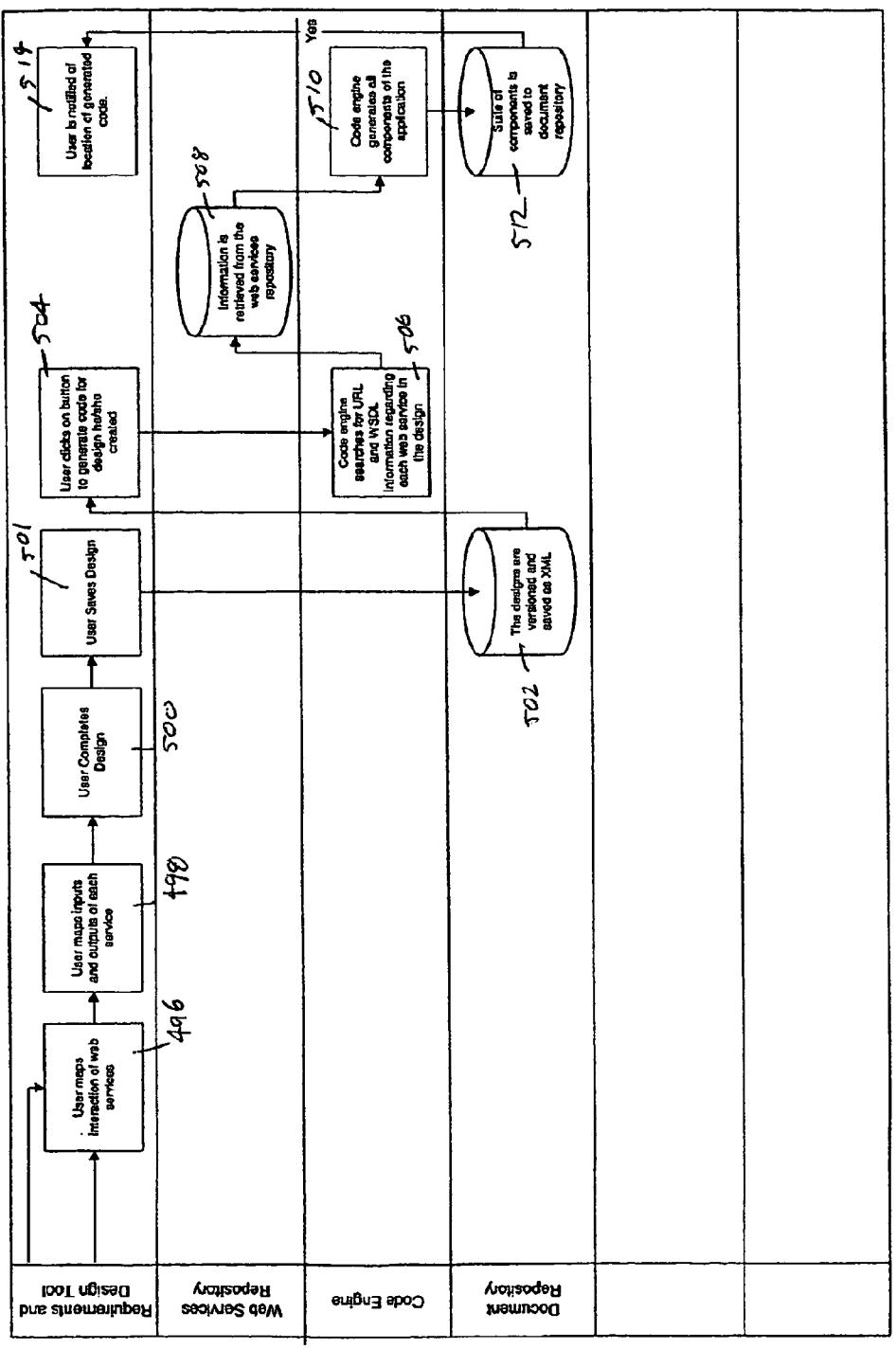

The process of building an application out of web services is shown the flow charts of FIGS. 15*a*-15*c*. Beginning with step 460, shown in FIG. 15*a*, a user starts the requirements tool, and then accesses the functional requirements tool in step 462. A functional requirement may be edited in step 464, after which the user checks off a series of descriptors that relate to the functional requirement, in step 466. A determination is then made in step 468, whether the functional requirement is complete. If the functional requirement is not complete the user returns to step 462. On the other hand, if the functional requirement is determined to be complete in step 468, then the user saves the requirement in step 470, and the requirement are versioned and saved as XML in the document repository, and meta-data associated with descriptors are saved in step 472.

The user can now start a design tool in step 474. Any meta-data tags associated with the components of the application are retrieved from the meta-data repository in step 476. The design tool then retrieves meta-data, including tags associated with requirements, components, and use case descriptors, specified previously in the process described previously with regard to FIGS. 14*a*-14*l*, in step 478.

In step 480, shown in FIG. 15*b*, the design tool engine generates stencils representing the components and web services of the application to be created. Next, in step 482, the user can drag and drop web services and component stencils onto the application design canvas to represent components and web services of the application. The user then may enter details regarding the web service by clicking on a web service stencil, in step 484. As noted in step 486, in the illustrated example all the stencils are web services since the user is building an application with web services.

In step 488 a determination is made whether the service is static. If the service is static the user specifies which web service URL, Uniform Resource Locator, and methods to call in step 490. If the service is determined not to be static, the user enters the details relating to the type of service he/she wishes to call, in step 492, after which in step 494, the user enters additional details to make the selection of the service to call, dynamic when the application is run. For example, the user can specify that the cheapest service that meets the designated requirements be selected.

Steps 490 and 494 are both followed by step 496 in which the user maps the interaction of the web services. Next the user maps the inputs and outputs of each service, in step 498, and the user completes the design in step 500. In step 501 the user saves the design and it is versioned and saved as XML in the document repository in step 502.

To generate code for the created design, the user can click on a button in step 504, which causes a code engine to search for URL and WSDL information regarding each web service in the design in step 506. WSDL stands for Web Services Description Language and is an XML-based language used to describe the services a business offers and to provide a way for individuals and other businesses to access those services electronically. The information is retrieved from a web services repository in step 508. The code engine generates all the components of the application in step 510, and a suite of components is then saved in the document repository in step 512. On completion of step 512, the user is notified of the location of the generated code in step 514, thus completing the process of building an application from web services.

Figure 16:
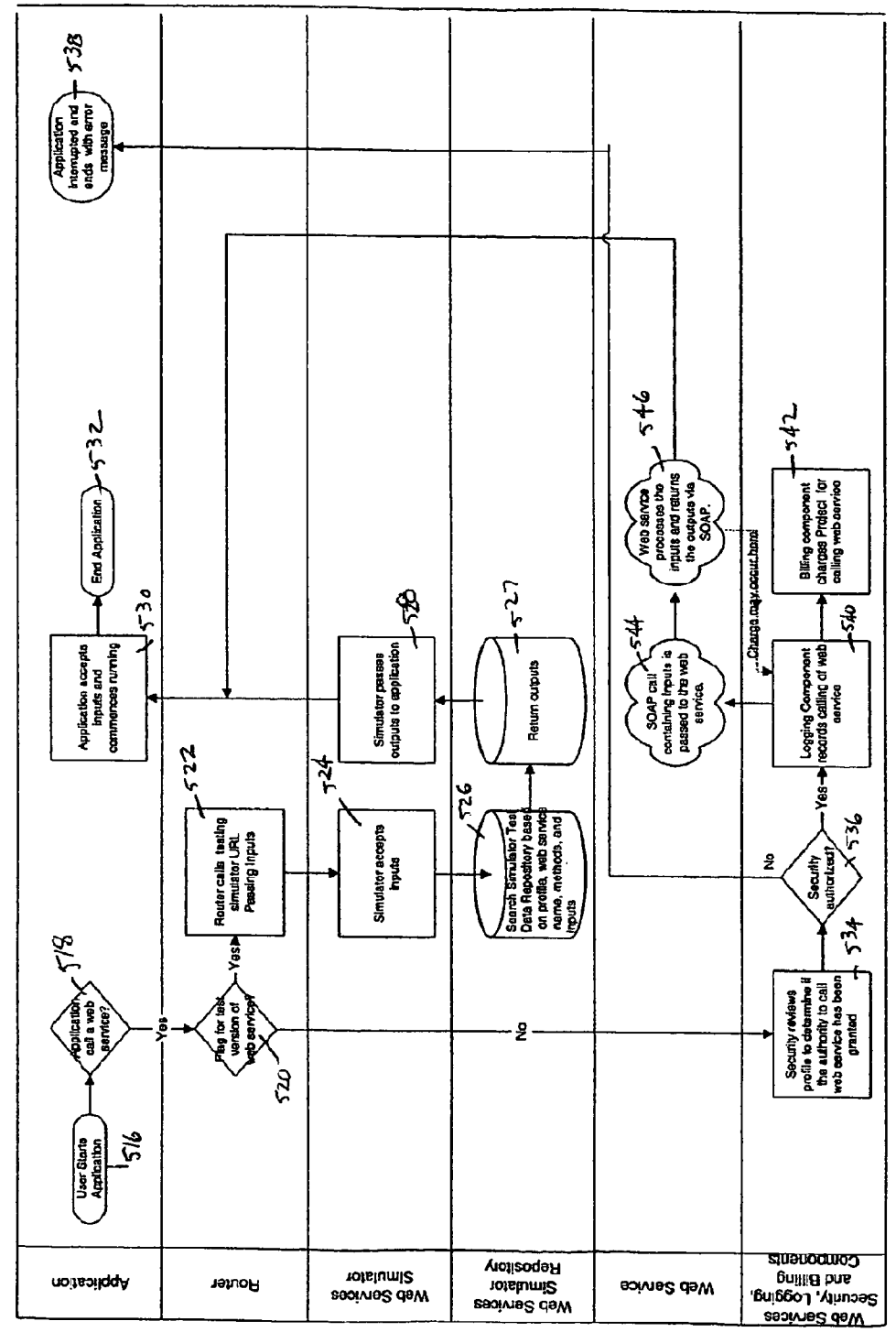
FIG. 16 is a flow chart illustrating a process of calling a web service according to the present invention.

The process of calling a web service, referred to in steps 492 and 494, will now be described with reference to FIG. 16. The process begins when a user starts an application in step 516. A determination is made in step 518 whether the application calls a web service. If YES then in step 520 a determination is made whether a test version of the web service available. If a test version is available, then a router calls a testing simulator URL and passes inputs to the simulator in step 522. The simulator accepts the inputs in step 524 and a test data repository is searched based on the profile, web service name, methods, and inputs, in step 526. The outputs are returned in step 527, and the outputs are passed from the simulator to the application in step 528. At this point the application accepts the inputs and starts running in step 530 and then the application ends in step 532.

If the result of step 520 is that there is no test version of the web service, then security reviews the profile to determine if the authority to call the web service has been granted in step 534, a determination is made in step 536 whether security is authorized. If security is not authorized the application is interrupted and ends with a message error in step 538.

If security is authorized a logging component records the call to the web service in step 540. A billing component charges the applicable project for the call to the web service in step 542. A single object protocol (SOAP) call is made to the web service, containing inputs, in step 544. The web service processes the inputs and returns outputs via SOAP in step 546. A charge may be made during step 546, in which case the charge is recorded in step 540. After step 546, the application accepts the inputs and starts running in step 530 and then the application ends in step 532, and in step 546, the billing component may charge the project for calling the web service.

Figure 17:
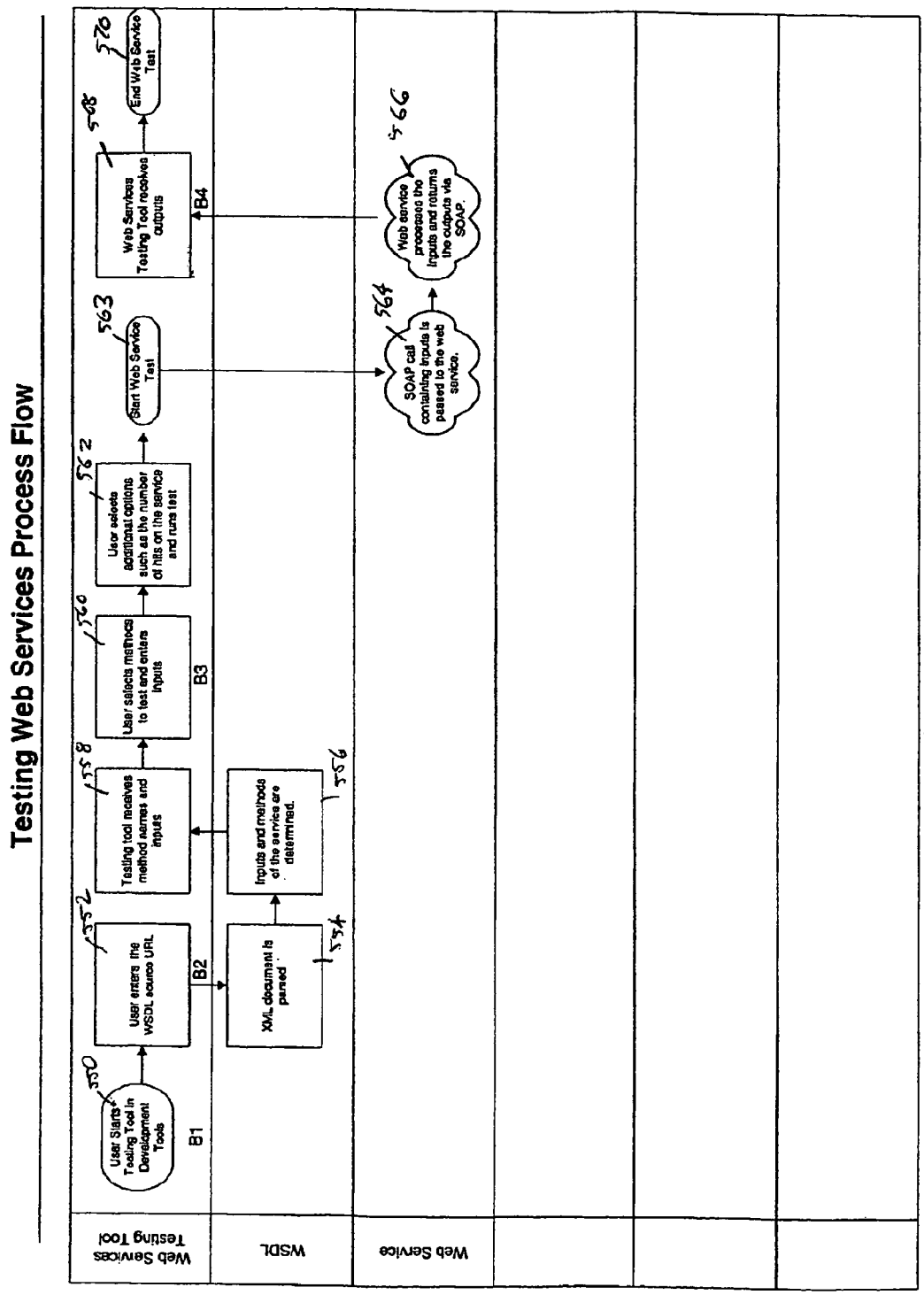
FIG. 17 is a flow chart illustrating a process of testing a web service according to the present invention.

A process for testing the web service process flow is shown in FIG. 17. The process begins in step 550 when the user starts a testing tool from the development tools. The user then enters the WSDL source URL in step 552, and the XML document is parsed in step 554. The inputs and methods of the service are determined in step 556, and the testing tool receives method names and inputs in step 558. The user then selects the methods to be tested and enters the inputs in step 560. The user selects additional options such as the number of hits on the service and runs the test in step 562. The web service test is started in step 563, after which a SOAP call, containing inputs, is passed to the web service in step 564. The web service processes the inputs and returns the outputs via SOAP in step 566. The outputs are received by the web services testing tools in step 568, and the web service test is completed in step 570.

Figure 18:
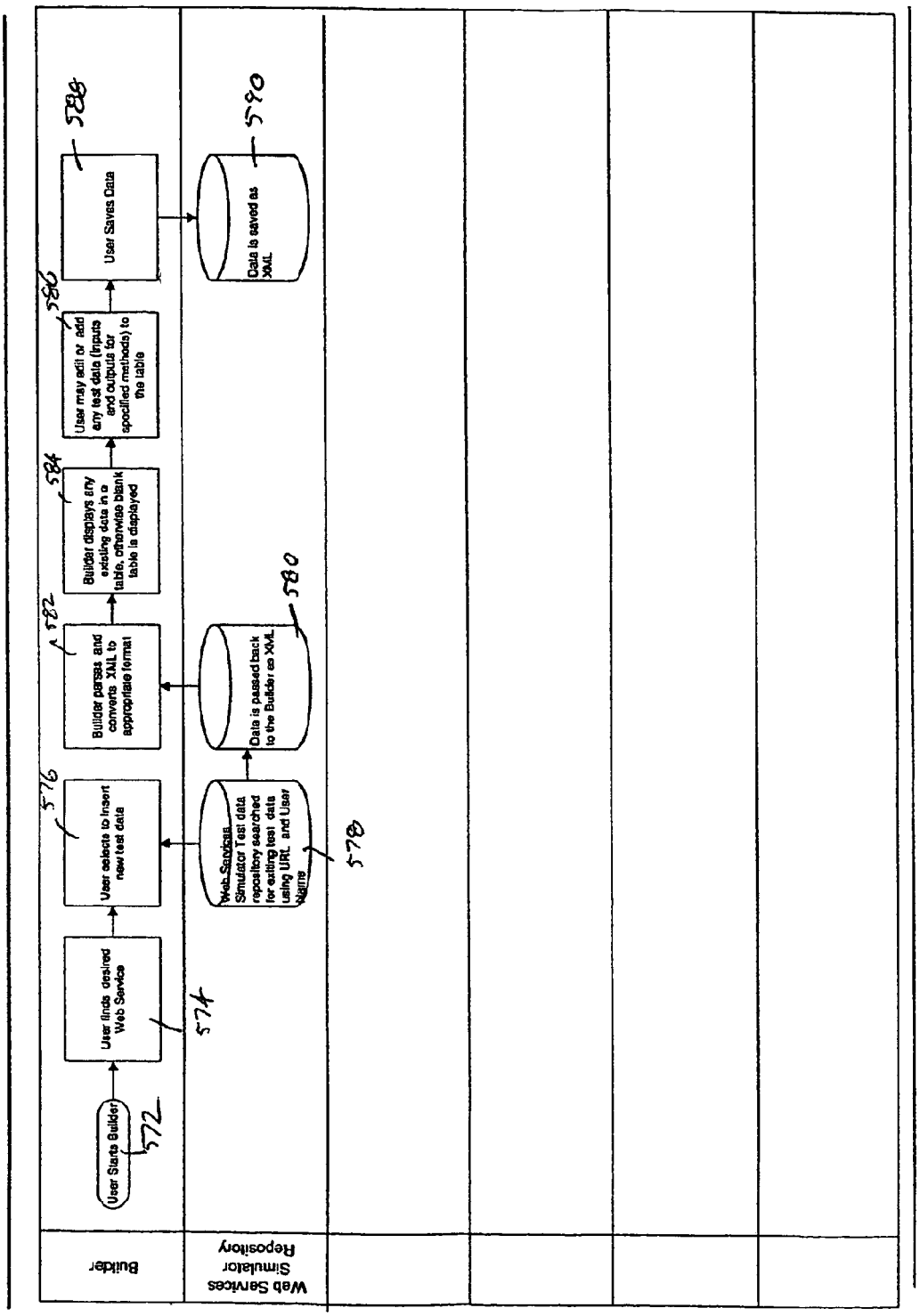
FIG. 18 is a flow chart illustrating a process of inserting simulator test data according to the present invention.

FIG. 18 is a flow chart that depicts the process of inserting simulator test data. A user starts the process by starting the Builder 184, in step 572. Next the user finds the desired web service in step 574, and in step 576 inserts the new test data. The web services test simulator test data repository is searched to find existing test data using a URL and the user's name, in step 578. The data is passed back to the Builder 184 as XML in step 580, and the Builder 184 parses and converts the XML to an appropriate format in step 582. In step 584, the Builder 184 displays any existing data in a table. If no data is available then a blank table is displayed. The user chooses to edit or add test data to the table in step 586, and saves the data in step 588. The data is saved as XML in the web services simulator repository in step 590.

Figure 19A:
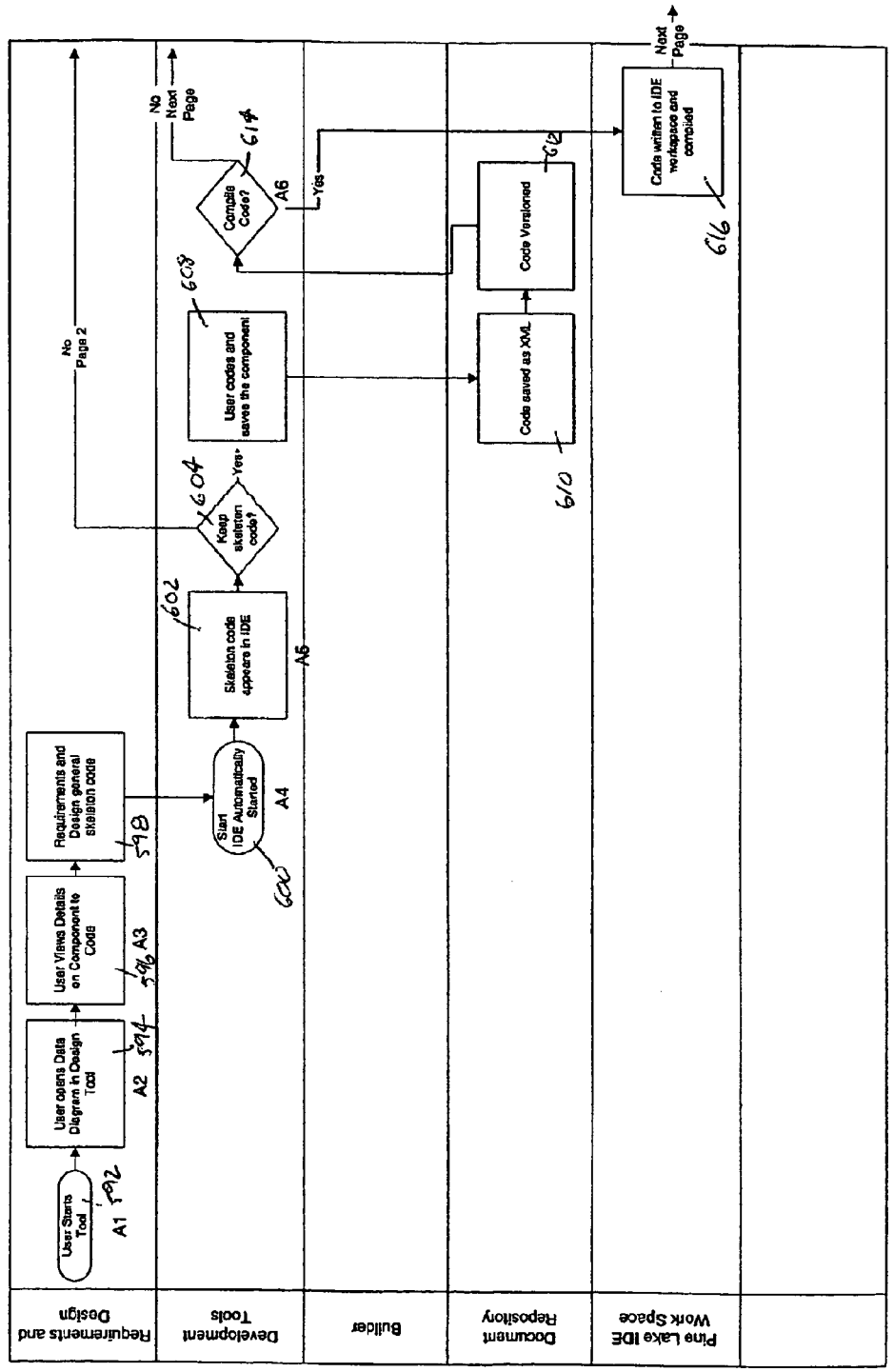
FIGS. 19a-19c are flow charts illustrating a process of inserting a web service according to the present invention.
Figure 19B:
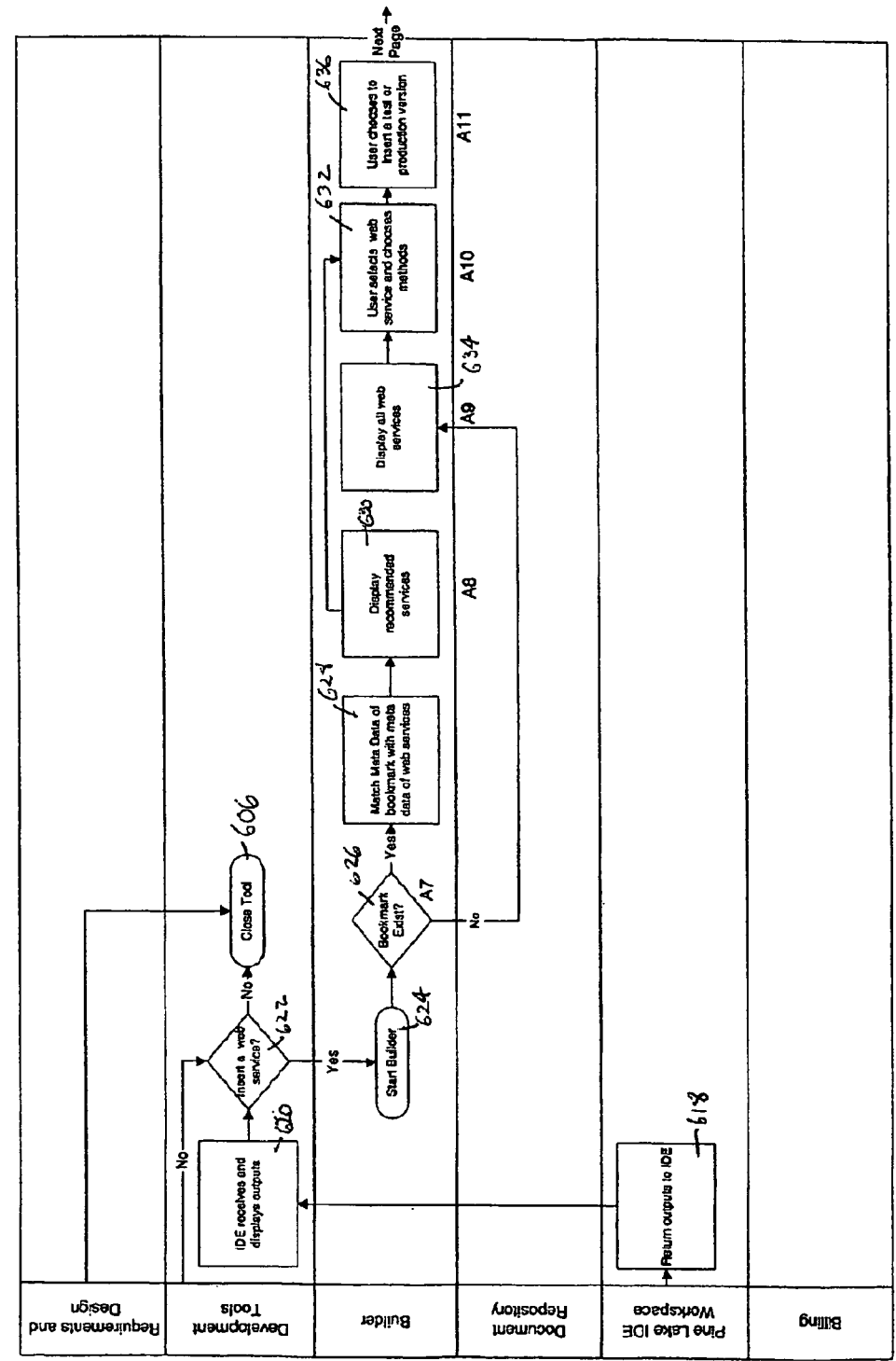
Figure 19C:
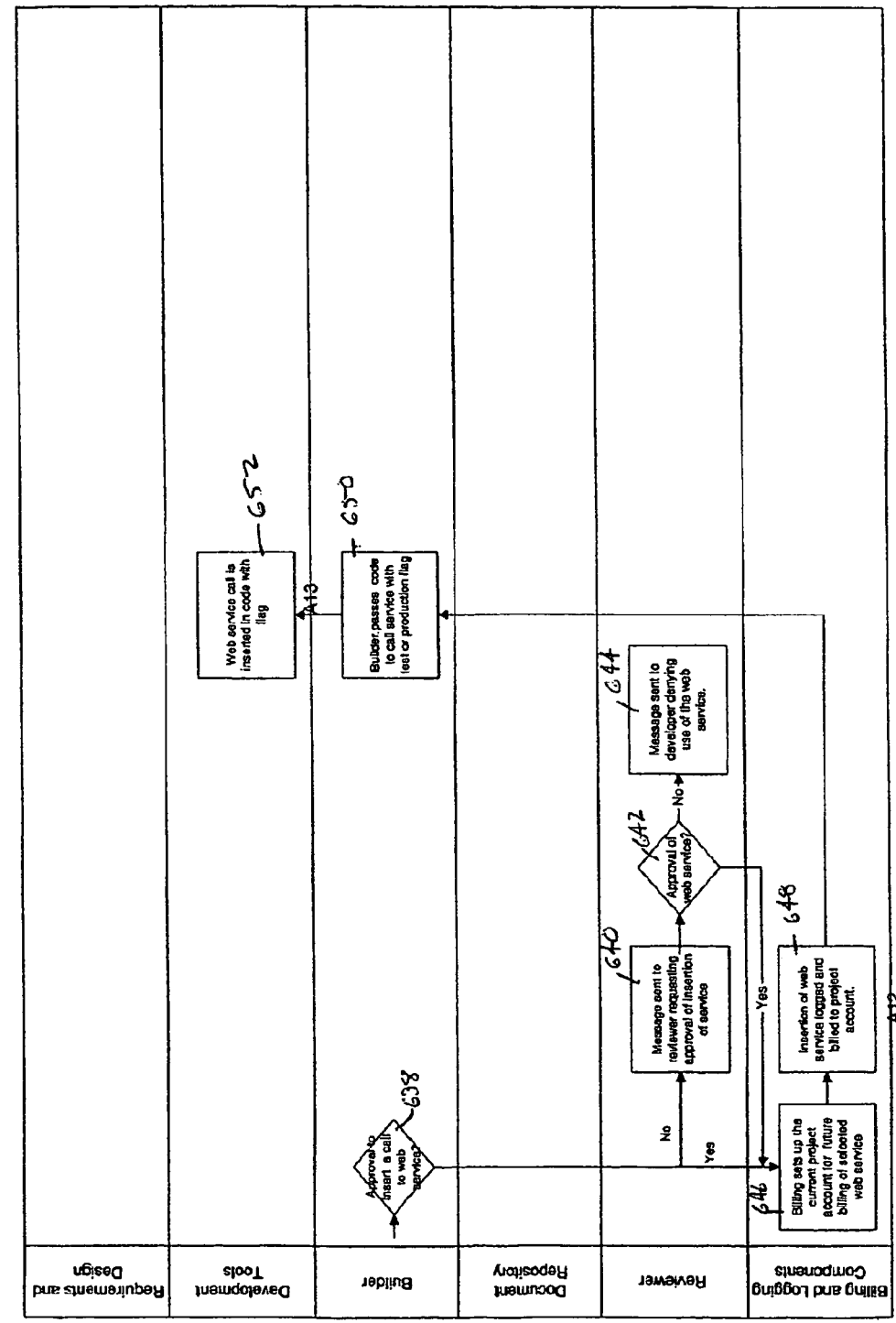
Figure 20A:
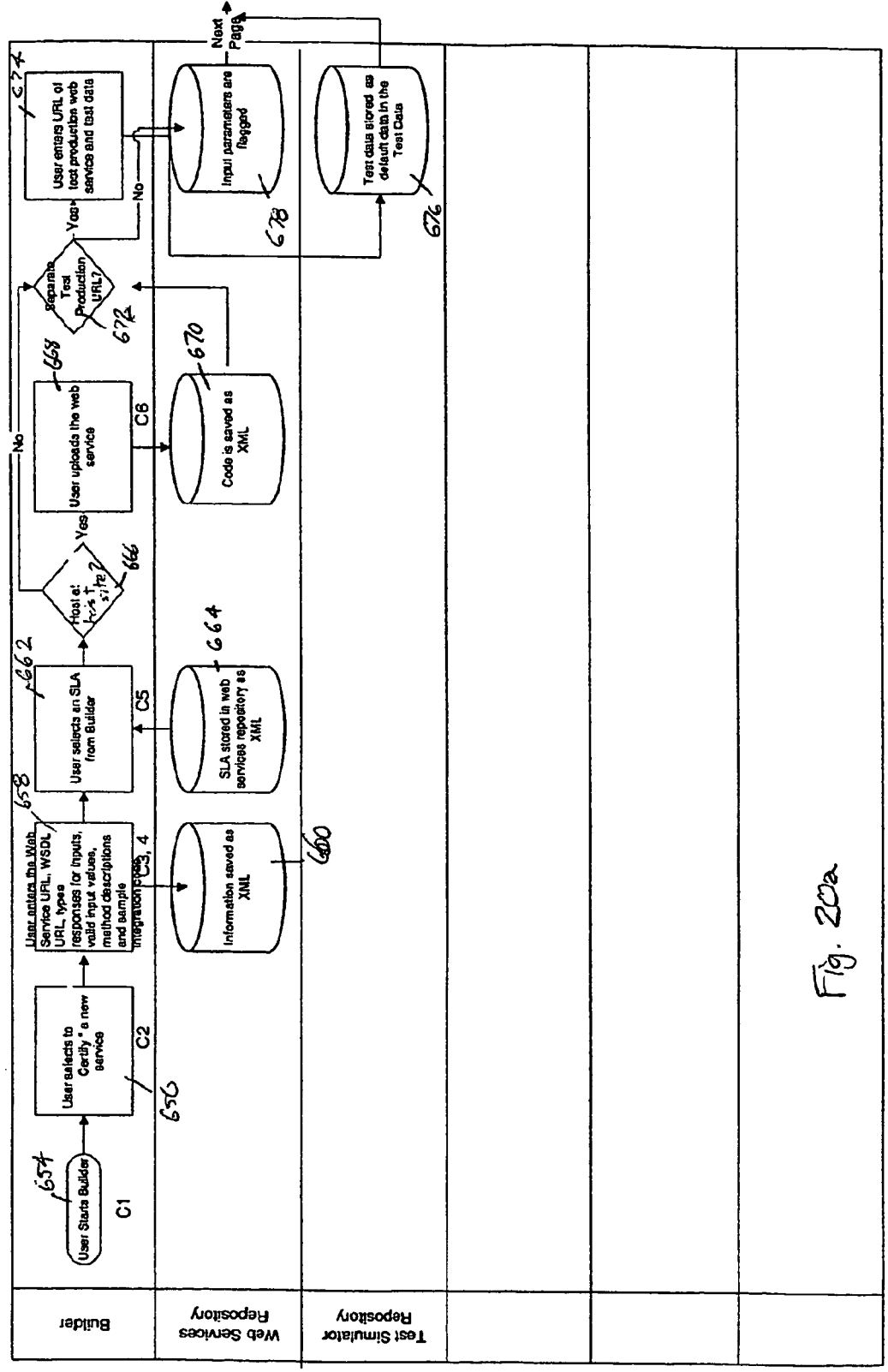
FIGS. 20a-20d are flow charts illustrating a process of certifying web services according to the present invention.
Figure 20B:
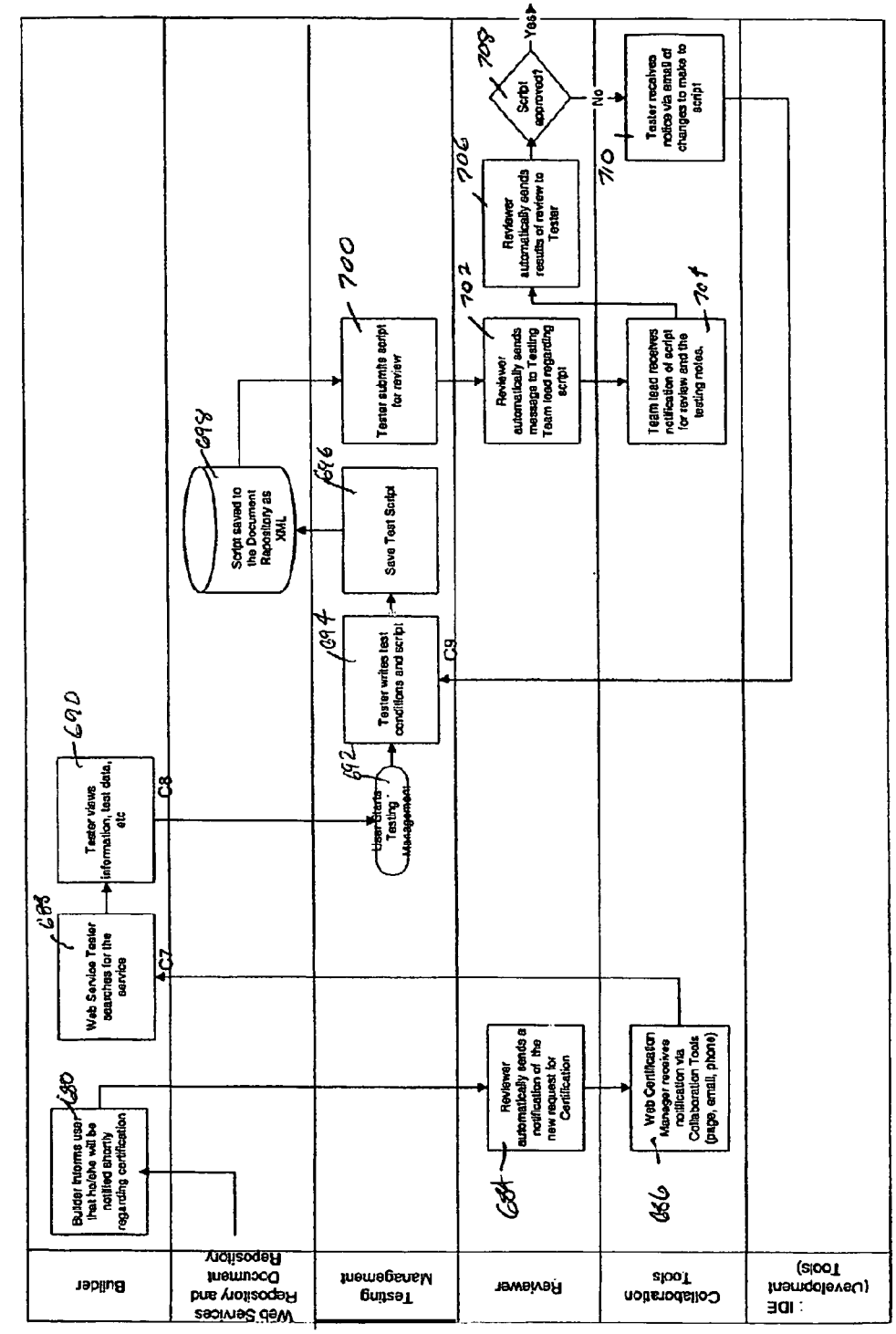
Figure 20C:
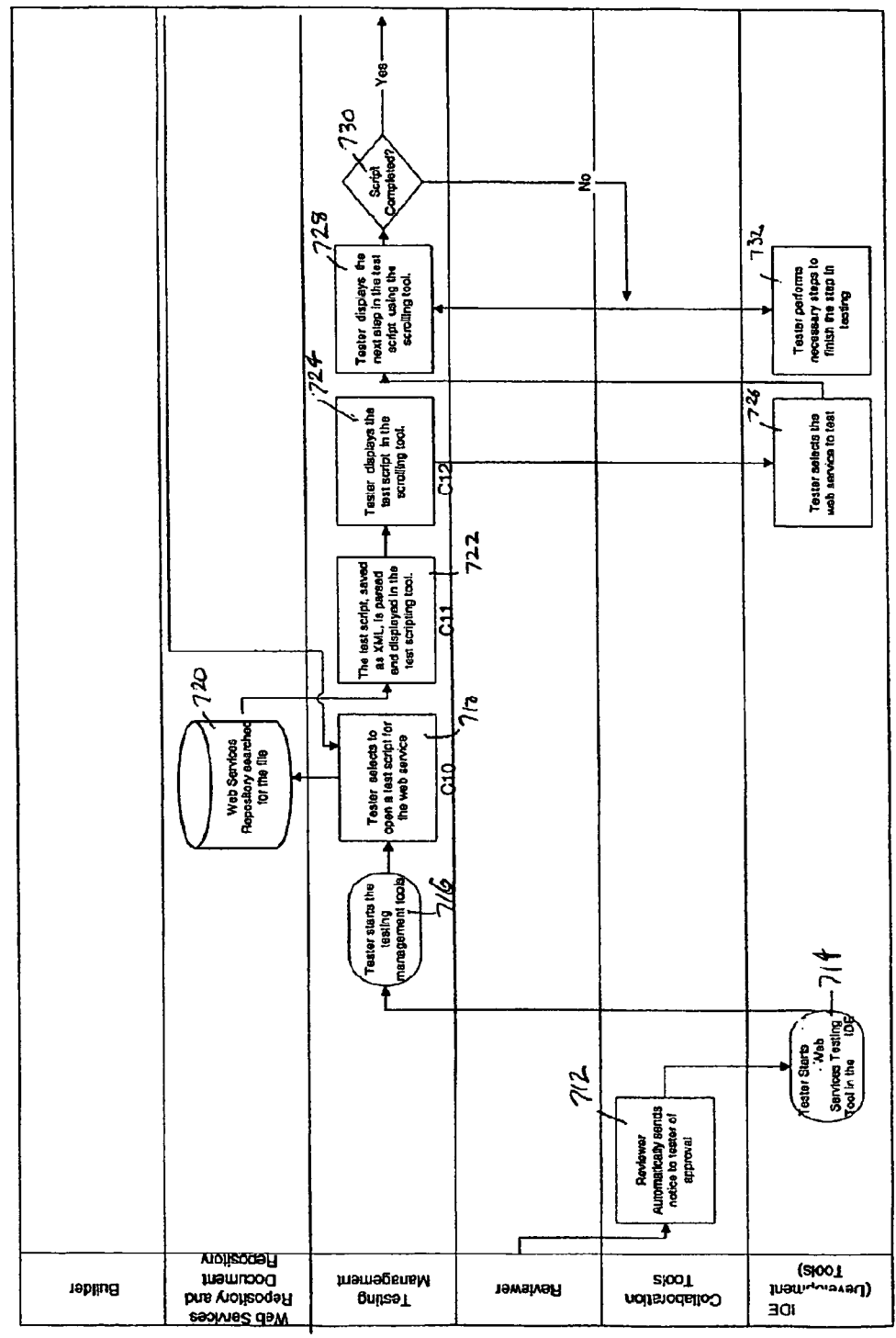
Figure 20D:
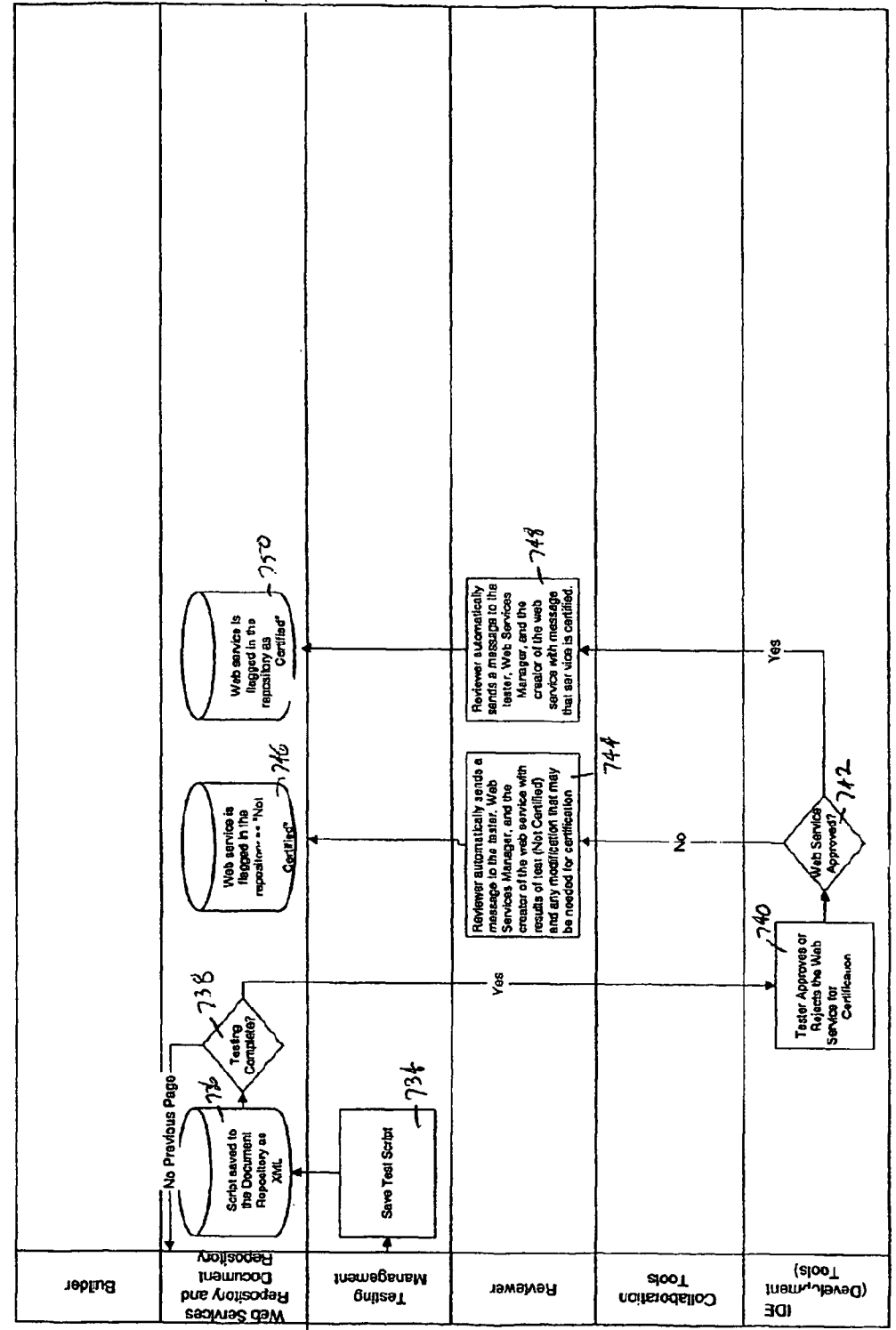

The process of inserting a web service is illustrated in the flow charts shown in FIGS. 19a-19c. The process begins when the user starts the requirements and design tool is step 592. Next the user opens a data diagram in the design tool, in step 594. In step 596, the user views details relating the components to code. In step 598 the requirements and design general skeleton code are generated, after which the Integrated Development Environment (IDE) is automatically started in step 600. The skeleton code appears in the IDE in step 602. In step 604 a decision is made whether to keep the skeleton code. If the skeleton code is not kept, then the process proceeds to step 606, shown in FIG. 19b where the development tool is closed.

If the decision in step 604 is to keep the skeleton code, then the user codes and saves the component in step 608, and the code is saved as XML in the document repository and versioned in steps 610 and 612, respectively. A decision is made in step 614, whether to compile the code. If the decision in step 614 is to compile the code, then the code is written to the IDE workspace and compiled in step 616, and outputs are returned to the IDE in step 618, shown in FIG. 19b. The IDE receives and displays the outputs in step 620, after which, in step 622, a decision is made whether to insert a web service. If the decision in step 614 is not to compile the code, then the process proceeds to step 622.

If the decision in step 622 is not to insert a web service, then the development tool is closed in step 606. On the other hand, if the decision in step 622 is to insert a web service, the Builder 184 is started in step 624, and decision is made whether a bookmark exists, in step 626. If a bookmark exists, meta-data of the bookmark is matched with meta-data of the web services, in step 628. The recommended services are displayed in step 630. Next in step 632, the user selects a web service and chooses methods. If it is determined in step 626 that no bookmark exists than the process proceeds to step 634 where all webs services are displayed. From step 634, the user can select a web service and choose methods in step 632. In step 636 the user chooses to insert a test or production version.

A decision is made in step 638 whether there is approval to insert a call to the web service, as shown in FIG. 19c. If the decision in step 638 is not to insert a call, then message is sent to a reviewer requesting approval of the insertion of the service in step 640. The reviewer decides whether to approval the web service in step 642. If the reviewer in step 642 does not approve the web service, then a message is sent to the developer denying the use of the web service in step 644. On the other hand, when the reviewer approves the web service in step 642, the billing and logging components set up the current project for future billing of selected web services, in step 646. Similarly if the builder approves the insertion of a call to the web service, in step 638, the process moves to step 646.

The insertion of the web service is logged and billed to the project account in step 648, and the Builder passes code to the called web service with a test of production flag in step 650. Finally, the web service is inserted into the code with the flag in step 652.

In order for web services to be added to the web services repository they must be certified. The process for achieving such certification is illustrated in FIGS. 20a-20d. The process starts when the user starts the Builder 184 in step 654, and selects the option of certifying a new service in step 656. The user then enters the web service UPL, WSDL URL, types of responses for inputs, valid input values, method descriptions, and sample integration code in step 658. The information is saved as XML in the web services repository in step 660. After step 658, the user selects a service level agreement (SLA) from the Builder 184 in step 662. The SLAs are stored in the web services repository as XML in step 664. In step 666, a decision is made whether to host the web service at the host site. If the decision in step 666 is YES, then the user uploads the web service in step 668, and the code is saved as XML in the web services repository in step 670. After the step 670, a decision is made in step 672 whether a separate test production URL is required. Step 672 also follows step 666 if the decision is NO.

If a separate test production URL is required in step 672, then the user enters the URL of the test production web service and test data in step 674, and the test data is stored as default data in the test simulator repository in step 676. If the decision in step 672 is that a separate test production URL is not required, then input parameters are flagged in step 678. Both steps 676 and 678 are followed by step 680, shown in FIG. 20b, in which user is informed by the Builder 184 that a notification will be provided shortly regarding certification. A reviewer then automatically sends a notification of the new request for certification in step 684, which is received by the web certification manager via the collaboration tools in step 686. Next a web services tester searches for the service in step 688, and then views the information and test data in step 690.

In step 692, the user starts testing management and writes test conditions and script in step 694. The script is saved in step 696 and stored in the document repository as XML in step 698. The tester submits the script for review in step 700, and the reviewer automatically sends a message to the testing team leader regarding the script in step 702. The team leader receives the notification of the script for review and the testing notes in step 704, and the reviewer automatically sends the results of the review to the tester in step 706. A decision is made in step 708 whether to approve the script. If the script is not approved the tester receives notice of changes that are needed to the script, in step 710, and the process returns to step 694. If the script is approved in step 708, then the reviewer automatically sends notice to the tester of the approval in step 712, and the tester starts a web services testing tool in the host IDE, in step 714, in FIG. 20c.

Next the tester starts the testing management tools in step 716, and selects to open a test script for the web service in step 718. The web services repository searches for the file in step 720, and the test script is saved as XML, is parsed and displayed in the test-scripting tool, in step 722. The tester then displays the test script in a scrolling tool in step 724, and selects the web service to test in step 726. In step 728, the tester displays the next step in the test script using the scrolling tool. In step 730 a determination is made whether the script is complete. If the script is not complete step 732 is followed in which the tester performs the necessary steps to finish the step in testing. If the determination is made in step 730 that the script is complete then the test script is saved in step 734, shown in FIG. 20d. The script is saved to the document repository as XML in step 736, and a determination is made in step 738 whether the testing is complete. If the result of step 738 is that the testing is not complete the process returns to step 718, shown in FIG. 20c.

If the result of step 738 is that the testing is complete, the process proceeds to step 740 where the tester approves or rejects certification of the web service. A determination is made in step 742 whether the web service was approved. If unapproved then, in step 744, the reviewer sends a message to the tester, the web services manager, and the creator of the web service with the result of the test, and any modifications that may be needed for certification. The web service is then flagged in step 746 in the web services repository an "not-certified."

If the result of the determination in step 742 is that the web service is approved, then in step 748 the reviewer sends a message to the tester, the web services manager, and the creator of the web service that the web service has been certified, and the web service is flagged in the web services repository as being "certified" in step 750 and the certification process is complete.

The operation of the Instantiator 182 will now be described with reference to the flow charts shown in FIGS. 21a-21f. The Instantiator process is started at point 751 shown in FIG. 21a. One way the Instantiator process starts is when a disconnect request is received from the billing system in step 752, which results in the hosting company being notified to revoke access to the environment in step 754. Next the customer is notified that access has been revoked and will be restored when the account returns to good standing, in step 756. The Instantiator process then ends at point 758.

The Instantiator process also begins when an environment request is received from the environment user interface, in step 760. A determination of the type of request is made in step 762. If the request is for a new environment or to upgrade an environment then the process proceeds to step 764 where the Instantiator takes inputs parameters from the environments and routes the request to the environment configuration, which in turn validates that the customer software selection is suitable, i.e. all the software dependencies are accounted for, in step 766. The environment configuration then determines if the request is for a new environment or an upgraded environment in step 768.

If the request is for an upgraded environment then the process proceeds, via connection C-C to step 770 in FIG. 21f, in which the environment configuration determines if additional hardware is needed for the existing environment based on the software selection and the number of users. A determination is then made whether additional hardware is needed in step 772. If yes then the environment configuration determines how the hardware will be integrated with the existing environment in step 774, and the process proceeds to step 776 in FIG. 21a via connection H-H. If additional hardware is not required in step 774, then the process proceeds to step 778 in FIG. 20a.

If the request if for a new environment, then the environment configuration determines if the appropriate hardware configuration exists based on the type of environment, software selection and the number of users, in step 780. Next inventory management receives a request from environment configuration in step 776. The available inventory is checked in step 782 and a determination is made in step 784 whether the inventory is available. If the inventory is not available then the Instantiator notifies operations in step 786. If the inventory is available, then inventory status is updated in step 788 to hold the inventory and keep track of the inventory IDs.

In step 790 the remaining inventory is calculated, and the inventory levels are compared to determine if they have fallen below a preset threshold in step 792. If they have fallen below the preset threshold the operations is notified in step 794, and the Instantiator process ends at point 758.

After step 788, a check is made for available software licenses in step 778. Next, a determination is made whether the entire request can be fulfilled in step 796. If the entire request cannot be fulfilled, two steps are taken. First, the Operations Team is notified in step 798, after which step 778 is repeated. Second, the required license status is updated to hold and keep track of the license IDs in step 800. If the entire request can be fulfilled, then the required license status is updated to hold and keep track of the license IDS in step 802.

Steps 800 an 802 are both followed by step 804, shown in FIG. 21b, via connection E-E. In step 804, the software component is called from products, and information about the server and hosting center are passed. Next, an installation mechanism is launched for the requested software component, in step 806. A products mechanism in the hosting center then installs and configures the software on a new or existing server, in step 808. A determination is made in step 810, as to whether the installation was successful. If it was unsuccessful, then operations is notified and provided with information about the customer, server, hosting center, and failed software in step 812.

If the software installation is successful in step 810 then a directory structure is built and permissions are set up in step 814. In step 816 software application users are created. Next a determination is made whether all the software components are installed in step 818. If not, then the process returns to step 804. If yes, then a determination is made in step 819 whether the environment is new. If yes then in step 820, system users are created, and the version control tool is configured and access provided in step 822. In step 824 the logging tool is configured and access provided. After step 824 or if the environment is determined not to be new in step 819, then the process proceeds to step 826 in FIG. 21c, via connection F-F.

In step 826 a ReadMe file containing information about the setup of the new/modified environment is generated. The customer is notified that the environment is ready and is sent the ReadMe file in step 828. In step 830, the billing system is notified about the customer's new/modified environment. Next, in step 832 the inventory IDs are used to update the required inventory status to indicate that the inventory is in use. The inventory IDs are also used to update the required software license status to indicate that the licenses are in use, in step 834. In step 836 the customer association to assets is updated.

In step 838 a determination is made whether any items are in suspense. If no items are in suspense, then a determination is made whether to migrate the code in step 840. If any items are in suspense then operations is notified in step 842, and the Instantiator process ends at point 844.

If the result of step 840 is not to migrate the code, then any temporary files are removed in step 846, and the customer is notified that the environment is provisioned in step 848, after which the Instantiator process ends at point 844. If the code is to be migrated in step 840, then the process proceeds to step 850 in FIG. 21d, via connection G-G.

In step 850 the code release is managed, and the version of the files necessary for a given release are captured, after a migration request is received from the user interface, in step 852. Files are logically grouped into components in step 854. For example, Structured Query Language (SQL) files, stored procedures, web pages, include files, business logic, etc. are grouped together. Components for the given release are packaged in step 856, and the release is deployed to the new environment in step 858. The hosting center then unpackages the components in the new environment in step 860.

A determination is made in step 862 whether the deployment was successful. If unsuccessful, then operations and the hosting center support team are notified in step 864. If successfully deployed, then a determination is made whether the correct versions have been transferred in step 866. If the correct versions have not been transferred, the files that need to have corrected versions migrated are determined and then are transferred to the new environment in step 868. If the correct versions have been transferred the customer is notified that the environment has been provisioned and code has been migrated in step 870, after which the Instantiator process ends.

In FIG. 21a the Instantiator process may be initiated in yet another way, namely by receiving a terminate request from operations, in step 872. The process then proceeds to step 874 in FIG. 21e, via connection B-B. In step 874 a software component is called to uninstall, and the server and hosting center are informed of the un-installation. An uninstall mechanism is launched in step 876 to remove the requested software component. A determination is made in step 878 whether the requested software component is for a dedicated server. If it is for a dedicated server, then a products mechanism uninstalls the software component on the dedicated/shared server in step 880. A clean-up utility is then run in step 882 to clear disk space for re-use. A decision is made in step 884 whether the un-installation was successful. If unsuccessful then operations and the hosting center are notified, and information about the customer, server, hosting center and software component are provided in step 886.

If the un-installation was successful, then a determination is made in step 888 whether all the software components are uninstalled. If not, then step 874 is repeated. If all of the software components have been uninstalled, then access to version control is revoked in step 890, and access to the logging tool is revoked in step 892. The customer asset information is updated by the Instantiator in step 894, and the Instantiator process then ends at point 895.

If in step 878 a determination is made that the requested software component is not for a dedicated server, then a determination is made whether there are multiple instances of the software in step 896. If there is only one instance of the software, step 880 is followed. If there are multiple instances of the software, then the products mechanism removes the customer's instance of the software on the shared server in step 898, and step 882 is followed.

Figure 21C:
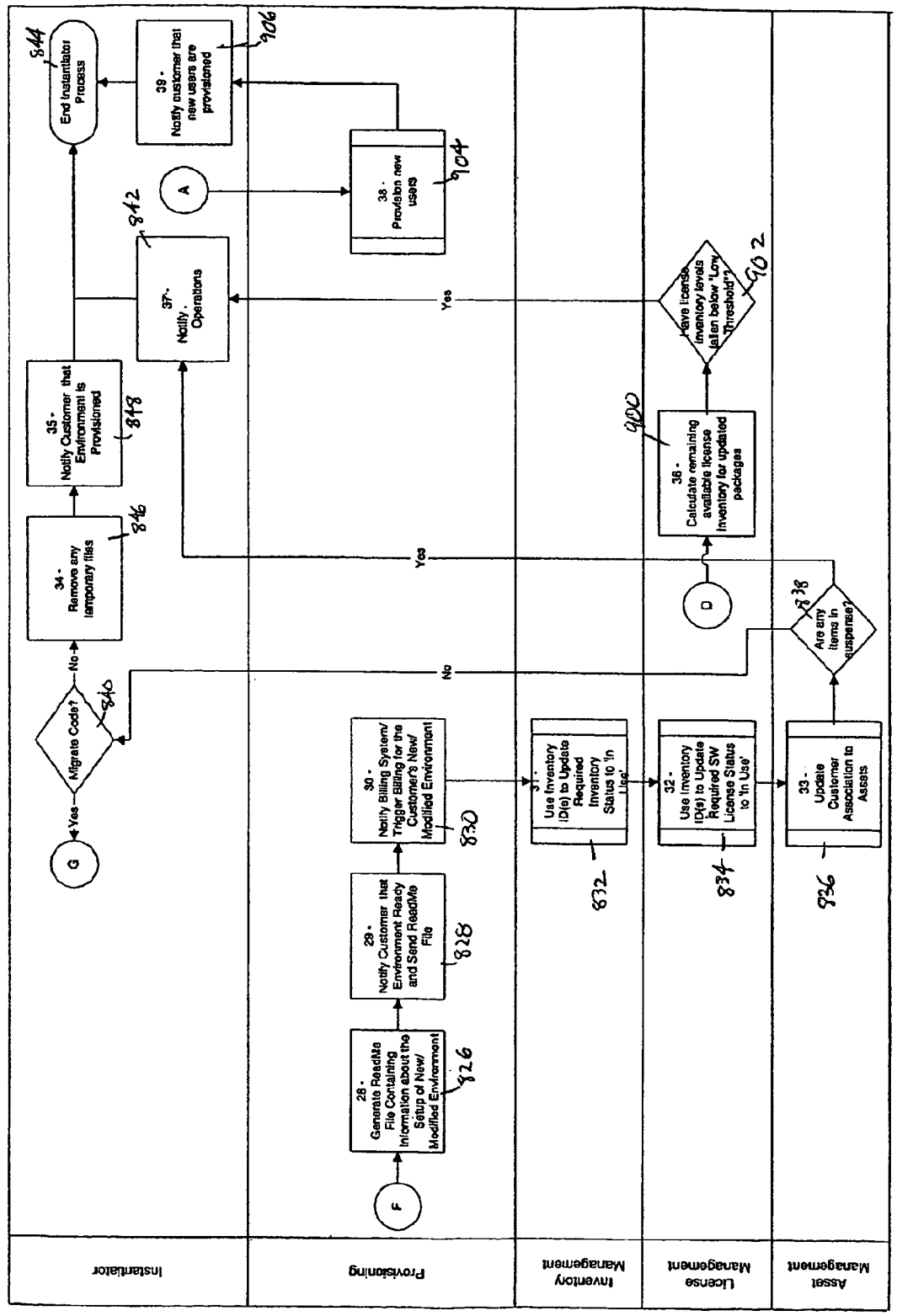
Figure 21D:
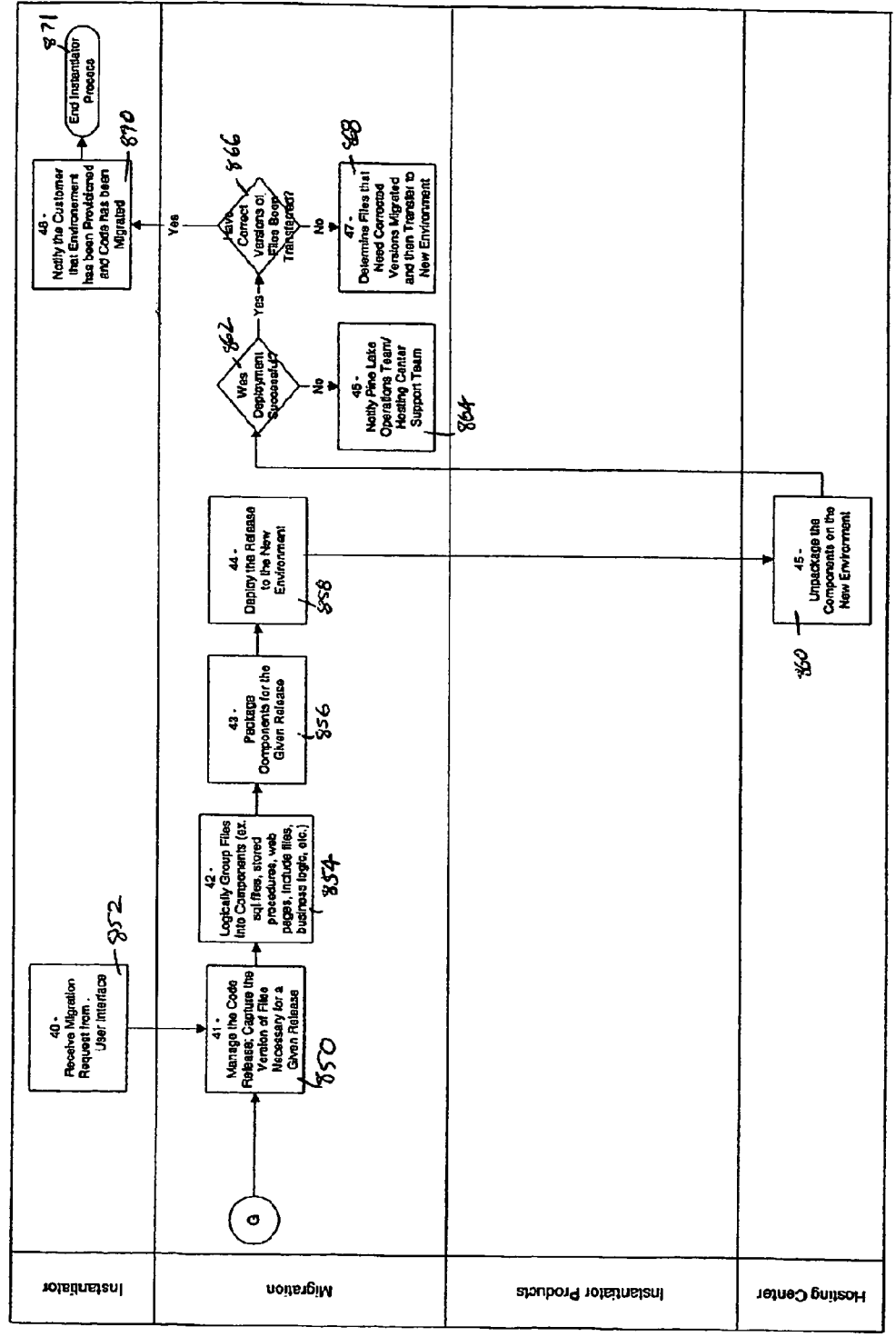

In FIG. 21a, after step 800 where the required license status is updated to hold and the license IDs are tracked, the process also proceeds to step 900 in FIG. 21c, via connection D-D. In step 900 the remaining available license inventory for updated packages is calculated. A determination is then made whether the license inventory levels have fallen below a preset low threshold, in step 902. If they have fallen below the threshold level, operations is notified in step 842, described previously.

Finally, if the determination of the type of request in step 762, in FIG. 21a, indicates that the request is for user administration, then the process proceeds to step 904 in FIG. 21c, via connection A-A. In step 904 new users are provisioned. The customer is then notified of the provisioning of the new users in step 906 and the Instantiator process ends at point 844.

Potential instantiators for the system and method of the present invention include: ALLAIRE; ARIBA; ATG DYNAMO; BAAN; BEA TUXEDO; BEA WEBLOGIC PLATFORM; BLUE MARTINI; BROADVISION; COMMERCEONE; CRYSTAL REPORTS; IBM MQSERIES; IBM WEBSPHERE PLATFORM; INTERWOVEN; IPLANET PLATFORM; JD EDWARDS; KABIRA; KANA; KEENAN; MICROSOFT.NET PLATFORM; MICROSOFT MSMQ; NORTEL (CLARIFY); OPEN SOURCE PLATFORM; ORACLE FINANCIALS; PEOPLESOFT (VANTIVE); PIVOTAL; PORTAL INFRANET; SAP; SIEBEL; VITRIA; and WEBMETHODS.

The potential supported technologies include, but are not limited to:

a. Development Tools: MICROSOFT VISUAL STUDIO; MICROSOFT OFFICE/FRONTPAGE; WEBGAIN SUITE; ALLAIRE COLDFUSION SUITE; MACROMEDIA SUITE; IBM VISUAL AGE; and FORTE.

b. Databases: ORACLE; MICROSOFT SQL SERVER; DB2; SYBASE; INFORMIX; INGRIS; and LOTUS NOTES.

c. Programming/Scripting Environments: C, C++, C#, JAVA, PERL, VISUAL BASIC, SQL, TRANSACT-SQL, PL/SQL, JAVASCRIPT, VBSCRIPT, UNIX SHELLS, WINDOWS BATCH, SYNCSORT, JCC, and Assembler.

d. Modeling Tools: RATIONAL ENTERPRISE SUITE; VISIO; and PLATINUM SUITE.

e. Version Control/Release Management/Configuration Management/Defect Tracking Tools: MICROSOFT VISUAL SOURCESAFE; PVCS; RATIONAL CLEARCASE/CLEARQUEST; CVS; RAZOR; ENDEVOR; SCCS; RCS; and PEGASYS.

f. Testing Tools: MERCURY TEST SUITE; RATIONAL TEST SUITE; J PROBE TEST SUITE; SEGUE; SUN TEST JAVA TOOLS; PREVIEW; JAVA UNIT; FILE-AID; and PLATINUM.

g. Operating System Platforms: WINDOWS NT/2K; SUN SOLARIS; HP/UX; LINUX; AIX; and MVS.

h. Project Management: MICROSOFT PROJECT; ABT WORKBENCH; and PWW.

i. Documentation: MICROSOFT OFFICE.

Having described several embodiments of the system and method for developing Internet-hosted business applications composed of web services and software for use in such environments in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A system comprising:
   a processor; and
   a memory configured to store computer executable instructions that, when executed by the processor, cause the system to develop an Internet-hosted business application composed of web services in an Internet-hosted development environment, wherein the Internet-hosted development environment includes
      a software development module comprising a portal, multiple development tools, pre-built and pre-configured environments, and applications for creating and abrogating said pre-built and pre-configured environments;
      a first software module for customizing said Internet-hosted development environment by generating application services tailored for a specific technology and facilitating product construction, versioning, and deployment of said application services into a production environment;
      a builder module comprising an index allowing discovery of said application services that exist on an Applications Service Provider Infrastructure Platform (AIP) module that provides the capability to deliver said application services and bill for use of said Internet-hosted development environment and, allowing utilization of said application services on the AIP module, allowing said application services to be invoked on-demand as pre-built components in said Internet-hosted development environment, wherein access to said pre-built components is obtained through said portal via a browser; and
      an IDE test tool for creating test data for testing said application services,
      wherein
         said portal provides access to said pre-built components based on a corresponding user's role in the development of the Internet-hosted business application,
         said Internet-hosted development environment is configured to permit integration of a plurality of heterogeneous web services and application services into said Internet-hosted business application,
         said Internet-hosted development environment is configured to permit collaborative development and testing by multiple developers and testers in multiple locations, and
         said Internet-hosted business application is based on a customization of said pre-built components.

2. A system as recited in claim 1, wherein said application services and Internet-hosted development environment are maintained on a central system accessible by computers having browsers.

3. A system as recited in claim 2, wherein said first software module comprises methodologies, pre-populated testing databases, and testing environments, and wherein said IDE test tool is used for testing said Internet-hosted business application in conjunction with said methodologies, pre-populated testing databases, and testing environments.

4. The system of claim 1, wherein said Applications Service Provider Infrastructure Platform (AIP) module is configured to provide usage-based subscriber billing services.

5. A system as recited in claim 3, wherein said software development module further comprises at least three of an estimating tool, a data modeling tool, a hosted environment, a project planning tool, a resource management tool, a release management tool, a status reporting tool, an environment management tool, a source code editor, a debugger, a Structured Query Language (SQL) database service, a version control tool, and a defect tracking service.

6. A system as recited in claim 1, wherein said Internet-hosted business application is accessible to a client independent of:
   a programming language, a component model, and an operating system associated with said application; and
   a programming language, a component model, and an operating system of said client.

7. A system as recited in claim 1, wherein at least one of said web services is provided by a third party.

8. A system as recited in claim 1, wherein said first software module migrates application code and data to said specific technology.

9. A system as recited in claim 1, wherein said web services are software components accessible over the Internet using XML standards.

10. A method for developing an Internet-hosted business application composed of web services in an Internet-hosted development environment, comprising:
   accessing said Internet-hosted development environment through a portal via a browser;
   creating a development environment;
   displaying, at said portal, web services and application services based on a role of a user in developing said Internet-hosted business application;
   integrating at least one of said web services and said application services into said Internet-hosted business application as a pre-built component;
   creating a testing environment;
   migrating said Internet-hosted business application to said testing environment;
   testing functionality and performance of said Internet-hosted business application;
   creating a production environment;
   migrating said Internet-hosted business application to said production environment;
   wherein
      said Internet-hosted development environment comprises a software development module, a first software module, a builder module, and an IDE test tool,
      said software development module comprises multiple development tools, and pre-built and pre-configured environments,
      said builder module comprises an index allowing discovery of said application services that exist on an Applications Service Provider Infrastructure Platform (AIP) module that provides the capability to deliver said application services and bill for use of said Internet-hosted development environment,
      said Internet-hosted development environment is configured to permit integration of a plurality of heterogeneous web services and application services into said Internet-hosted business application, and said Internet-hosted development environment is configured to permit collaborative development and testing by multiple developers and testers in multiple locations customizing said pre-built component and customizing said Internet-hosted development environment by generating application services tailored for a specific technology using the first software module;

creating test data for testing said application services using the test tool;

upgrading at least one of said development environment, said testing environment, and said production environment; and abrogating at least one of said development environment, said testing environment, and said production environment using the software development module.

11. The method of claim 10, further comprising:
creating an account for said user via said portal;
wherein the production environment comprises a remote run-time environment and execution architecture Application Programming Interfaces.

12. The method of claim 10, wherein said application services and Internet-hosted development environment are maintained on a central system accessible by computers having browsers.

13. The method of claim 10, further comprising testing said Internet-hosted business application using said IDE test tool in conjunction with methodologies, pre-populated testing databases, and testing environments of said first software module.

14. The method of claim 10, further comprising accessing said Internet-hosted business application at a client, independent of a programming language, a component model, and an operating system associated with said application, and independent of a programming language, a component model, and an operating system of said client.

15. The method of claim 10, wherein at least one of said web services is provided by a third party.

16. The method of claim 10, further comprising migrating application code and data to said specific technology.

17. The method of claim 10, wherein said web services are software components accessible over the Internet using XML standards.

18. A computer readable medium storing an Internet-hosted development environment that develops an Internet-hosted business application composed of web services, said Internet-hosted development environment comprising:

a software development module comprising a portal, multiple development tools, and pre-built and pre-configured environments;

a first software module facilitating construction, versioning, and deployment of application services into a production environment;

a builder module comprising an index allowing discovery of said application services that exist on an Applications Service Provider Infrastructure Platform (AIP) module that provides the capability to deliver said application services and bill for use of said Internet-hosted development environment; and an IDE test tool, wherein said Internet-hosted business application is created by a method comprising:

accessing said Internet-hosted development environment through said portal via a browser;

creating a development environment;

displaying, at said portal, web services and said application services based on a role of a user in developing said Internet-hosted business application;

integrating at least one of said web services and said application services into said Internet-hosted business application as a pre-built component;

creating a testing environment using the test tool;

migrating said Internet-hosted business application to said testing environment;

testing functionality and performance of said Internet-hosted business application;

creating said production environment;

migrating said Internet-hosted business application to said production environment;

customizing said pre-built component;

customizing said Internet-hosted development environment by generating application services tailored for a specific technology using the first software module;

creating test data for testing said application services;

testing said Internet-hosted business application using said IDE test tool;

upgrading at least one of said development environment, said testing environment, and said production environment; and abrogating at least one of said development environment, said testing environment, and said production environment using the software development module, wherein
said Internet-hosted development environment is configured to permit integration of a plurality of heterogeneous web services and application services into said Internet-hosted business application, and
said Internet-hosted development environment is configured to permit collaborative development and testing by multiple developers and testers in multiple locations.

19. The computer readable medium of claim 18, wherein said application services and Internet-hosted development environment are maintained on a central system accessible by computers having browsers.

20. The computer readable medium of claim 18, said method further comprising:
creating an account for a user via said portal;
testing said Internet-hosted business application using said IDE test tool in conjunction with methodologies, pre-populated testing databases, and testing environments of said first software module
wherein said production environment comprises a remote run-time environment and execution architecture Application Programming Interfaces.

21. The computer readable medium of claim 18, wherein said method further comprises accessing said Internet-hosted business application at a client, independent of a programming language, a component model, and an operating system associated with said application, and independent of a programming language, a component model, and an operating system of said client.

22. The computer readable medium of claim 18, wherein at least one of the web services is provided by a third party.

23. The computer readable medium of claim 18, wherein said method further comprises migrating application code and data to said specific technology.

24. The computer readable medium of claim 18, wherein said web services are software components accessible over the Internet using XML standards.

* * * * *